United States Patent [19]
Bozler et al.

[11] Patent Number: 5,959,763
[45] Date of Patent: Sep. 28, 1999

[54] SPATIAL LIGHT MODULATOR

[75] Inventors: Carl O. Bozler, Waltham; Steven Rabe, West Roxbury, both of Mass.

[73] Assignee: Massachusetts Institute of Technology, Cambridge, Mass.

[21] Appl. No.: 09/031,487

[22] Filed: Feb. 26, 1998

Related U.S. Application Data

[60] Division of application No. 08/569,158, Dec. 21, 1995, Pat. No. 5,784,189, which is a continuation-in-part of application No. 07/665,345, Mar. 6, 1991, Pat. No. 5,233,459.

[51] Int. Cl.$^6$ .............................. G02B 26/00; G02F 1/03
[52] U.S. Cl. ........................................ 359/290; 359/254

[56] References Cited

U.S. PATENT DOCUMENTS

| | | | |
|---|---|---|---|
| 3,746,911 | 7/1973 | Nathanson et al. | 348/771 |
| 3,772,537 | 11/1973 | Clifford et al. | 310/309 |
| 3,897,997 | 8/1975 | Kalt | 359/230 |
| 3,989,357 | 11/1976 | Kalt | 359/231 |
| 4,074,253 | 2/1978 | Nadir | 345/108 |
| 4,094,590 | 6/1978 | Kalt | 359/230 |
| 4,208,103 | 6/1980 | Kalt et al. | 359/230 |
| 4,229,075 | 10/1980 | Ueda et al. | 359/230 |
| 4,235,522 | 11/1980 | Simpson et al. | 359/230 |
| 4,248,501 | 2/1981 | Simpson | 359/227 |
| 4,266,339 | 5/1981 | Kalt | 29/829 |
| 4,403,248 | 9/1983 | Te Velde | 348/755 |
| 4,529,620 | 7/1985 | Glenn | 438/29 |
| 4,695,837 | 9/1987 | Kalt | 345/85 |
| 4,710,732 | 12/1987 | Hornbeck | 359/291 |
| 4,729,636 | 3/1988 | Te Velde et al. | 359/223 |
| 4,741,599 | 5/1988 | Togo et al. | 345/84 |
| 4,786,898 | 11/1988 | Hata et al. | 345/85 |
| 4,805,038 | 2/1989 | Seligson | 358/296 |
| 4,807,967 | 2/1989 | Veenvliet et al. | 359/230 |
| 4,878,122 | 10/1989 | Glenn | 348/771 |
| 4,879,602 | 11/1989 | Glenn | 348/771 |
| 4,891,635 | 1/1990 | Hata | 345/85 |
| 4,948,708 | 8/1990 | Veenvliet et al. | 430/316 |
| 4,956,619 | 9/1990 | Hornbeck | 359/317 |
| 5,018,256 | 5/1991 | Hornbeck | 438/23 |
| 5,187,603 | 2/1993 | Bos | 349/117 |
| 5,233,459 | 8/1993 | Bozler et al. | 359/230 |

FOREIGN PATENT DOCUMENTS

| | | |
|---|---|---|
| 0563546 A1 | 2/1993 | European Pat. Off. . |
| WO 86/01627 | 3/1986 | WIPO . |
| WO 93/02375 | 2/1993 | WIPO . |
| WO 93/08555 | 4/1993 | WIPO . |

OTHER PUBLICATIONS

Proceedings of the IEEE, vol. 70, No. 5, May 1982, "Silicon as a Mechanical Material", by Kurt E. Peterson.

SPIE Critical Reviews Series vol. 1150, "Deformable–Mirror Spatial Light Modulators", By Larry J. Hornbeck, Texas Instruments, Inc., Central Research Laboratories, Dallas, Texas.

*Primary Examiner*—Georgia Epps
*Assistant Examiner*—Suzanne Letendre
*Attorney, Agent, or Firm*—Samuels, Gauthier & Stevens, LLP

[57] ABSTRACT

A spatial light modulator formed of a moveable electrode which is disposed opposite a fixed electrode and is biased to roll in a preferred direction upon application of an electric field across the electrodes to produce a light valve or light shutter. In one embodiment, the moveable electrode is restrained at one end and coils about the fixed end in a preferential roll direction. The bias is achieved by inducing anisotropic stress or anisotropic stiffness.

21 Claims, 50 Drawing Sheets

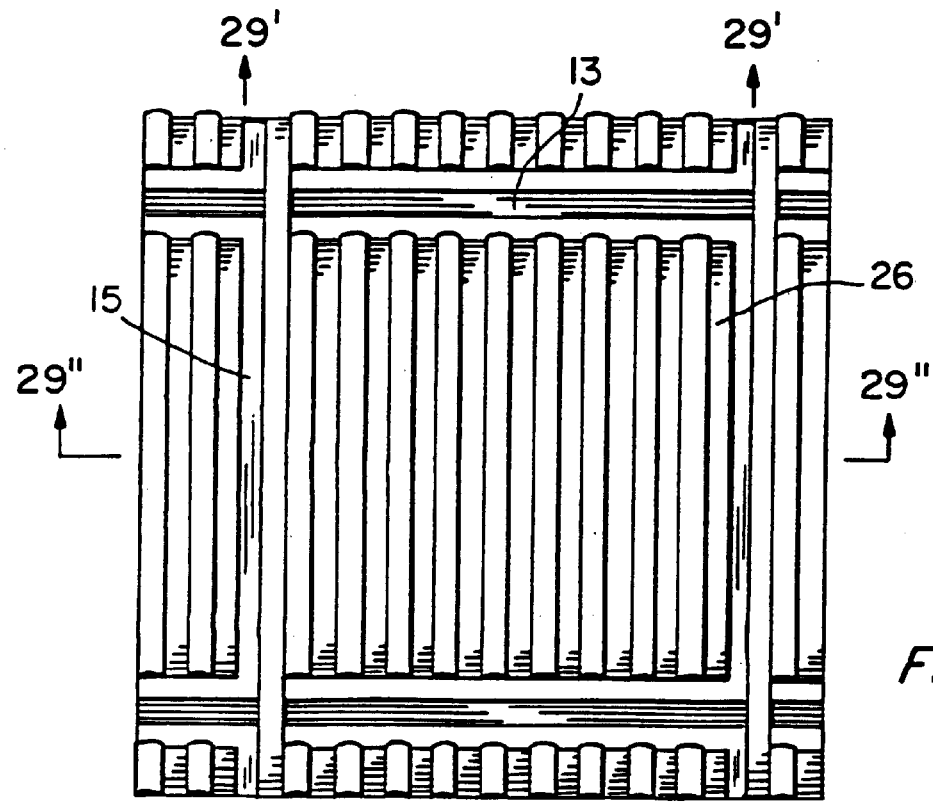
FIG. 29(z)
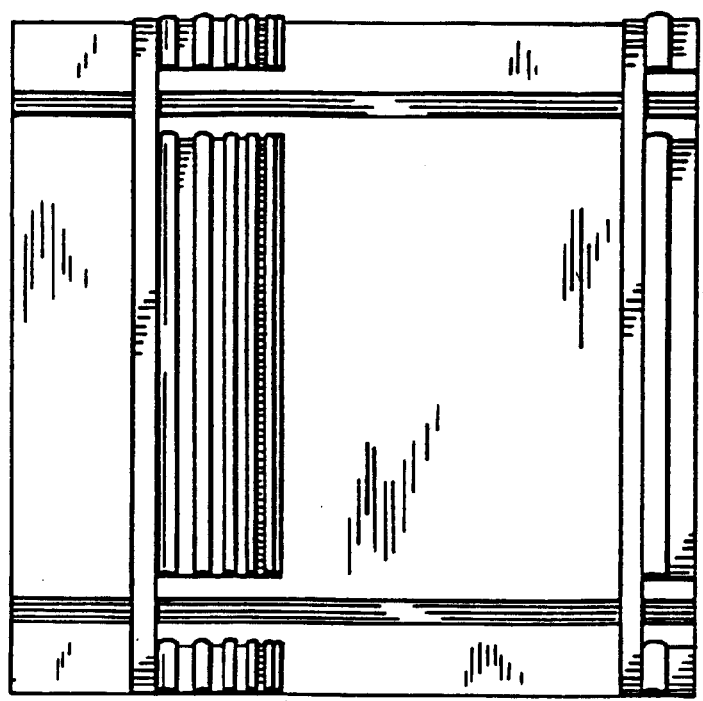
FIG. 29(z')

SPATIAL LIGHT MODULATOR

PRIORITY INFORMATION

This application is a divisional of Ser. No. 08/569,158 filed on Dec. 21, 1995, now U.S. Pat. No. 5,784,189, which is a continuation-in-part of Ser. No. 07/655,345 filed Mar. 6, 1991, now U.S. Pat. No. 5,233,459.

SPONSORSHIP INFORMATION

This invention was made with government support under Contract Number F19628-90-C-0002 awarded by the U.S. Air Force. The government has certain rights in the invention.

BACKGROUND OF THE INVENTION

This invention relates to spatial light modulators and devices made therefrom; such as display devices and printers. Electric display devices convert electric signals transmitted from electric or electronic devices into optical signals that can be recognized by humans. The optical signal is displayed as an image in the form of digits, characters, or graphics. Electric displays are divided into active or passive types. When the optical signal is displayed by light emission, the display is termed an active display, whereas when the display works by modulating incident light through reflection, scattering, interference, or similar phenomena, using an external light source it is termed a passive display.

Displays may be further subdivided into several further categories, as follows:

LCD liquid crystal display;

ECD electrochemical display;

EPID electrophoretic image display;

SPD suspended particle display;

TBD twisting ball display;

PLZT transparent ceramics display; and

ELVD electrostatic light valve display.

An ELVD is described in U.S. Pat. No. 3,989,357 issued Nov. 2, 1976 to Charles G. Kalt. Kalt's ELVD is a passive device and consists of a fixed electrode to which a moveable, coiled, resilient sheet electrode is attached with an insulating layer separating the two electrodes. The coiled electrode is caused to unroll upon application of an electric potential between the two electrodes. The coiled electrode thus acts as a light shutter.

The inner surface of the coiled electrode has a color or reflectivity that is different from that of the fixed electrode, in which case, the device to an observer changes hue or reflectivity when a potential is applied. Alternatively, the fixed electrode may be transparent to a selected portion of the electromagnetic spectrum and the coiled electrode may be opaque. In this case, the device is said to operate in the transmissive mode and a light source positioned behind the device would transmit light when no potential is applied and would not transmit light when a potential is applied.

Other patents pertaining to ELVD's are U.S. Pat. Nos. 3,897,997, 4,094,590, 4,235,522 and 4,248,501.

The above patents generally teach the use of metallized plastic sheets as the moveable or coiled element. These sheets are formed into a roll using heat and a mandrel or by bonding two plastic sheets, one of which is prestressed in one direction before bonding. There are a number of problems associated with these approaches when considering manufacturing cost, reliability, temperature effects and electrical charge control in these devices. The methods described require individual handling of each shutter to form the roll and to bond it to the fixed electrode. Some of the problems of handling are described in U.S. Pat. No. 4,094,590, which describes the formation of wrinkles. The ELVD's of Kalt are intended for large aperture devices and the process is not suitable for small aperture devices of about 0.004" square. These prior art devices rely on the elastic properties of plastic, which is undesirable, since these properties can vary widely with temperature and humidity and often change as they age. The flexing characteristics of the moveable electrode are determined by these elastic properties, therefore, the threshold voltages are likely to drift. U.S. Pat. Nos. 4,235,522 and 4,248,501 describe some of the issues of charge control in the insulator. These problems are more severe than is indicated in the patents. Even small amounts of accumulation or drift of charge in the plastic materials described will cause large amounts of threshold drift in the light valves, which is undesirable for many applications.

U.S. Pat. No. 4,729,636 discloses an ELVD in which an electrostatically moveable apertured non-rotatable electrode is disposed between two fixed electrodes and insulated therefrom. The electrode structure is immersed in a liquid of contrasting color with respect to the surface color of the moveable electrode. The moveable electrode can be moved back and forth between two stable positions. To an observer, the color of the picture element at each electrode changes from that of the moveable electrode to that of the liquid depending upon the position of the moveable electrode.

SUMMARY OF THE INVENTION

A lower cost method for mass production of small apertured, high speed ELVD's is disclosed. The process uses film deposition methods and lithography for making the valves. This means that all of the electrodes can be made from thin films. The term "thin films" is used to denote a film formed of layers of material deposited by some type of atom by atom or molecule by molecule process, rather than layers produced by layering down relatively large particles, thinning material or by rolling. Thin films are different in their properties because they are characterized by small crystal grain size and are sometimes even amorphous.

Thin films are different material from bulk material because of the grain size. They generally have a larger tensile strength than bulk material. Except for electroplating processes, thin film deposition requires a vacuum or low pressure environment. In practice, this requires vacuum evaporation, sputtering or chemical vapor deposition (CVD), plasma deposition, molecular beam epitaxy (MBE), ion beam sputtering, or other similar process. Large numbers of very small aperture area shutters (sometimes referred to herein as microshutters or valves) can be made simultaneously over large areas when using thin film and lithography techniques.

Small aperture devices have many advantages such as higher resolution, higher speed, lower voltage operation and easier fabrication. In general, therefore, the invention comprises an electrostatic light valve or shutter and a method of forming such a valve. The valve consists of a fixed electrode and a rotatably moveable electrode with an insulator between the two electrodes. When the moveable electrode is moved toward the fixed electrode by application of an electrostatic force, no metal-to-metal contact occurs. In the transmissive mode, the fixed electrode is transparent and the moveable electrode is opaque and acts like a shutter.

The insulator reduces the transfer of charge from one electrode to another. The charge transfer reduces the holding force on the moveable electrode and allows it to move away from the fixed electrode, thereby opening the shutter.

Preferably, the moveable electrode is an anisotropically stressed or stiffened electrode which is stressed or stiffened as formed. This anisotropic characteristic could be considered as a mechanical bias or a mechanical polarization. The anisotropic stress or stiffness causes the electrode to rotate in a preferential direction, i.e., where the stress is greater, or perpendicular to the direction of stiffening. The anisotropic stiffening may be induced by forming periodic corrugations in the electrode to stiffen the electrode in a direction orthogonal to the preferential direction. Anisotropic stress may be induced as deposited by forming the electrode in a deposition process which produces anisotropic stress.

In a first embodiment the moveable electrode is a coilable electrode fixed at one end which rolls up in a preferred direction and unrolls upon application of an electric field across the electrodes. In an alternate embodiment the moveable electrode is a deformable membrane fixed at both ends. In yet another embodiment, the moveable electrode is hinged.

An embodiment of the invention may comprise an array of anisotropically stiffened electrostatically moveable electrodes separated from an array of fixed electrodes by one or more insulative layers. Such an array may be made in accordance with a method of the inventions as follows:

A thin transparent conductive layer is formed on a suitable substrate, such as glass. A photoresist layer is formed over the conductive layer and patterned using conventional lithography techniques The exposed conductive layer is then etched away, leaving individual electrode or pixel areas; using the resist as a mask. The mask is removed and the patterned film of fixed electrodes is then covered with a thin transparent insulator film. Edges of the electrodes where contacts will be formed are suitably masked prior to forming the insulator film.

Another layer of photoresist is formed over the patterned structure and patterned so as to leave a series of resist regions over the individual electrode areas. The substrate with resist is then heated for a short period, after which a third resist layer is applied and patterned to leave a series of resist regions extending across the width of the electrode regions. The structure is again heated at elevated temperature for a short period. The series of resist regions form anisotropic stiffening corrugations and a release layer, for an overlying coilable electrode. The coilable electrode is formed by depositing and patterning successive layers of: i) a low stress insulating film, ii) a conductive film having stress of one type, i.e., compressive and iii) a conductive film having stress of opposite type (tensile).

An optional low stress protective coating is then formed over this structure and the structure is patterned to define contact areas where contact metallization is deposited. Photoresist and etching is then used to further define pixel areas and to completely remove the resist release layer, whereupon the anisotropically formed moveable electrodes coil up in the intended roll direction. Coiling occurs because the electrode is formed from a bottom low stress insulative layer, and a combined conductive compressive/tensile stress layer and a top low stress protective layer. Corrugations in the electrode provide lateral stiffness to prevent the electrode from curling perpendicular to the intended roll.

Alternative fabrication processes are described. In one process, a hinged shutter is formed using a dry etch process. In yet another method, a low temperature freeze drying process for forming coiled ELVD's is described. The principles of the invention may also be utilized to form devices other than ELVD's. For examples as will be shown, a micro-electro-mechanical switch may be formed for switching microwave power or to form a micro-mechanical relay. An electrophotographic printer employing a linear microshutter array of the invention is also described herein.

The above and other features and advantages of the invention will now be described in detail in connection with the following drawings.

BRIEF DESCRIPTION OF THE DRAWINGS

FIGS. 29(x)–29(z) and 29(z') are top plan views of the cross-sectional views of FIGS. 29(a)–29(l) at various steps in the process.

FIG. 49(b) is a side view of a DC switch of the invention shown in the closed position.

DETAILED DESCRIPTION OF THE INVENTION

COILED ELVD PROCESS

Figure 1A:
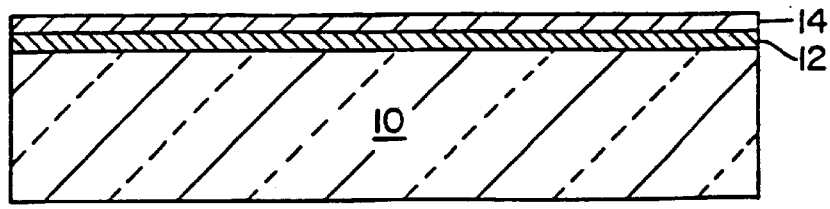
FIGS. 1(a)–1(j) are a series of schematic sectional views showing the steps in fabricating a valve for an electrostatic light valve display (ELVD) in accordance with the invention.

Referring now to FIGS. 1(a)–1(j), a preferred process for forming the display apparatus of the invention will be described in connection therewith.

The process depends somewhat on the substrate material used. Because glass is inexpensive and commonly available with flat smooth surfaces, it presently is a preferred substrate and has therefore been chosen as the substrate material for this description. Other prospective equivalents may comprise fused quartz, or in reflective mode operation, single crystal silicone ceramic, metals, or the like. The first step [FIG. 1(a)], after cleaning and inspection to determine that the substrate 10 has sufficiently good surface quality, is to coat the substrate with a thin transparent conductive layer such as 1000–3000 Å indium tin oxide (ITO). A sputtering machine with a sputtering target composed of indium oxide with about 10% tin oxide may be used to form the transparent conductor film layer 12. Note that ultra-thin transparent films of metals, such as, gold, platinum, silver or tungsten may be used in place of the ITO film. The ITO coated glass plate is then over coated with photoresist and the resist is patterned using conventional lithography techniques and the exposed ITO is then etched with an ITO etch using the photoresist as a mask (not shown). This step defines the lower or fixed electrode. Next, the patterned ITO film 12 is covered with a high resistance film 14, such as a silicon dioxide film using a chemical vapor deposition system. Preferably the thickness of film 12 ranges from about 50 Å to 5000 Å but may extend up to 25,000 Å as desired. Alternatively, one could form the high resistance film of silicon nitride deposited in a sputtering machine using a silicon target and nitrogen or a nitrogen argon mixture as the sputter gas. As a further alternative, one could deposit silicon dioxide using a sputtering or evaporation system.

Before depositing the silicon dioxide film 14, the edges of the plate where the wire contacts will be made are covered with masking strips (not shown) to block deposition. The silicon dioxide film 14 provides a high resistivity layer which will be disposed between the fixed transparent electrode conductor 12 and the top coilable electrode to be formed next. The structure is then coated with photoresist 16 [(FIG. 1(b)] having a thickness around 3000 Å using conventional techniques. The photoresist may be a negative or positive resist. The positive resist is comprised of a base resin (Novolak) and a photoactive compound and is patterned, again using conventional techniques, leaving resist in areas where release in an overlying film is required. A resist, such as the photoresist sold under the name "AZ 1350B", has been used with good results. The structure with resist is then baked at 400° C. for one minute in air, FIG. 1(c) transforming the resist layer into a smooth hard layer 16'. This bake process partially carbonizes the resist making it very hard and inert. The films formed on the baked resist can have the same properties as films on glass with a wide variety of materials using various deposition processes. A second layer of resist for forming corrugations is then applied as before, and patterned in a 4 micron period grating of resist regions 18 over the previously baked resist areas [FIG. 1(d)]. The structure is again baked at 400° C. for one minute forming a second smooth periodic hard resist structure 18' [FIG. 1(e)]. This second resist layer 18' provides the corrugations in an overlying electrode formed in the next steps. The two resist layers 16' and 18' together provide the release layer for the overlying electrode. The patterned structure is then coated with a 300 Å thick film 20 of high resistivity material, such as silicon dioxide or other alternative material, as before. The stress of this film 20 FIG. 1(f) must be low compared with the overlying layers or have compressive stress. Since the amount of stress will affect the tightness of the coil of the microshutter, the level of stress must be carefully controlled. Stress control is achieved by carefully selecting appropriate deposition processes and conditions. For example, silicon dioxide deposits with a large tensile stress in an atmospheric CVD reactor; but deposits with a smaller compressive stress using vacuum evaporation. The amount of stress will vary depending on deposition rate, temperature and pressure. The insulative film 20 is then coated with a film 22(b) FIG. 1(g) of sputtered tungsten having compressive stress, and then a second film 22(a) having tensile stress with both films together 22 having a thickness of 500 Å and a net stress which is low compared with the stress of each individual film [FIG. 1(g)]. Once again, the level of stress must be carefully controlled because it will affect the tightness of the coil of the rolled electrode. The stress in the sputtered tungsten may be adjusted by changing the sputtering power and gas (argon) pressure. After deposition of the tungsten films 22, the structure is coated with an optional 100 Å film 24 of sputtered nickel, aluminum, or silicon dioxide [FIG. 1(g)] to protect the tungsten from the etchants of the succeeding processing steps.

Figure 4:
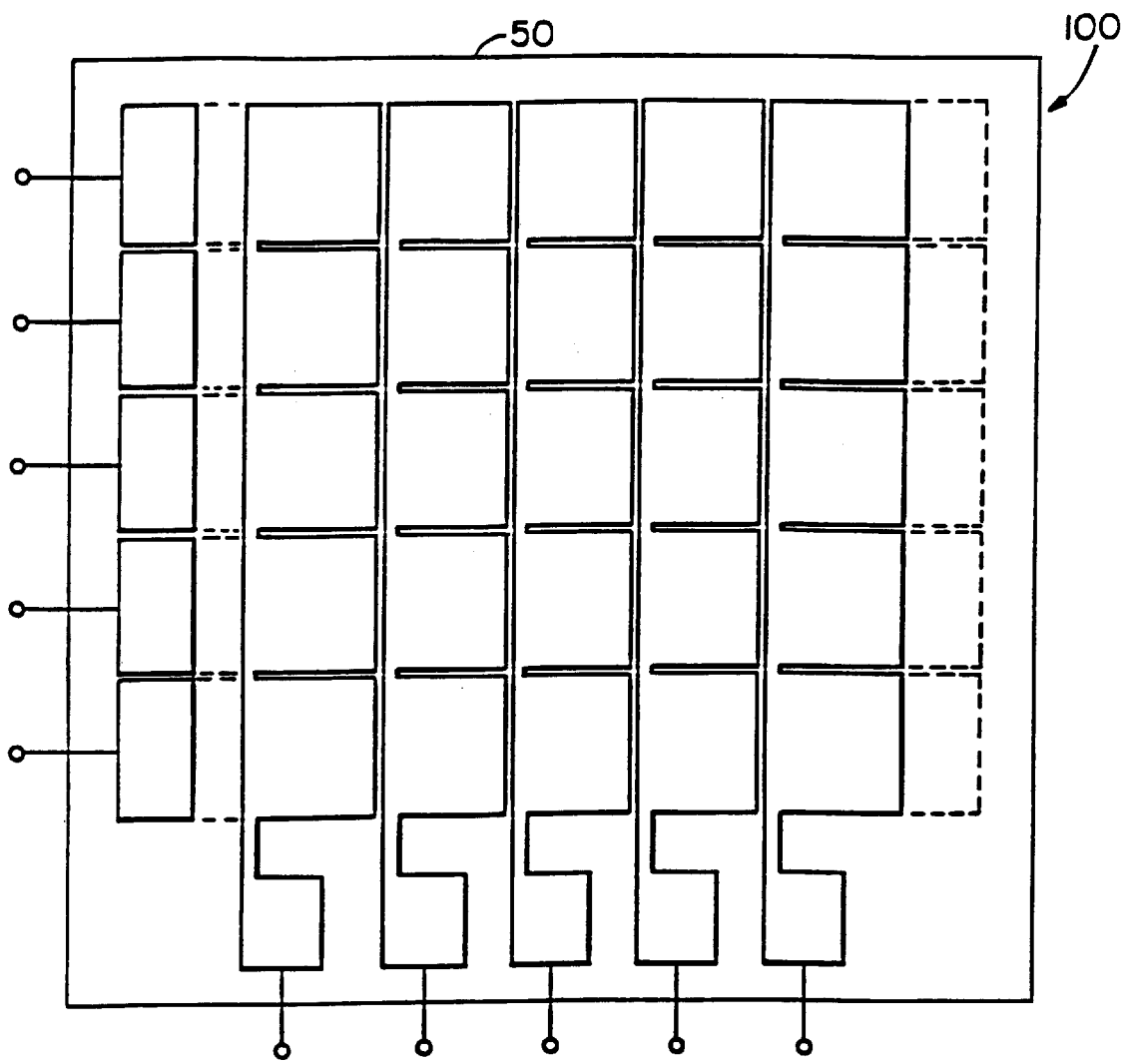
FIG. 4 is a view as in FIG. 2 showing the pixel shutters in the closed position.

Next, the structure is patterned with photoresist to define the contact areas where wire bonds will be made. Aluminum is then evaporated on the contact surface and lifted off elsewhere to provide the bonding pads 26. (See plan views of FIGS. 2 and 4.) Photoresist is again applied and patterned to define the pixel areas 28 (FIG. 4). Part of the pixel area overlays the release layer and part does not. The patterned structure is then etched using a nickel or aluminum etch (nitric acid for nickel or phosphoric/acetic/nitric solution for aluminum) for coating 24 and then introduced into a freon (CF4) plasma which etches through the tungsten 22 and the silicon dioxide 20. The plasma will also etch about 100 Å into the underlying baked photoresist layers 18' and 16' or in the thicker silicon dioxide layer 14. The structure is then exposed to atomic oxygen at 300° C. in a down stream asher. It is preferred to have a process which removes or etches away the release layer by changing the material in the release layer from a solid to a gas form. This is called a dry etch process. This is to avoid the liquid phase. Since any liquid has surface tension face which can damage the shutters especially when the liquid is being removed. However, in a later embodiment it will be shown that when the release layer is removed in the liquid form the liquid can be removed without damaging the shutters by freeze drying. In several minutes the oxygen removes the release layers 18' and 16' and the moveable electrode 30 [FIG. 1(i)] coils up. The structure after coiling is shown in FIG. 1(j). Coiling occurs because the bottom silicon dioxide 20 has low stress, the first tungsten layer 22(b) has compressive stress and the second tungsten layer 22(a) has tensile stress and the nickel film 24 has low stress. The structure is now ready for packaging in a hermetic package and for making the wire connections at the edge of the electrodes.

The corrugations provide the lateral stiffness to keep the film from curling perpendicular to the intended roll direction. The periodicity and depth of the corrugations are important parameters in the fabrication of the display structure. There may be advantages in making the corrugations very deep. Deeper corrugations make the film more flexible and this would allow the use of thicker, stiffer materials to be used in the film. A thicker film may be stronger. Another advantage of deeper corrugations would be lower reflectivity of incident light. Light passing to the bottom of a corrugation has a low probability of being reflected back out, especially if the material in the film is somewhat light absorbing.

Instead of using corrugations for anisotropic stiffening, a deposition process, such as evaporation or ion bombardment at an angle, may be used to induce anisotropic stress.

Note that in the process just described, the size of the coil, the voltage required to roll it out, the holding voltage, and the response time are important parameters in the design of particular devices. Assuming other parameters are held constant, some general rules can be given for these parameters. The larger the roll, the less voltage required to unroll the coil and the lower the holding voltage. The thicker the release layer, the higher the voltage required to roll out the film. The thicker the insulating layers, the higher the roll out voltage and the higher the holding voltage. The higher the differential stress in the two layers, the smaller the coil. The greater the adhesion between the moveable electrode and the fixed electrode wherever they make contact during roll out, the lower the holding voltage. The roll out response time decreases as the roll out voltage increases.

Use of light weight or less dense moveable electrode material results in faster response. For example, use of graphite and diamond or diamond-like films instead of tungsten and silicon dioxide would produce a much faster opening and closing of the valve.

It is also possible to build the shutter so that the insulation film over the release layer is compressive and the metal film over the insulation film is tensile. When released this double layer will function in a way similar to the structures made using two oppositely stressed tungsten films. An example would be compressive silicon dioxide and tensile magnesium.

Note also that deposited films generally have internal stress which will vary in direction and magnitude depending on deposition conditions. For example, evaporated pure titanium is compressive at thicknesses below 1000 Å. Adding oxygen to the film changes the stress to tensile. Also, sputtered tungsten deposits compressive at high power and 10 milliTorr argon pressure, and deposits tensile at low power and 15 milliTorr argon depending on the deposition system used. Some films have uniform stress, some films have stress which varies throughout the film. By choosing the materials and deposition processes, one can generate structures where the first part of the film down is compressive and as deposition continues the stress gradually becomes tensile so that upon release, the film rolls up. Or one can form a single film in which the stress in the lower part is compressive and in the top part is tensile.

RIBBED ELVD PROCESS

Figure 5A:
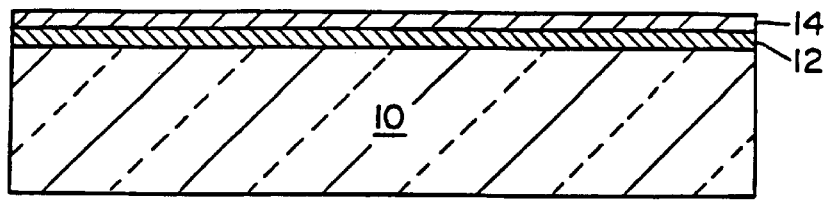
FIGS. 5(a)–(j) are a series of schematic cross-sectional views showing steps in fabrication of an alternate embodiment of the invention.
Figure 5B:
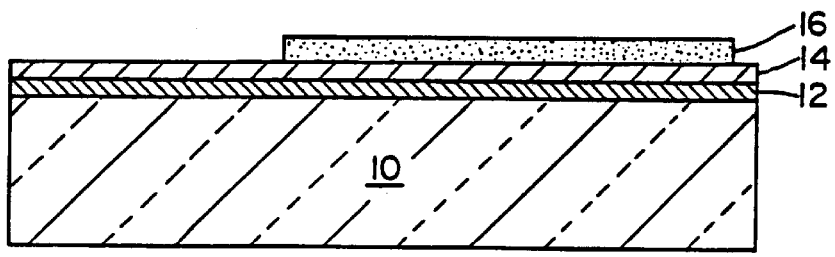
Figure 5C:
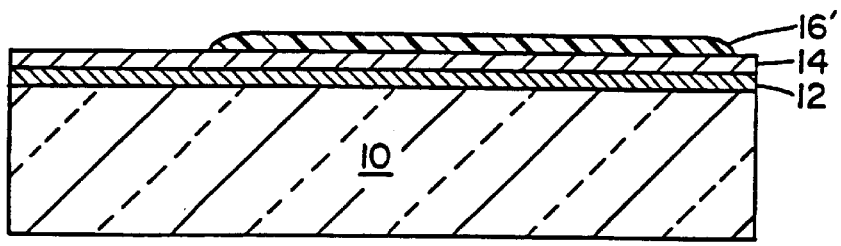
Figure 5D:
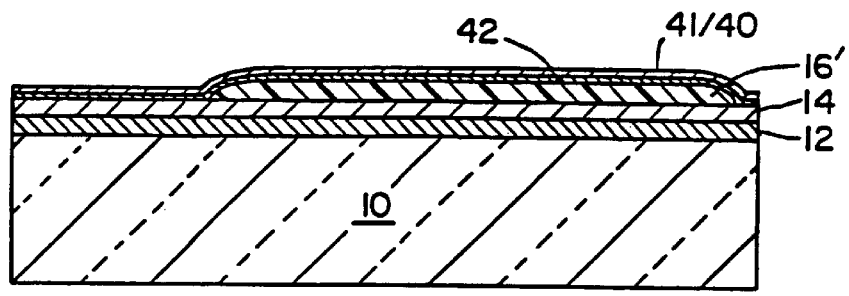
Figure 5E:
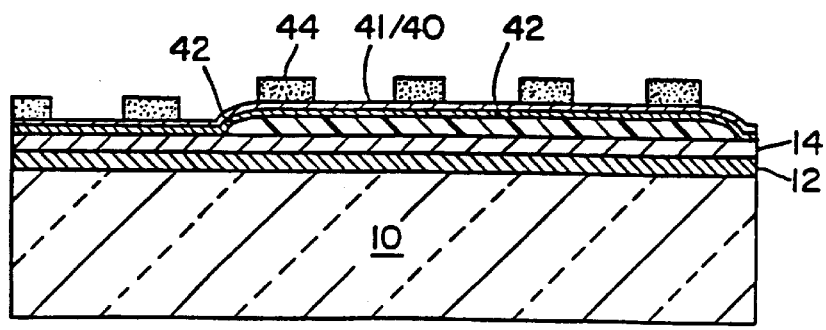
Figure 5F:
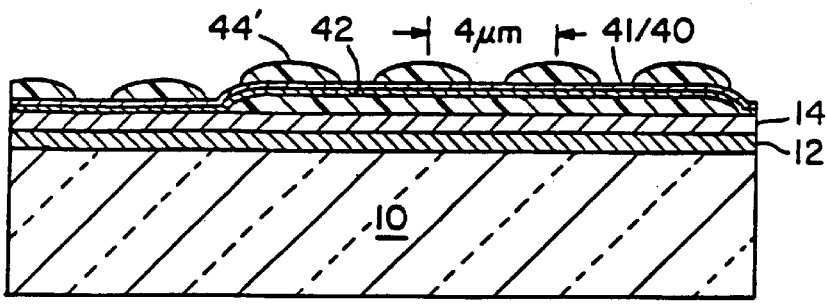
Figure 5G:
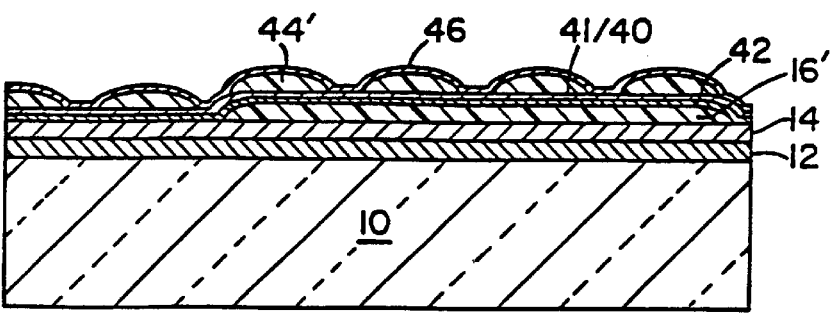
Figure 5H:
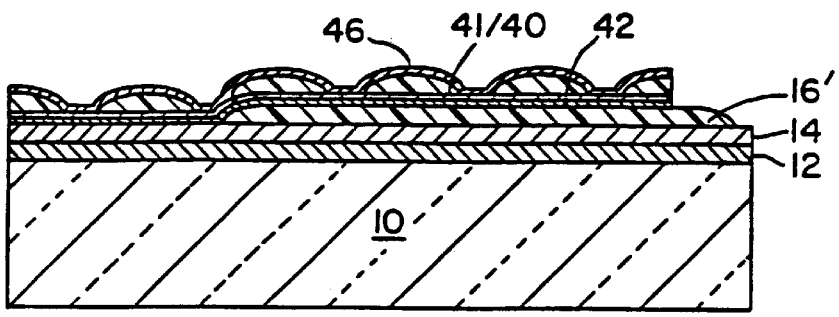
Figure 5I:
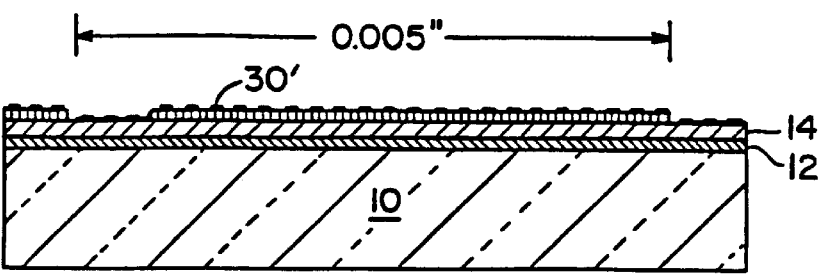
Figure 5J:
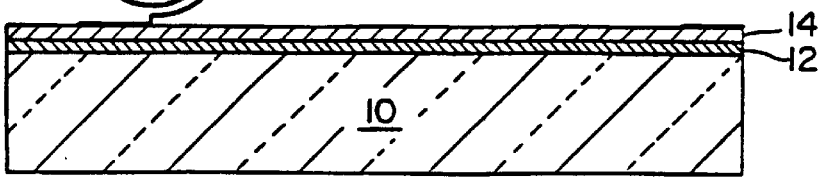

An alternate embodiment will now be described with the aid of FIGS. 5(a)–5(j). In this embodiment, ribs are formed on the moveable electrode in place of corrugations to produce anisotropic stiffness. The first part of the fabrication procedure is the same as in the corrugated procedure previously described, including the choice of substrate 10 and coating and patterning with ITO 12 [FIG. 5(a)]. The ITO 12 is coated with silicon dioxide 14, 50 Å to 5000 Å thick, deposited with a CVD system. The silicon dioxide 14 is removed from the edges of the structure where the wire contacts will be made using photolithography and etching. Next, the structure is coated with photoresist 16 having a thickness around 3000 Å using conventional techniques. The photoresist is patterned, again using conventional techniques, leaving resist in areas where release in an overlying film is required. The structure with resist is then baked at 400° C. for one minute. The resist layer 16' FIG. 5(c) provides the release layer for an overlying film. The patterned structure is then coated with a 300 Å thick film of CVD deposited silicon dioxide 42. The glass plate is then coated with two layers 40/41 of sputtered tungsten, the first film 41 having compressive stress, the second 40 having tensile stress. Since the amount of stress will effect the tightness of the coil of the micro shutter, the level of stress in both films must be carefully controlled [See FIG. 5(d)]. Next, the structure is coated with photoresist having a thickness around 6000 Å using conventional techniques. The photoresist 44 is patterned [FIG. 5(e)] with a 4 micron period grating with lines running perpendicular to the roll direction, again using conventional techniques, leaving resist 44 in areas where the ribs are desired. The structure with resist is then baked at 400° C. for one minute [FIG. 5(f)] and is coated with 300 Å evaporated silicon dioxide 46 [FIG. 5(g)]. After deposition of the oxide 46, the structure is patterned (not shown) with photoresist to define the contact areas where wire bonds will be made. Aluminum is then evaporated on the structure and lifted off except where required to provide the bonding pads. Photoresist is again applied and patterned to define the pixels [FIG. 5(h)]. Part of the pixel area overlays the release layer and part does not. The patterned structure is then etched using a freon plasma which etches through the silicon dioxide 46. The structure is then etched in oxygen plasma briefly to remove the baked photoresist 44'. The tungsten 41/40 and silicon dioxide 42 are etched in a freon plasma etch. The plasma will also etch about 100 Å into the underlying baked photoresist layer 16' or in the thicker silicon dioxide layer 14. The structure is then exposed to atomic oxygen at 300° C. in a down stream asher. In several minutes, the oxygen removes the release layer 16' and the pixels coil up. The coiling occurs because the bottom tungsten layer 41 is compressive, while the top tungsten 40 is tensile and the silicon dioxide 42 is tensile, but much more flexible than the tungsten. The ribs 46 provide the lateral stiffness to keep the film from curling perpendicular to the axis of the roll. The structure is now ready for packaging in a hermetic package and for making the wire connections at the edge of the array.

PACKAGING

Figure 3:
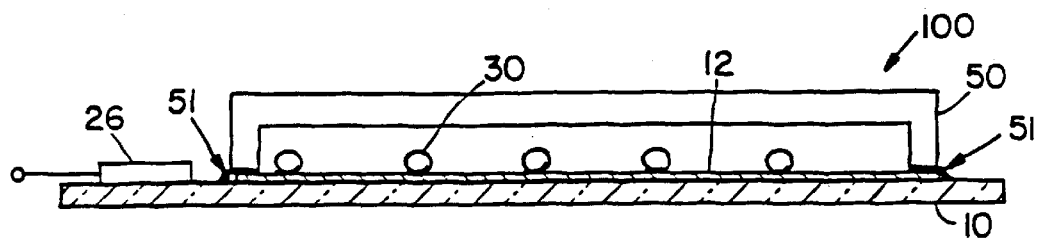
FIG. 3 is a sectional view along lines III—III of FIG. 2, having an additional cover in place.

The shutters 30 can be strongly affected by water, moisture, and water vapor. The vapor sticks to the surface of the shutter and in turn can cause the shutter to stick down. It has been noted that the shutters run longer without sticking down when they are operated in a pure nitrogen atmosphere. For reliability, therefore, the shutter array 100 should be packaged, as shown in FIG. 3, in a dry environment such as atmospheric pressure nitrogen. The preferred seal for the package is a hermetic seal 51 which can be made with solder, welding, or solder glass. There are some organic materials which can provide a good moisture barrier and may be sufficient as the sealant. One such sealant is butyl rubber.

Preferably, the array 100, as shown in FIG. 3, is enclosed by a cover 50, made, for example, of quartz or glass.

ARRAYS

Figure 2:
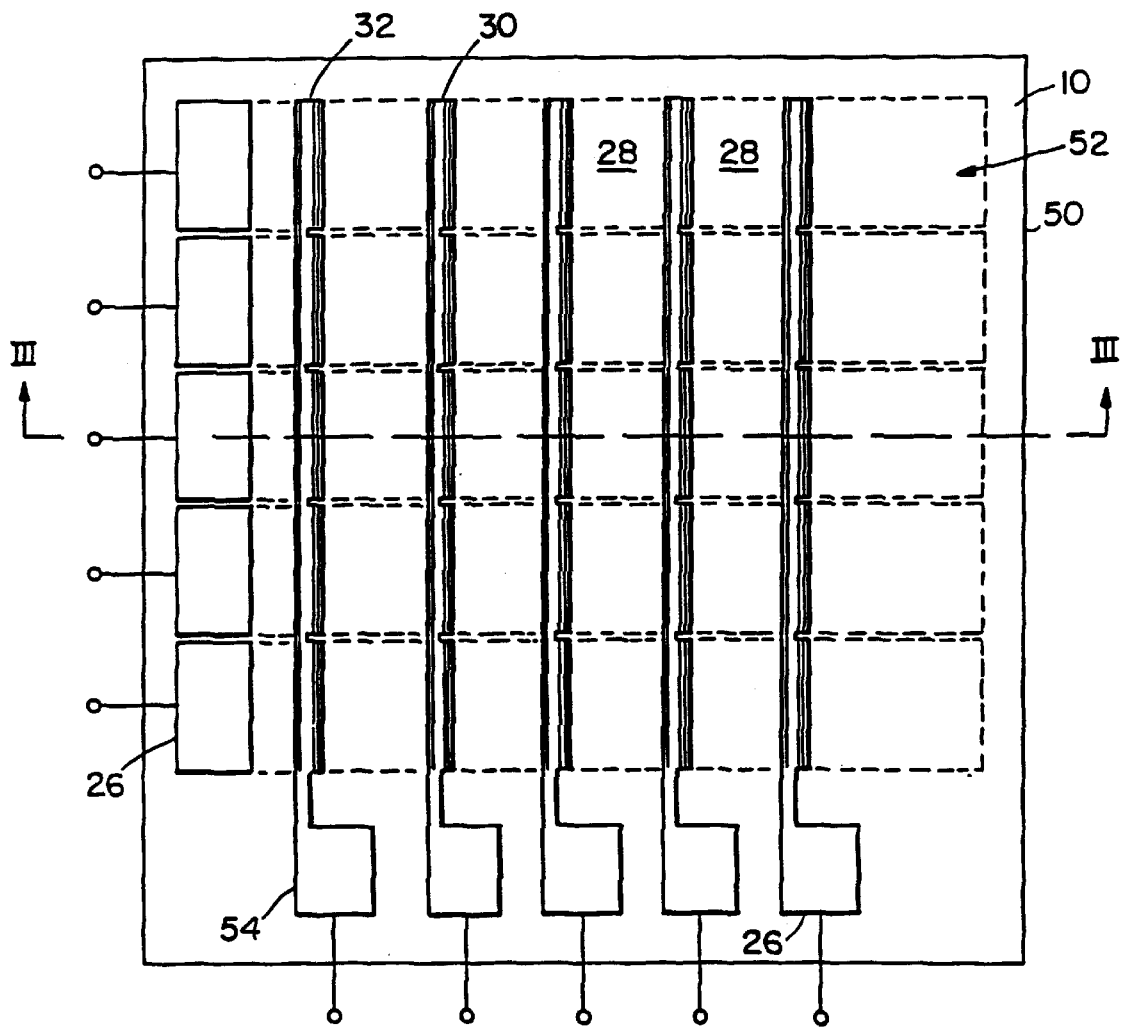
FIG. 2 is a schematic plan view of a 5×5 matrix array of ELVD's in which the pixel shutters are shown open.

Host of the applications for the display require having rows or arrays of devices. Television requires hundreds of rows and columns. In FIGS. 2–4, a 5×5 array or matrix 100 is shown to illustrate a preferred structure. In this array, the fixed transparent conductor layer 12 is patterned into horizontal stripes 52 and the individual moveable shutter coils 30 are connected together in columns 54 overlying the horizontal stripes. Each of the array pixels is therefore at the junction of one horizontal and one vertical electrode. In the rolled up position, a certain fraction of the light impinging on one side of the plane of the array is blocked by the rolls. For example, if the roll diameter is 40 microns, and the overall pixel size is 130×130 microns, then about 30% of the light is blocked by the rolls. When all the shutters are in the rolled out position, as shown in FIG. 4, there are small gaps between the shutters to provide some clearance. Light can pass through these gaps unless additional opaque stripes are provided in the substrate to block these openings. If the gaps are 4 microns wide, then without additional masking on a 130×130 pixel size, a 20 to 1 contrast ratio would be expected, assuming opaque shutters. With additional masking, much higher contrast ratios are possible. Also, a larger pixel size with the same roll diameter will give a larger contrast ratio.

COLOR DISPLAYS

Figure 6:
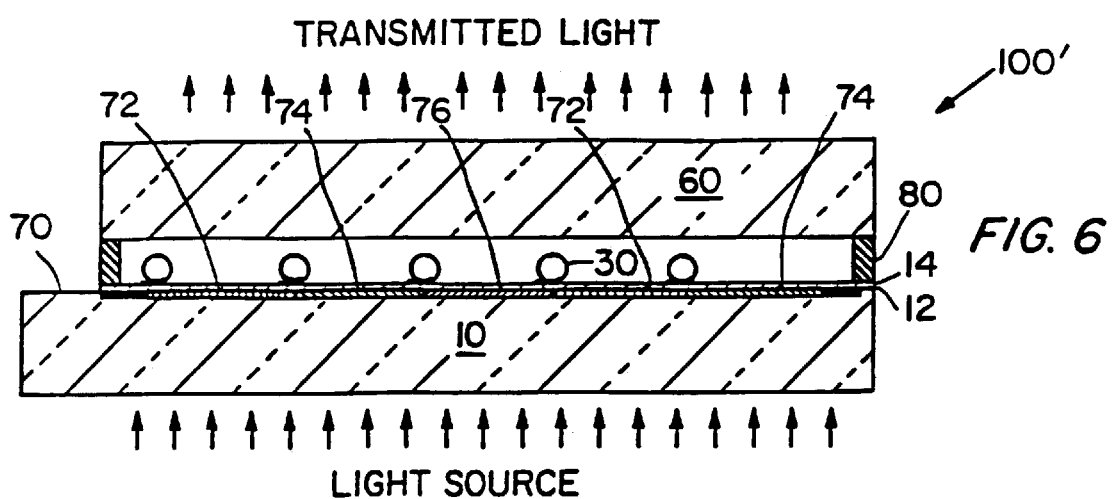
FIG. 6 is a schematic cross-sectional view of a transmissive mode color ELVD embodiment.
Figure 7:
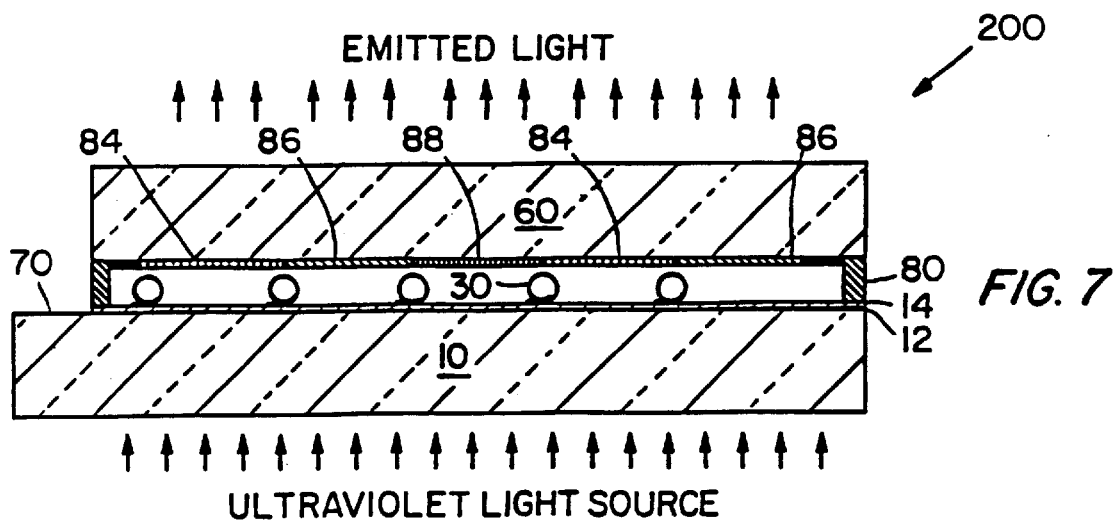
FIG. 7 is a schematic cross-sectional view of an active transmissive mode color ELVD embodiment.
Figure 8:
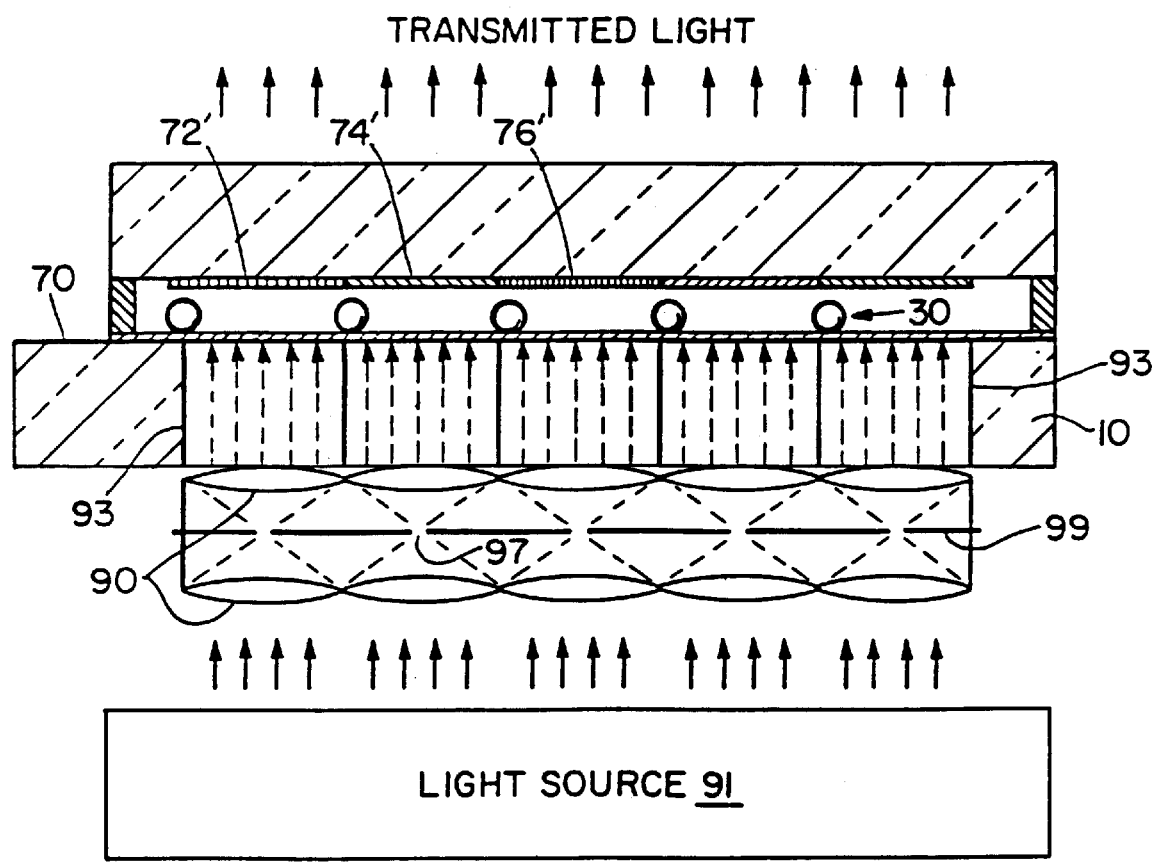
FIG. 8 is a schematic cross-sectional view of an ELVD with an array of lenslets to enhance contrast.
Figure 10:
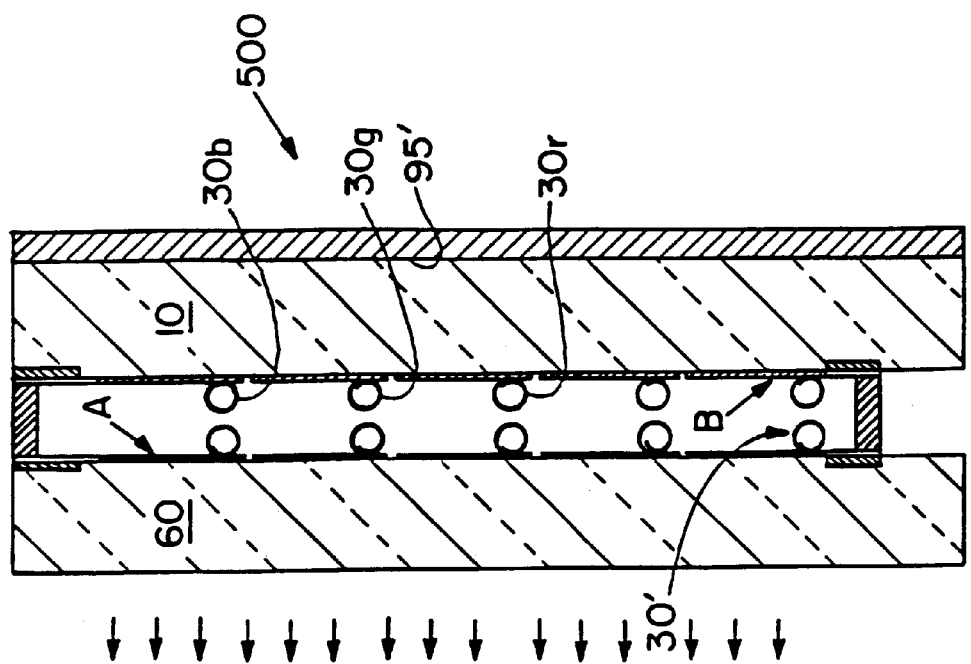
FIG. 10 is a schematic cross-sectional view of two shutter array ELVD operated in the reflective mode.
Figure 9:
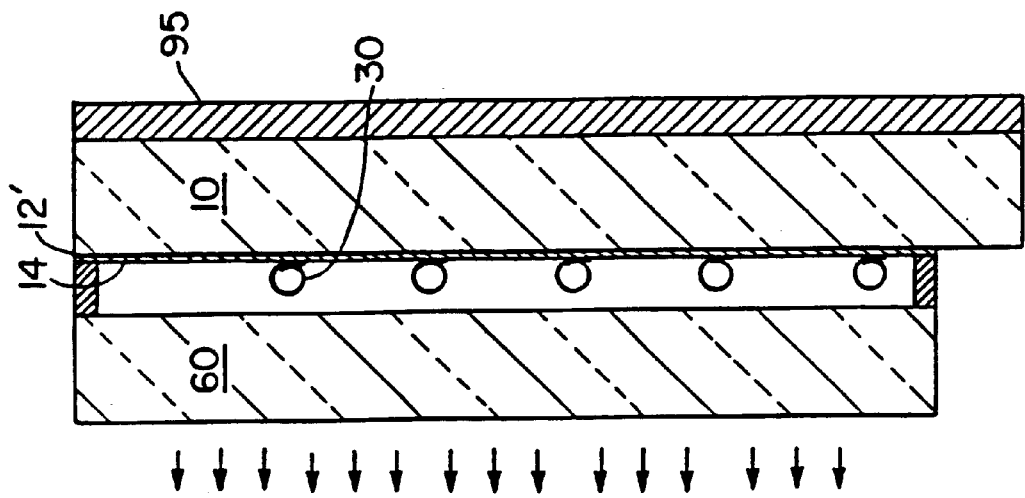
FIG. 9 is a schematic cross-sectional view of a reflective mode ELVD.

Light may pass through the display in either direction and a color display could be made by using color filters, as shown in FIG. 6, wherein a display array 100' is formed, as previously described, and packaged in a glass or quartz hermetically sealed container comprised of bottom glass substrate 10, sidewall spacers 80 and glass or quartz top wall 60. Red, green and blue filters 72, 74, 76, respectively, are bonded to the bottom of wall 60 and light is passed in the direction of the arrows. A second version of the color display is shown in FIG. 7, where ultraviolet light is supplied to one side of the display 200 and three ultraviolet light sensitive color phosphors 84, 86, 88 (red, green and blue, respectively) are positioned on the other side beneath wall 60 to produce an active display. Each coiled electrode 30 controls one color phosphor. This approach has the advantage that the amount of flicker can be controlled by the persistence time of the phosphor. To enhance the contrast of this display, an array of collimating or focusing lenslets 90 on the ultraviolet or light source side of the array, may be provided as shown in FIG. 8. These would serve to focus the light from a source 91 onto an aperture 97 through a shutter 30 onto its respective phosphor or respective filter 72', 74' or 76'. Light absorbing barriers 93 could also be used to enhance contrast and reduce crosstalk. The design of these lenses could take advantage of the work in the field of binary optics. The array could also be used in the reflection mode, using a white background 95 and black shutters 30, as shown in FIG. 9. An even simpler reflection mode device may be made using an opaque white conductor 12', instead of the transparent conductor and eliminating the white reflective layer 95 behind the glass substrate 10. In a very advanced version, two shutter arrays A and B are stacked, as shown in FIG. 10, to produce a passive color display 500. The top array A has black shutters 30', the intermediate array has three colors on the shutters (blue, green and red) 30b, 30g, 30r and the background 95' is white. This provides a multicolor reflective display which is totally passive.

VOLTAGE WAVEFORM

Figure 11:
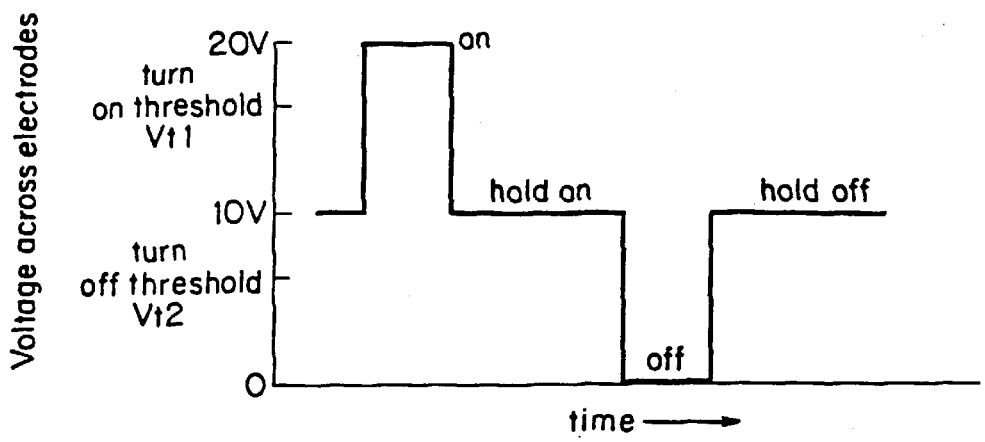
FIG. 11 is a timing diagram showing the applied DC voltages required for operation of the ELVD.
Figure 24:
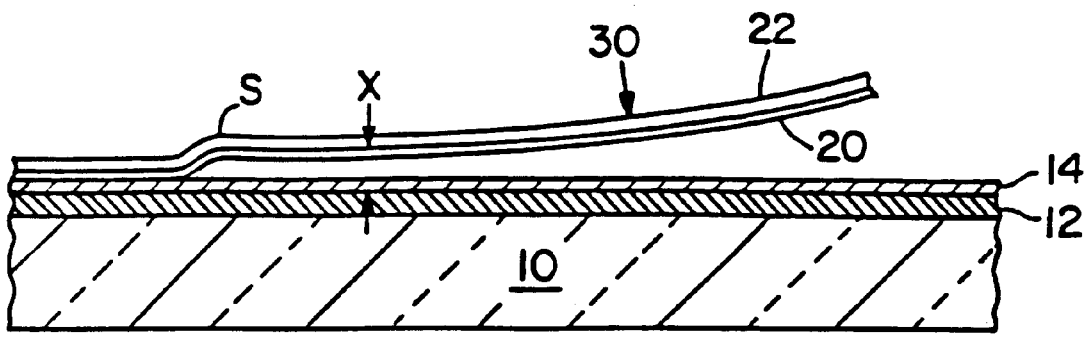
FIG. 24 is a magnified cross-section of an ELVD illustrating the stepped construction of the moveable electrode.
Figure 25:
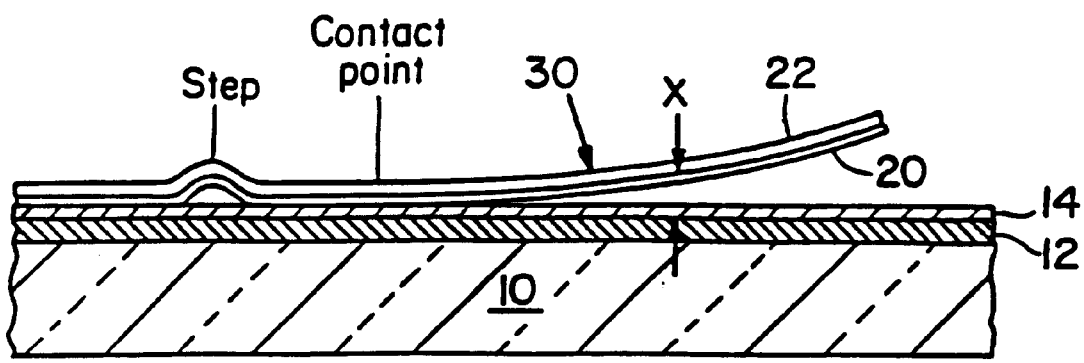
FIG. 25 is the same section, as in FIG. 24, with the electrode further unrolled.

The power requirements for the display device of the invention are very small. The voltage required is in the range of 1 to 50 volts. There is essentially no DC current required. Most of the current is the very brief flow of charge as the shutter or coil closes or opens. This current charges the capacitance between the moveable shutter electrode and the fixed electrode. The power required to close a shutter having a 364×130 micron pixel area 30 times a second is about $3 \times 10^{-8}$ watt. A high definition screen having 1000 rows and columns in color would have three million pixels. A 14×16 inch, 21 inch diagonal color display at a frame speed of 30 cycles per second, represents a power consumption for the entire screen of about only one-tenth of a watt. A representative waveform of the voltage across the two electrodes of the shutter required to turn on (roll out), hold, and turn off (roll up) the shutter, is shown in FIG. 11. When the voltage moves above the turn-on (or roll-out) threshold, the film electrode rolls out, and can be held out by a lower voltage. The reason the holding voltage is lower than the roll-out voltage is that a step is provided on the moveable electrode as will be explained in connection with FIGS. 24 and 25. Thus, for a given voltage on the two electrodes the electric field and, hence the force between the two electrodes, becomes larger as the coiled electrode moves closer to the transparent electrode. Therefore, once the moveable electrode is rolled out, the voltage can be reduced and still retain enough field to hold the electrode down.

Figure 12:
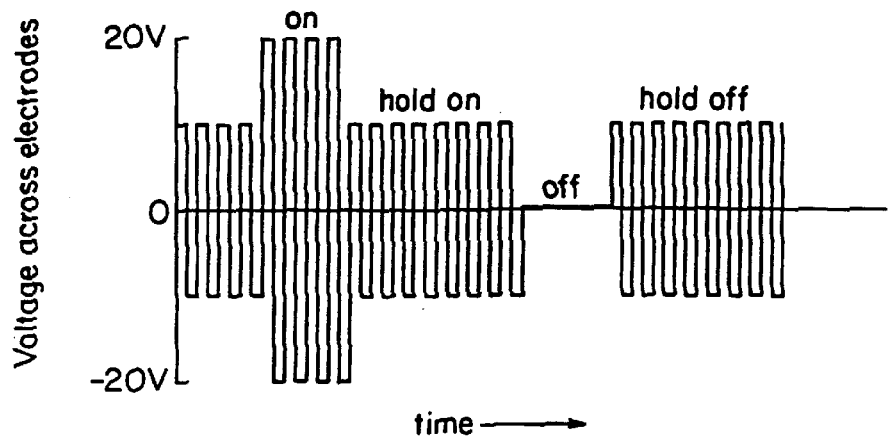
FIG. 12 is a timing diagram as in FIG. 11 for AC mode of operation.

Under some circumstances, it may be necessary to use an AC voltage to hold the electrode down, as shown in FIG. 12. The frequency of the AC could vary widely depending on device design. A frequency of one cycle per second has worked well for minimizing drift, for some devices which have been fabricated. This is required if charge migration occurs through the two insulating films 14 and 20 [See FIG. 1(h)], which either causes the film to stick down or causes the threshold to shift. Using the AC voltage can increase the power consumption for some applications, but there will be substantially no increase for applications such as TV where the AC frequency used is 30 cycle/second or lower.

Figure 13:
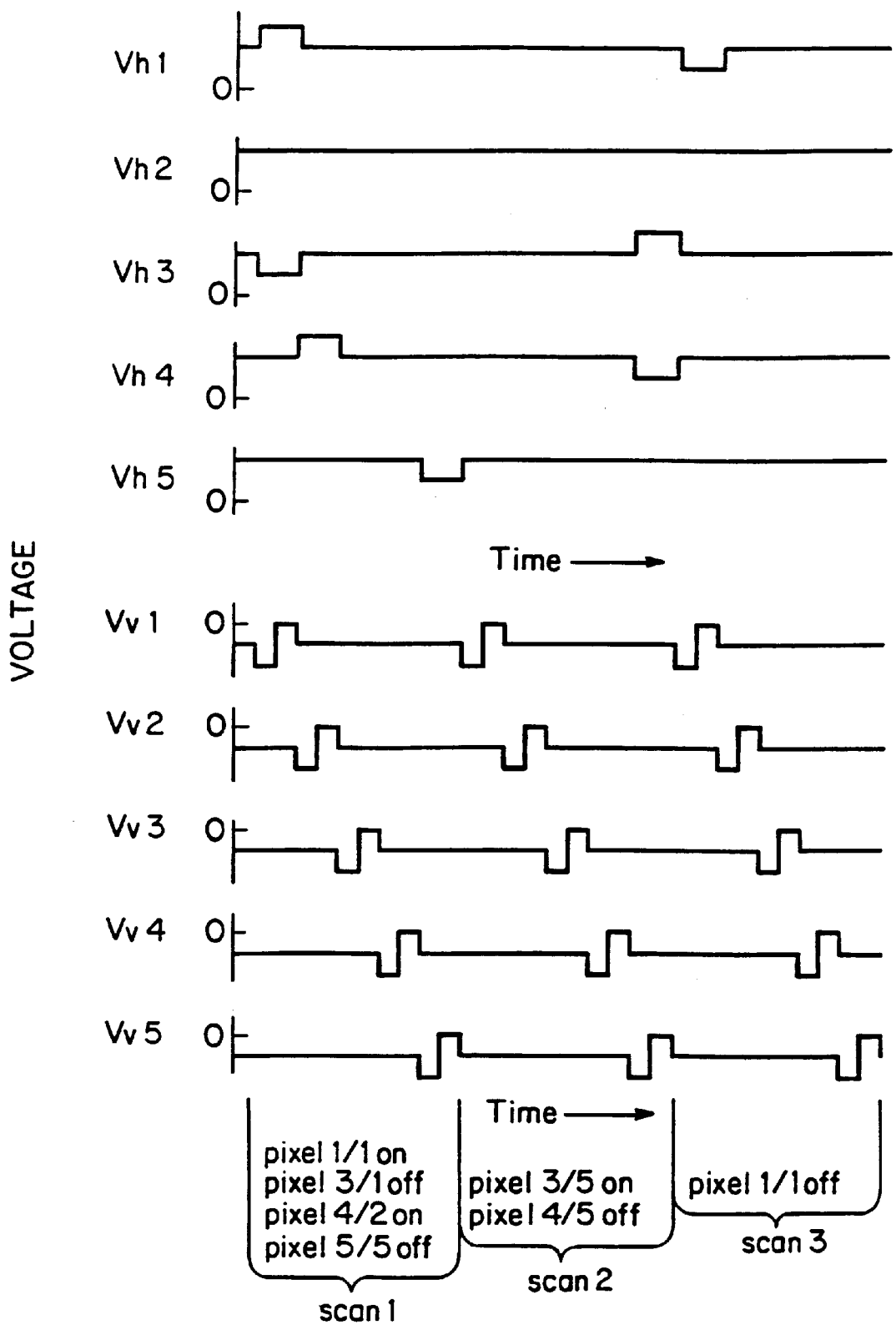
FIG. 13 is a timing diagram showing how the bistable nature of the ELVD can be used to switch pixels by employing a combination of vertical and horizontal applied voltages.

In a matrix, the bistable nature of the device can be used to great advantage. An example is given in FIG. 13 of the voltages used on the horizontal (h) and vertical (v) lines to switch individual pixels. The general idea is to maintain a bias voltage between the two coiled electrodes at every pixel which is halfway between the turn-on threshold and the turn-off threshold. This bias will hold whichever state the pixels are in. If one of the horizontal lines is raised in voltage, raising the voltage between the electrode pairs in that row, to just below the turn-on threshold, none of the previously Off pixels will switch On. If, however, at the same time, one of the vertical lines is lowered in voltage, which raises the voltage between the electrodes in that column, to just below the turn on voltage, none of the previously Off pixels will turn On, except the one at the intersection of vertical and horizontal lines. FIG. 13 shows three scans of the entire matrix, turning On or Off several pixels in each scan.

PROJECTION SYSTEM

Figure 14:
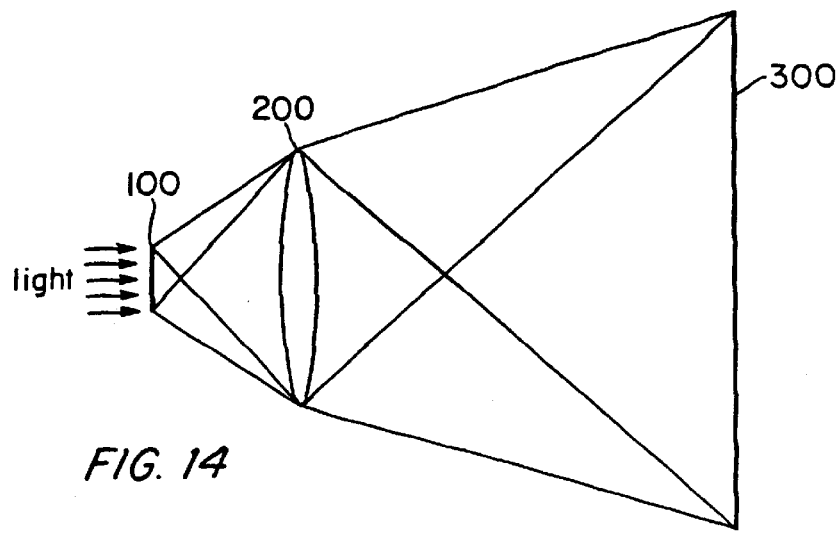
FIG. 14 is a schematic of a projection display using an ELVD.

Any of the shutters or shutter arrays previously described may be used in a projection system, as shown in FIG. 14, wherein light is focused on a matrix array of the invention 100 and an image is formed which is projected by projection lens 200 onto screen 300. Since the pixels are not very heat sensitive, a large amount of heat can be dissipated or reflected and therefore high-intensity light can be handled and projections onto very large screens is possible.

For proper operation of the electrostatic light valve displays of the invention, it is important to take into account the effect of the small DC current in addition to the capacitive charging current, when a voltage is applied across the electrodes. This current exists even though the electrodes are separated by one or, preferably, two insulators. The term insulator is misleading in this context, because one generally thinks of electrical insulators as non-conducting. In the present invention, a minimal current, as will be explained later, is present and can be desirable between the moveable electrode and the fixed electrode to minimize power dissipation. For this reason, complete blocking of current is not required. Instead, the "insulators" previously described are actually formed of high resistivity materials which are used as part of the electrode in a way which reduces charge flow between the electrodes. These materials can have resistivities (which vary depending upon applied voltage and temperature) in the range of that of silicon dioxide, i.e., $10^{10}$–$10^{15}$ ohms-cm. or they can have resistivities considerably lower and still function to reduce the charge flow sufficiently.

DESIGN CONSIDERATIONS

Some of the electrode design considerations and factors will now be discussed in connection with FIG. 15, in which the structure of the rolled moveable electrode is shown as a flat electrode for simplicity of illustration. Note also that this discussion is based on a simplified theoretical analysis based on observation of experimental structures made in accordance with the invention. Other factors may be involved and the validity and usefulness of the present invention should not be premised on the accuracy of this theory.

Figure 15A:
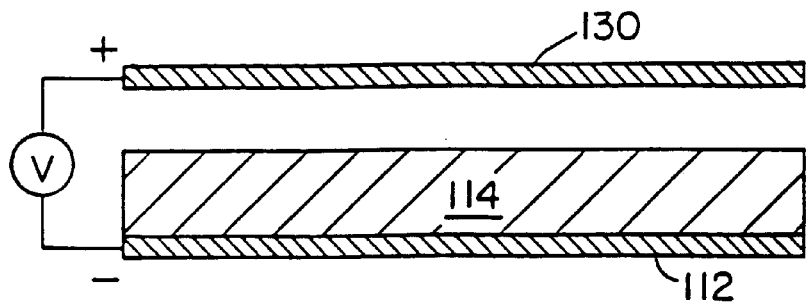
FIGS. 15(a)–(c) are cross-sectional views illustrating certain charge concepts of the invention.
Figure 15B:
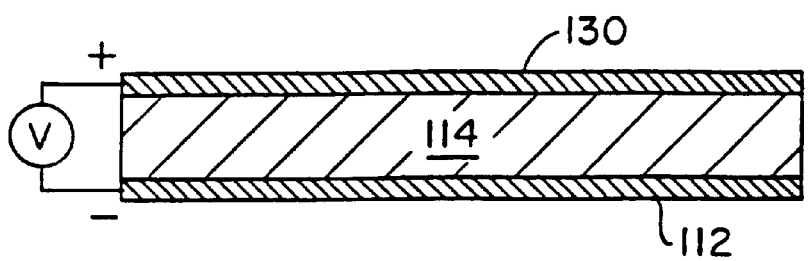
Figure 15C:
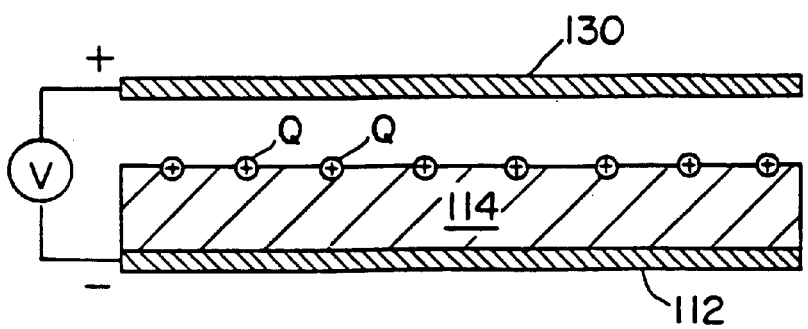

In general, if only one high resistivity layer 114, on either the moveable 130 or fixed 120 electrode is used, as shown in FIGS. 15(a)–15(c), it is difficult to keep the electrode in the "rolled-out" position. During roll outs FIG. 15(a), the voltage provides a force due to the accumulation of charge on each electrode. As soon as the electrodes touch or come within about 100 Å, [FIG. 15(b)], however, charge Q can transfer from the metal to the surface of the high resistivity material 114, filling some of the surface states, and the force is reduced [FIG. 15(c)], and the electrodes can move apart or roll-up. This charge transfer can happen rapidly so that the moveable electrode will barely begin to roll out before it rolls back up. In general, a single sheet of insulator 114 will not work because the moveable electrode 130 will not roll out and stay rolled out.

However, if the surface roughness between contacting surfaces is sufficiently large and keeps the two surfaces sufficiently far apart (>100 Å) over a sufficiently large area to block a large part of the charge transfer, the device can be made to operate and stay rolled out, since an electric field can exist across these air gaps and provide a force to hold down the rolled out electrode. The voltage required to roll out the shutter when there is an air gap will be higher than for an insulator without an air gap for the same conductor separation because the dielectric constant of the insulator is higher than the air gap. Thus, the disadvantage of the air gaps is that they tend to raise the operating voltage of the device. The problem of reduction of electric field due to charge transfer can also be avoided by using an AC, rather than a DC voltage, to roll out and hold out the moveable electrode. Keeping the roll out flat requires a high enough frequency so that the field reverses after only a small amount of charge transfers and the roll does not roll back up to any significant extent between each field reversal. The AC mode of operation has the disadvantage that it requires more power for operation than the DC mode and may tend to cause more wear because parts of the roll may tend to oscillate at twice the applied frequency. Any of the metal atoms removed from the moveable electrode, due to wear, will very likely be left behind on the high resistivity material adding to the surface charging effects.

DUAL RADIUS SHUTTERS

Figure 16:
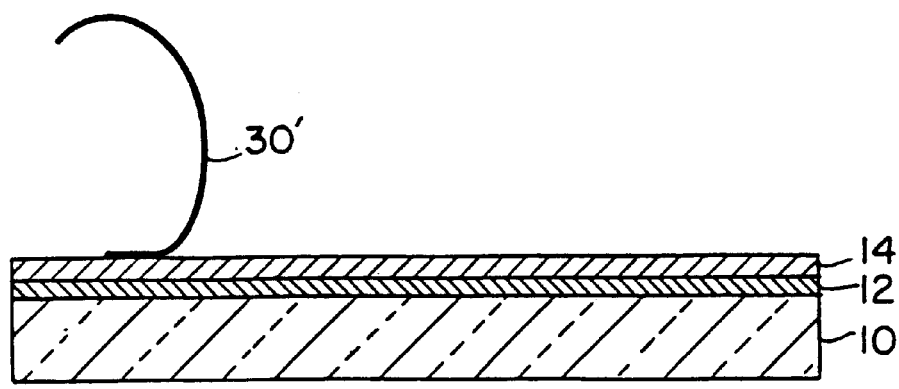
FIG. 16 is a sectional view of an ELVD with a dual radius.
Figure 17:
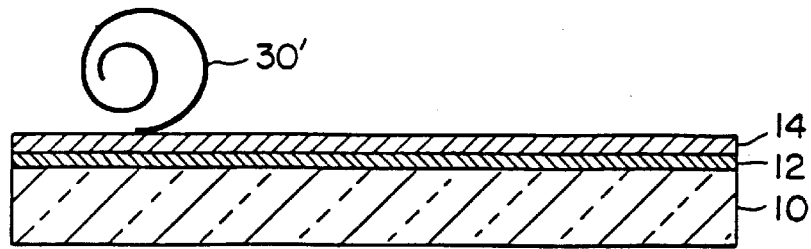
FIG. 17 is a sectional view of an alternate dual radius ELVD embodiment.

Up to this point, all of the shutter electrodes are shown to have a constant radius so that when they are rolled up, they form a cylinder. If the shutter 30' is long enough or if the radius of the cylinder is small enough, the coil electrode 30 will roll beyond a single turn and come in contact with itself. This could cause a reliability problem, because there could be places where the electrode is rubbing against itself and chafing and wearing. This problem can be overcome by having a shutter which has a variable radius of curvature, as shown in FIG. 16, wherein a glass substrate 10 supports fixed electrode 12 beneath insulator 14. Moveable electrode 30' has a small radius R1 near the substrate attachment and a much larger radius R2 farther out. In this device, the large radius R2 provides for a long roll-up distance without self contact In the second device of FIG. 17, the larger radius R2 is near the substrate attachment, and the smaller radius R1 farther out. This second device also has a long roll-up distance, but rolls up in a spiral shape to avoid self contact.

Figure 18:
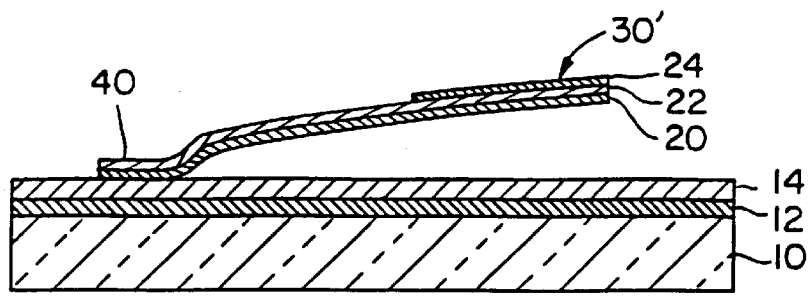
FIG. 18 is a sectional view illustrating how the dual radius ELVD may be formed.

The above may be realized in practice, as shown in FIG. 18, by forming a trilevel shutter 30' in which the moveable electrode is formed of a metal electrode 22 sandwiched between two insulators 20 and 24 (as will be described in detail later). The top insulator 24 is partly removed near the attachment area 40, so that when the moveable electrode 30 rolls up, it has a dual radius with the larger radius R2 remote from area 40 and the smaller radius R1 closer to area 40.

RAIL EMBODIMENT

Figure 19A:
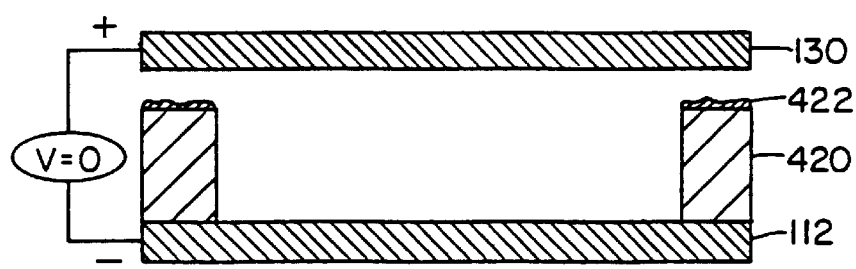
FIGS. 19(a) and 19(b) are cross-sectional views (voltage off) 19(a) and (voltage on) 19(b) of an ELVD with a rail or spacer gap construction.
Figure 19B:
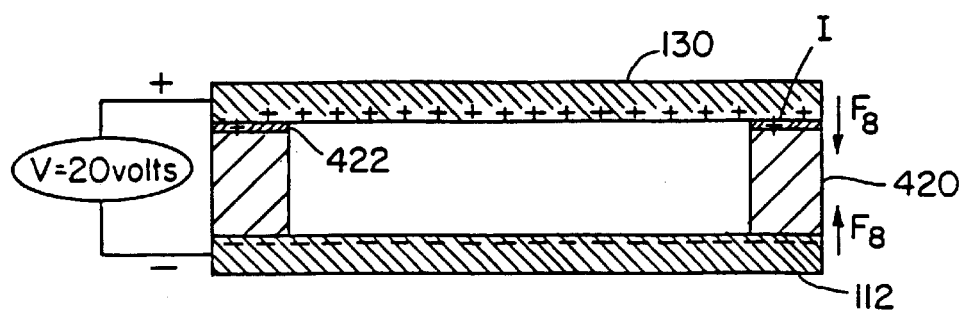
Figure 20:
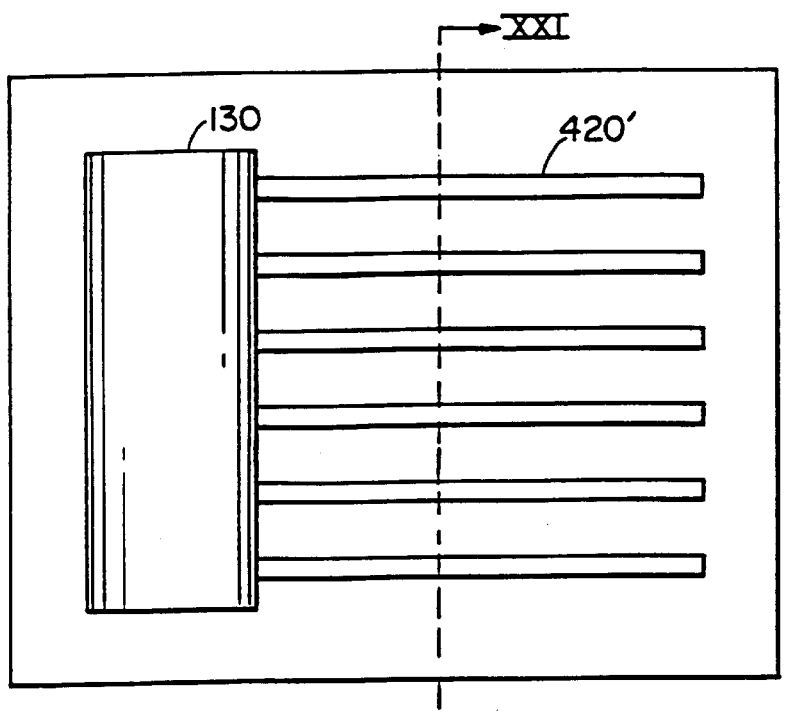
FIG. 20 is a schematic plan view of an ELVD pixel with bars or rails extending along the roll direction and wherein the moveable electrode is rolled up.
Figure 21:
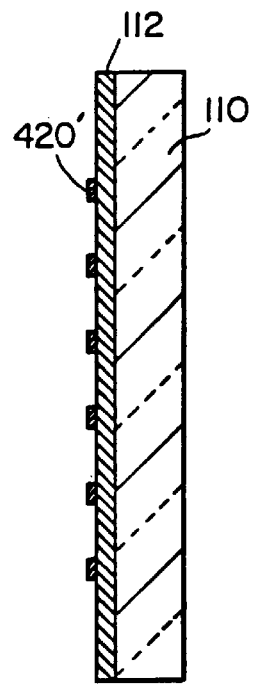
FIG. 21 is a section along lines XXI—XXI of FIG. 20.
Figure 22:
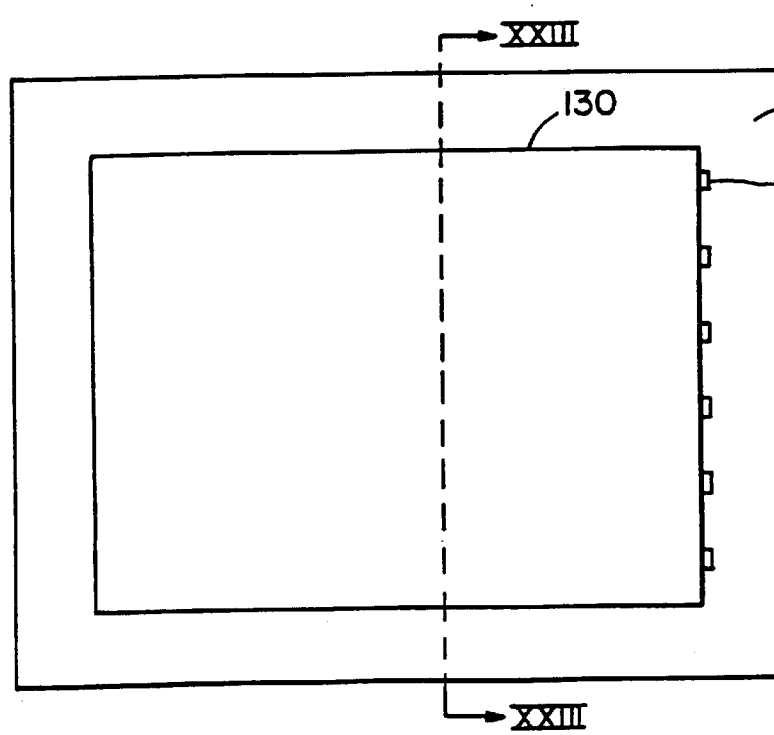
FIG. 22 is a schematic as in FIG. 20 with the electrode unrolled.
Figure 23:
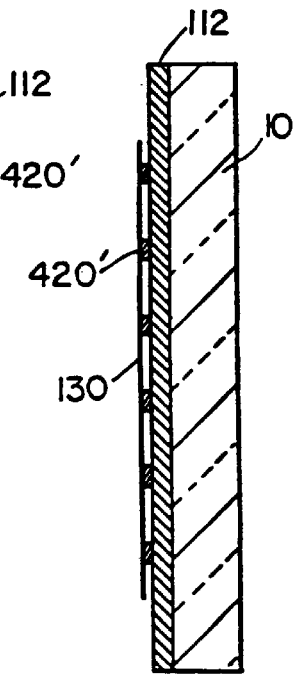
FIG. 23 is a section along lines XXIII—XXIII of FIG. 22.

FIGS. 19(*a*) and 19(*b*) illustrate an embodiment wherein much of the high resistivity material has been eliminated. Standoffs or rails 420 made of SiO$_2$, or other high resistivity material, support the moveable electrode 130 when it is in a rolled down position [FIG. 19(*b*)] so that a gap is formed between electrodes. The gap is filled with gas or vacuum. The air gap in this case is uniform and carefully controlled and results in a contact plane with almost no surface state charging at the interface, resulting in a reduction of the charge problems associated with a solid insulator. The standoffs 420 may consist of narrow ribs of silicon nitride or silicon dioxide running perpendicular to the roll direction. To provide better damping, the insulating ribs, could also be made out of plastic which has greater flexibility than silicon dioxide or silicon nitride. To reduce the charge problems attributed to the solid insulators even more, one could coat the tops of the solid insulators 420 with metal 422 [FIGS. 19(*a*), (*b*)]. The metal would then charge up to the potential of the moving electrode 130 each time it rolled out, which would eliminate the drift in voltage. The metal on top of the rail could also be permanently electrically connected to the moveable electrode. One could also have extra high resistivity material between the rails and/or on the moving electrode for some applications. Note that material located between the rails must be thinner than the rails in order to maintain a gap.

An alternate geometry for the stand-off embodiment is shown in FIGS. 20–23 in which the rails 420' run in the roll direction along the fixed electrode 112 over the glass substrate 110. In this geometry the moveable electrode 130 is planar on the fixed electrode side in order to have the roll out motion smoother and have less friction.

For many applications, it is desirable to have a bistable display device, that is, one in which the "hold-on" voltage is less than the voltage required to initially turn the shutter on. This is especially useful in x y scanned arrays, which would be used to make a television display screen, for example. This bistability can be created by forming a step S in the moveable part of the moveable electrode 30 (formed of stressed conductor 22 and insulator film 20) near the place where it is bonded to the insulator 14 on the fixed electrode 12, as in FIG. 24. The step S increases the distance "x" between the electrodes which increases the voltage required to begin to roll out the electrode. The amount of voltage required can be controlled by the step height. Once the coil begins to unroll, as in FIG. 25, the distance "x" between electrodes is less, so that less voltage is required to roll out the electrode. It is, therefore, possible to use a pulse, as previously shown in FIG. 11, to unroll the coil where the initial part of the pulse has a larger voltage which drops down for the rest of the pulse. The minimum voltage required to begin the unrolling is Vt1 and the minimum voltage required to continue the unrolling is Vt2. As long as the voltage between the electrodes stays above Vt2, the coil will stay most of the way rolled out. For any voltage between Vt2 and Vt1, the coil position will move very little, either in the rolled up or rolled out position. If the voltage is at any point dropped below Vt2, the coil will roll up. One could, of course, introduce additional steps along the coil which would require exceeding threshold for that step before the coil could roll beyond that step.

A second way to create a bistable device is to use the natural attractive adhesion forces (Van der Walls Forces) which occur when two materials come into contact. The amount of attractive force depends on the material and the surface smoothness. By selecting materials and controlling the surface condition a magnitude of adhesion force can be achieved which is low enough to allow roll-up of the shutter at zero applied voltage but large enough to significantly reduce the hold voltage below the roll out voltage, assuming there is no step. The result, as with the case for the built-in step, will be bistability where the shutter can be open or closed of the same voltage. It is even possible that the adhesion forces can be used to provide stability to a partially rolled out shutter, as will be described later.

Grey scale can be provided by partially rolling out the shutter or by using time multiplex and the natural persistence of the human eye to give the appearance of gray. For example, in an application for TV, the frame time is 1/30 of a second. Since the shutters switch very rapidly, they can be turned on and off in 1/10,000 of a second or faster. By leaving a shutter on for only a fraction of the frame time, the appearance of grey scale can be achieved at each pixel.

Other methods for achieving grey scale will be described in the later sections.

PASSIVE MULTICOLORED BISTABLE ELVD

Figure 26A:
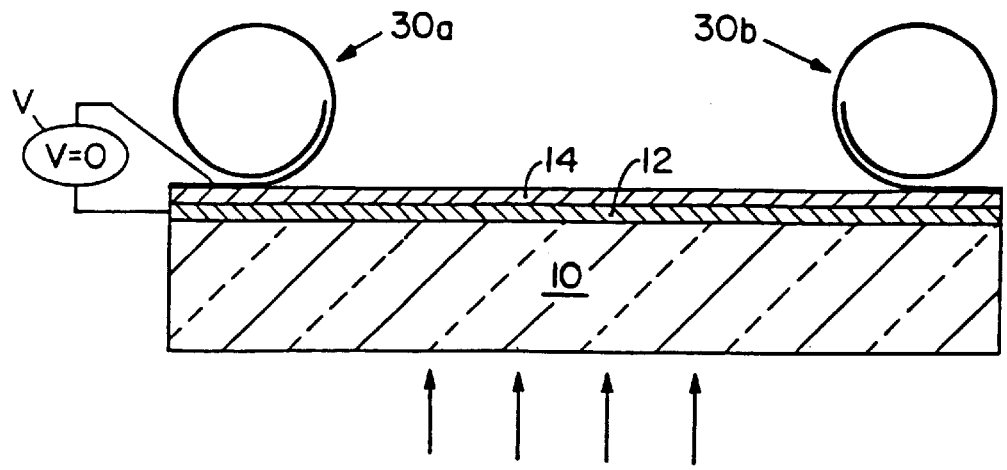
FIG. 26(a) is a cross-sectioned view of a multicolor display.
Figure 26B:
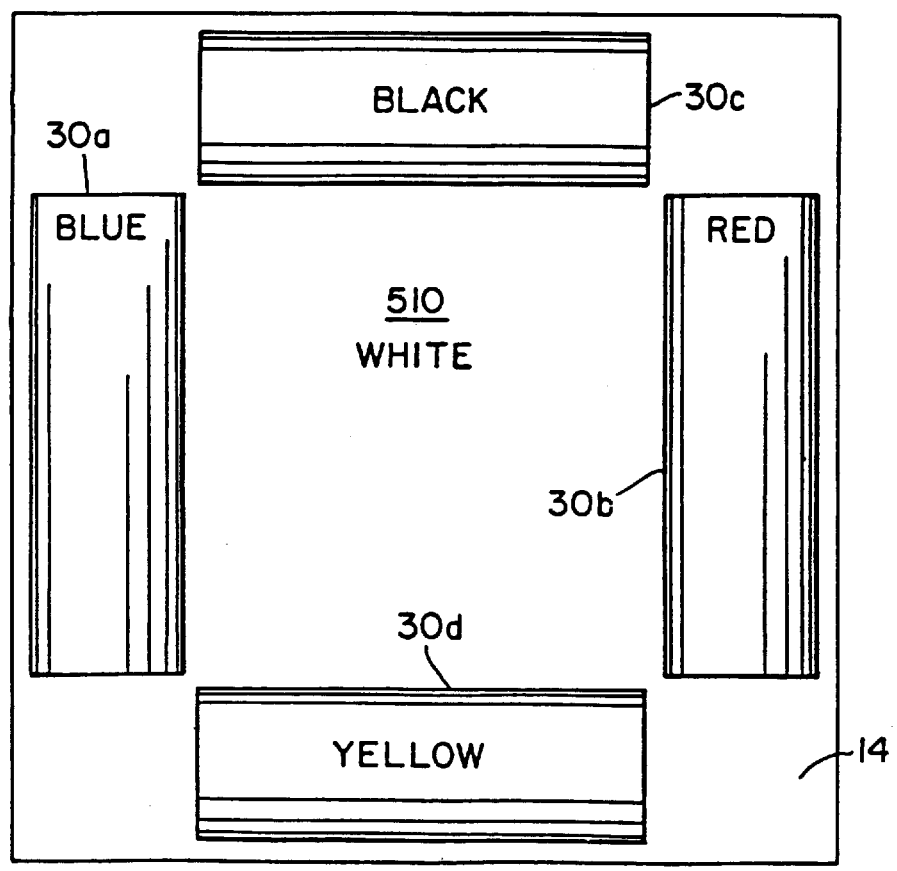
FIG. 26(b) is a plan view of the display of FIG. 26(a).

In the embodiment of FIGS. 26a and 26b a passive multicolored bistable electrostatic light valve display is depicted wherein a plurality of coiled moveable electrodes 30a–30d of the type previously described are symmetrically disposed about a central display area 510.

The moveable electrodes 30a–30d are each affixed at one end to insulator layers 14 formed on white electrical conductor 12 formed on an insulating substrate 10.

Individual moveable electrodes 30a–30d may be selectively activated, one at a time, by applying voltage from source V across selected electrodes to vary the color of the light reflected back to a viewer on the substrate side. Arrays of such displays may be provided to produce a passive color display.

DEFORMABLE MEMBRANE SWITCH

Figure 27A:
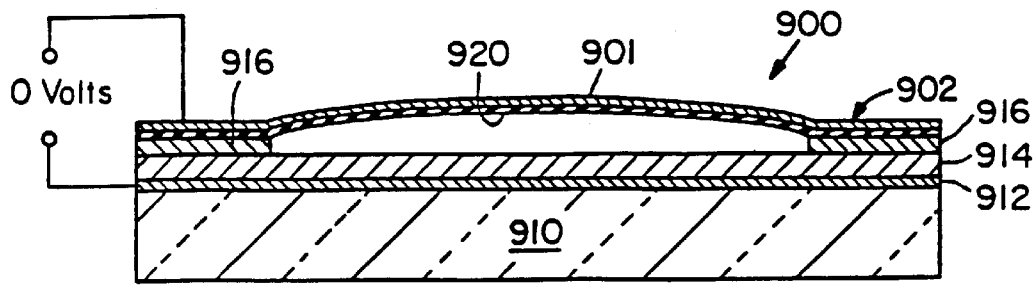
FIGS. 27(a) and 27(b) are cross-sectional views of a deformable membrane switch (DMS) display embodiment operating in the reflective mode showing the switch Off [FIG. 26(a)] and On [FIG. 26(b)].
Figure 27B:
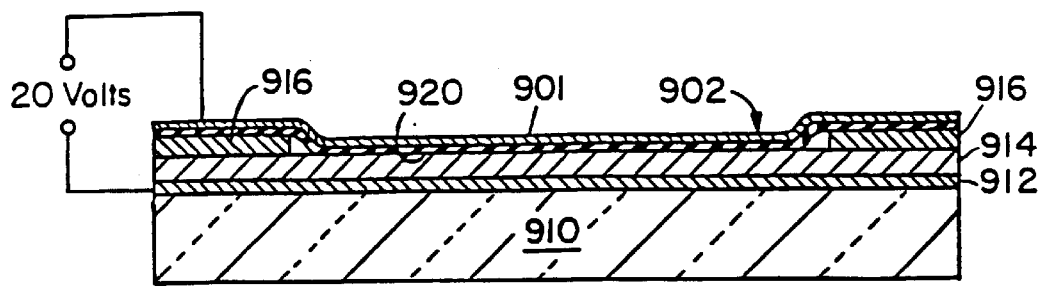
Figure 28A:
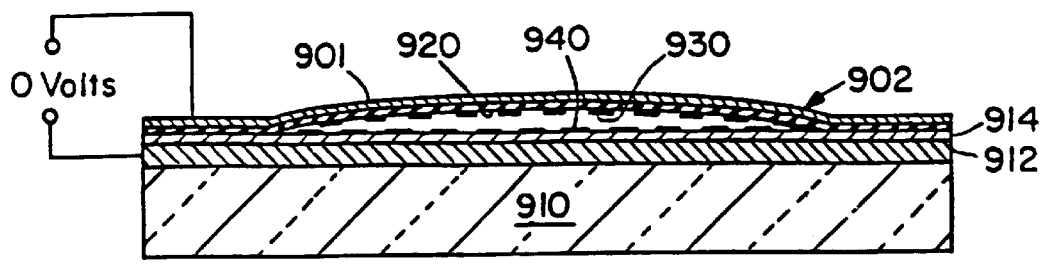
FIGS. 28(a) and 28(b) show an alternate embodiment of a DMS in the Off and On positions, respectively.
Figure 28B:
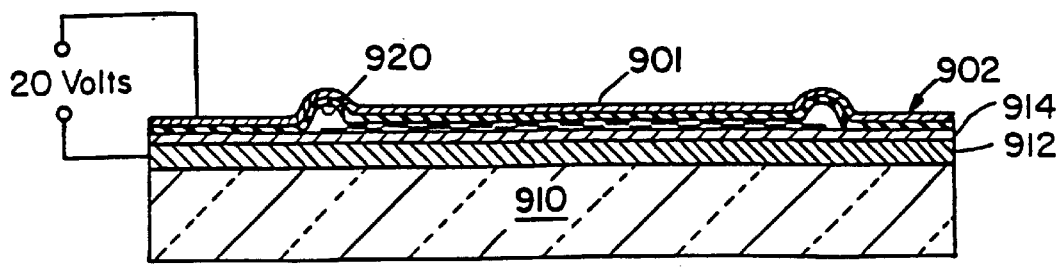

An alternate embodiment will now be described in connection with FIGS. 27(a) and 27(b) which shows a deformable membrane switch (DMS) 900 operating in the reflective mode in schematic cross-section form. A membrane 902 is shown curved upward in the "up" position. Membrane 902 is formed of a transparent conductor 901 disposed on top of an insulator 920 and bonded at its two lateral edges to an optional insulator support 916. Support 916 is disposed on insulator 914 which is formed on opaque conducting layer 912, deposited on glass substrate 910. In this "up" position, membrane 902 can be made to look white or the color of conductor layer 912 when viewed from above. In FIG. 27(b), a voltage i.e. 20 volts is applied across the electrodes 902 and 912 causing most of the membrane 902 to lie flat against the insulating layer 914 and look blue or black from the top because electrode 902 forms an antireflection coating on the opaque conducting layer 912. Membrane electrode 902 is biased in the upward position by anisotropic stress or anisotropic stiffening using the principles set forth previously with respect to the coilable electrode. As with the previous embodiments, the operation of the deformable membrane switch 900 depends on a voltage applied to two electrodes. One electrode is the membrane 902, the other is the conducting layer 912. Starting with zero volts applied the membrane is in the "up" position and has an upward curvature due to the stresses or stiffening built into the membrane film or because it was fabricated with that shape. When the voltage is above the turn-on thresholds the membrane moves down into contact with the insulating surface 914. Once the membrane is in the down position, the voltage can be lowered and the membrane 902 will remain in the "down" position, as long as the voltage remains above the turn-off threshold. As with the previous embodiments, the DMS is a bistable device. This device can also be used in the transparent mode with a transparent substrate where the motion of the membrane causes a change in color due to dielectric constant differences and interference effects. A second version is shown in FIGS. 28(a) and 28(b). In this version, the device can be illuminated from the back. An array of opaque stripes 940 is formed on insulator 914 on a transparent lower electrode 912 and a second array of opaque stripes 930 is formed on the moveable electrode 902. The arrays are staggered so that the stripes on the upper electrode 902 fit in the gaps of the lower electrode 912. With the membrane 902 in the up position, light can pass through the valve by diffraction and reflection through the slits, and with the membrane in the lower position, light is substantially blocked. The membrane 902 and other elements of the DMS may be formed of materials and using processes previously described in connection with the ELVD embodiments.

DRY ROLL-UP PROCESS FOR FORMING ELVD

Referring now to plan views FIGS. 29(x) and 29(y) and sectional views FIGS. 29(a)–29(t), an alternative dry roll-up process for fabricating an array of electrostatic light valves for an ELVD will be described in detail. Note: For simplicity, fabrication of only a single ELVD is shown in these figures. It should also be understood that a linear or two dimensional array can be made in the same manner. In step 1 [FIG. 29(x)], a transparent layer coating 12 of, for example, indium tin oxide (ITO) is formed to a thickness of about 2000 Å on a suitable substrate 10, made, for example, of glass. Next, the structure of FIG. 29(x) is overcoated with photoresist (not shown) which is patterned using a conventional lithography process. The exposed ITO 12 is then etched using the photoresist as a mask. The resist is then removed leaving a lower fixed electrode 10(a) separated by strips from adjacent fixed electrodes, as shown in FIG. 29(x).

Figure 29A:
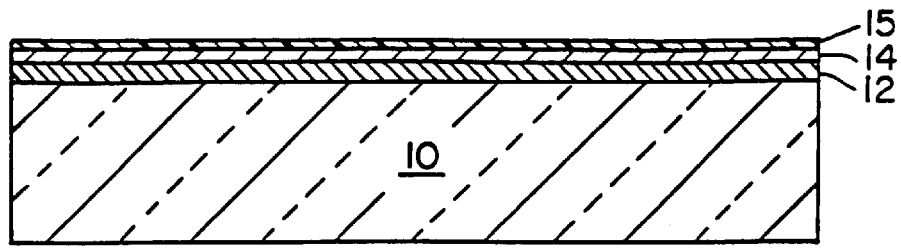
FIGS. 29(a)–29(l) are a series of schematic cross-sectional views showing key steps in the fabrication of another alternate embodiment of the invention.
Figure 29B:
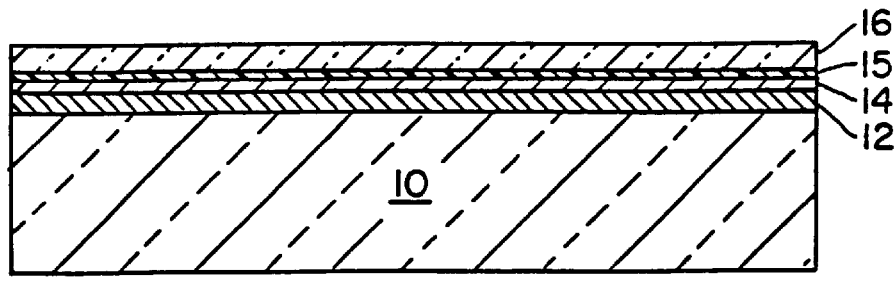
Figure 29C:
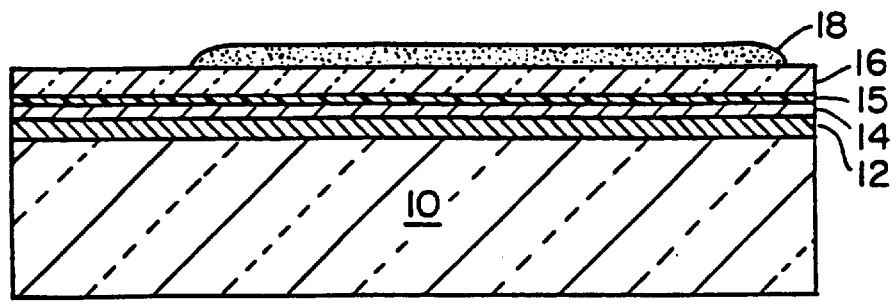
Figure 29D:
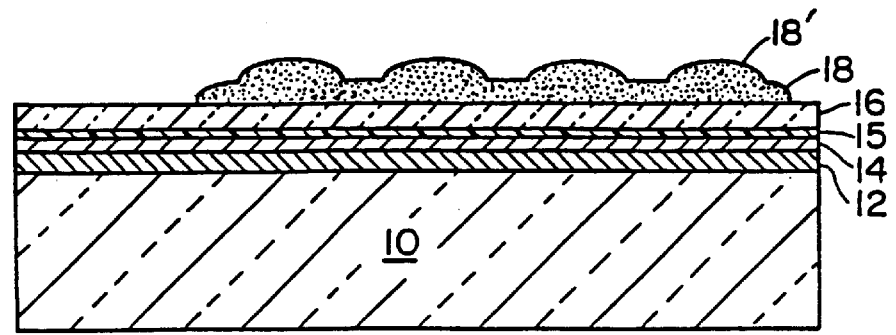
Figure 29E:
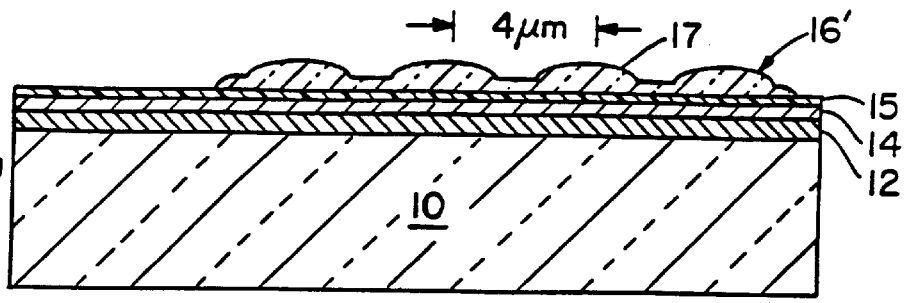
Figure 29F:
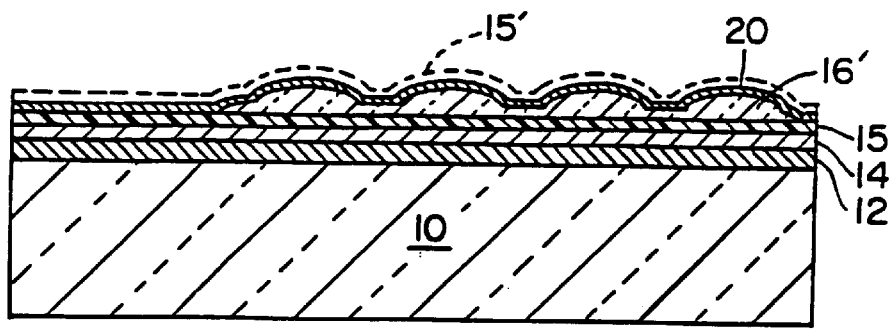
Figure 29G:
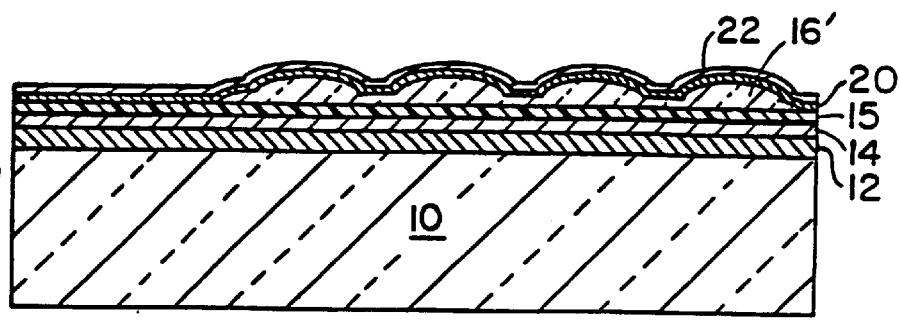
Figure 29H:
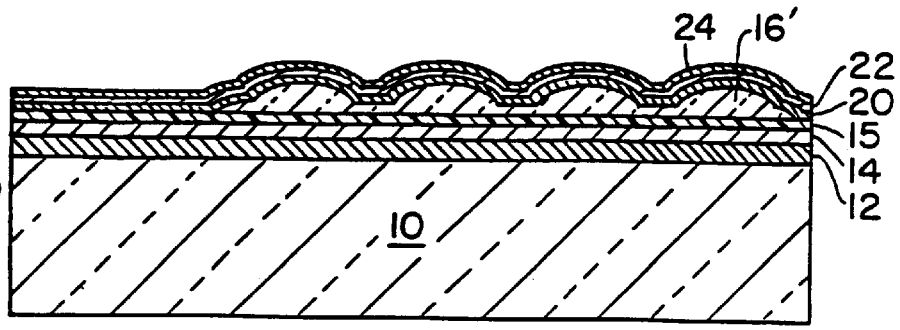
Figure 29I:
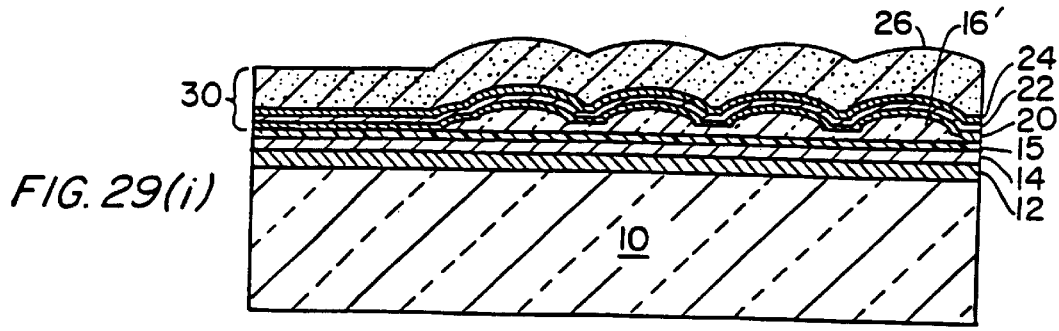
Figure 29J:
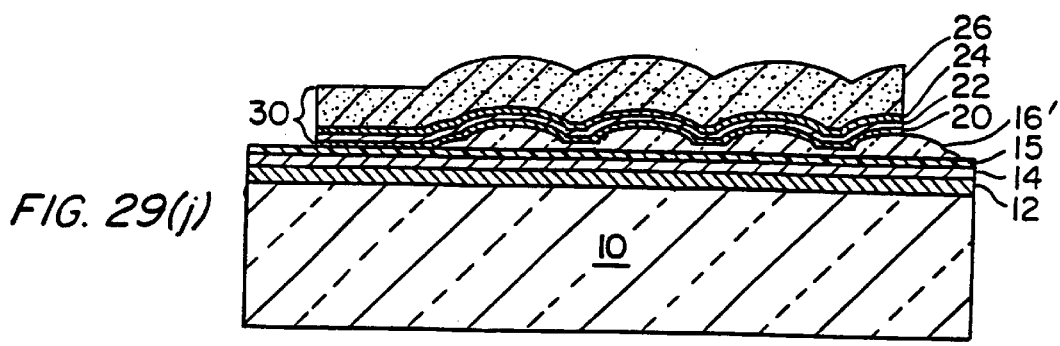
Figure 29K:
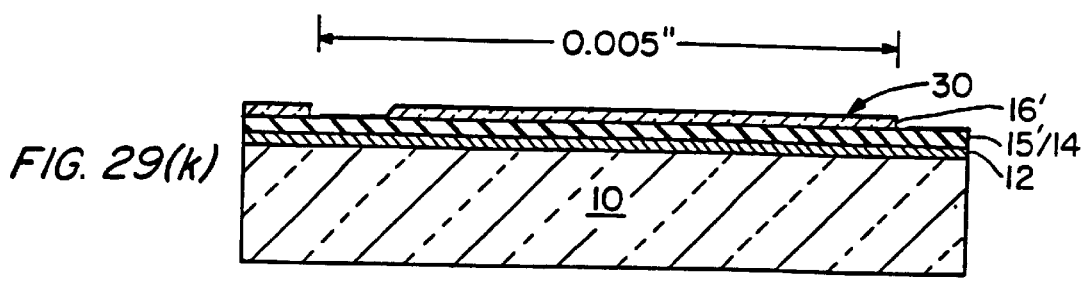
Figure 29L:
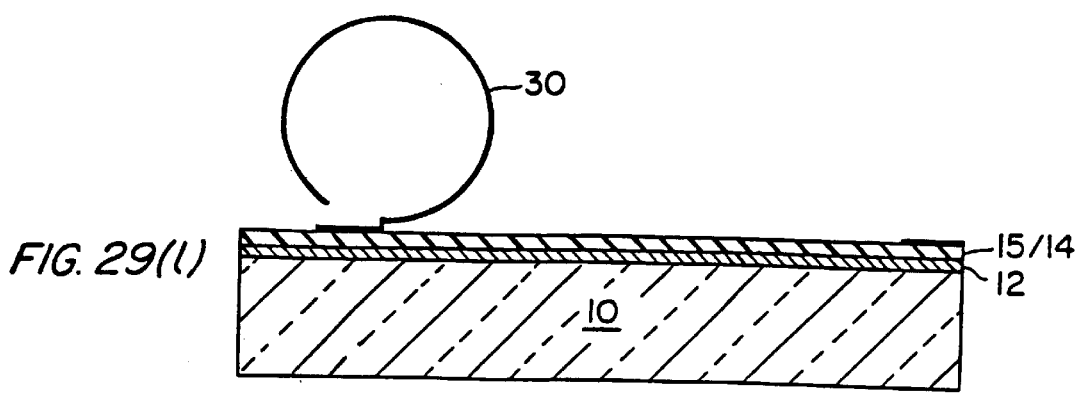
Figure 29X:
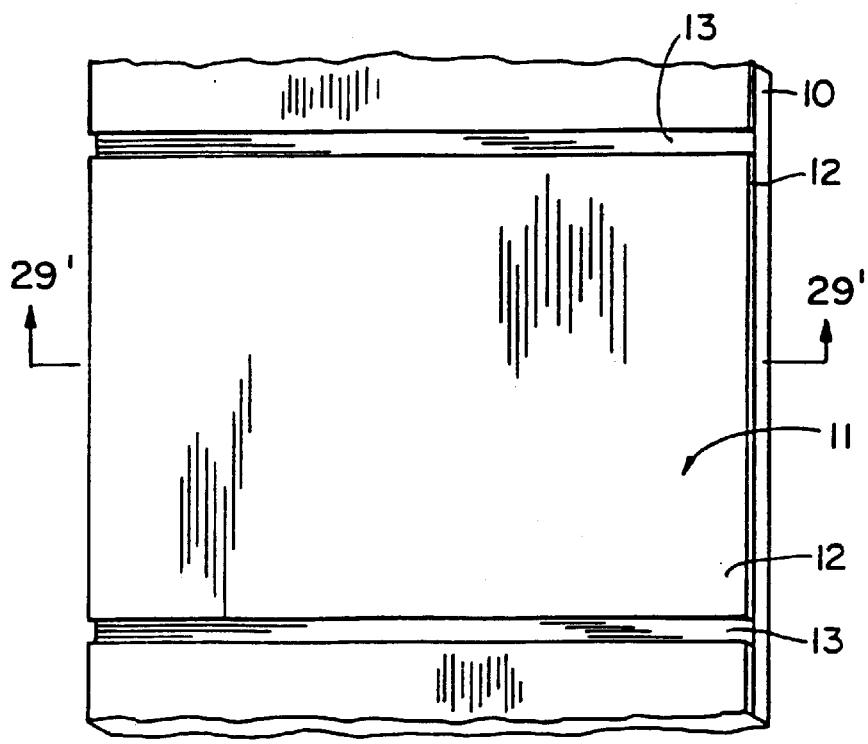
Figure 29Y:
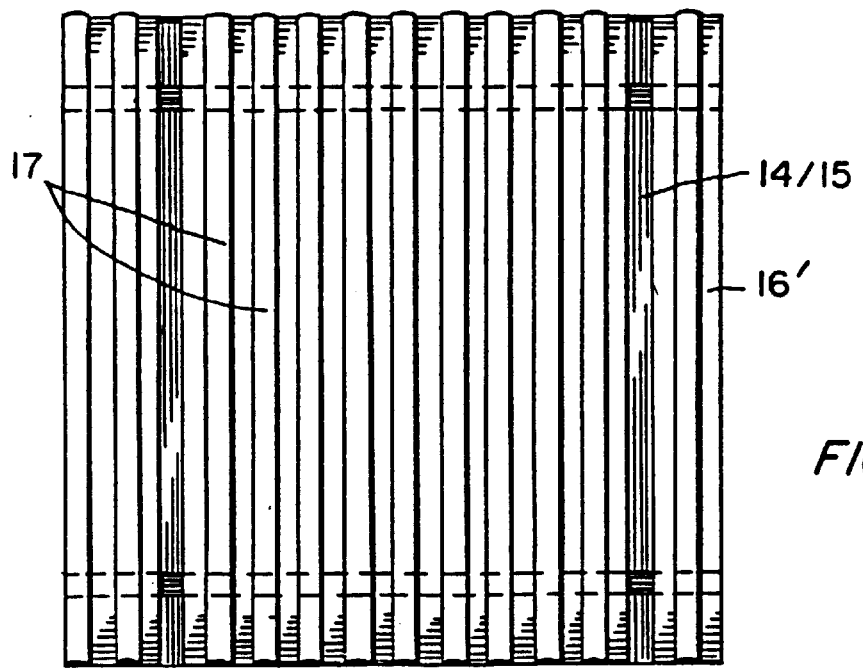

Next, as shown in FIG. 29(a) which is a section taken through lines 29'—29' of FIG. 29(x), an insulator layer 14 of, for example, aluminum oxide ($Al_2O_3$) is formed over the ITO coating 12 to a thickness of about 2000 Å. An optional thin layer of polytetrafluoroethylene (PTFE) may be formed over layer 14 to enhance inner stress and to lower adhesion.

The purpose of the PTFE layer is to control adhesion forces which, in turn, controls the bistability, as described earlier. One could substitute other materials for the PTFE to achieve the desired adhesion level.

As shown in FIG. 29(b), a release layer 16 comprised of material, such as silicon or germanium which is susceptible to preferential dry etching is formed over the insulator layers 14/15. The thickness of layer 16 will depend upon the design parameters of the light valve, but a thickness of about 5000 Å is normal.

Figure 1B:
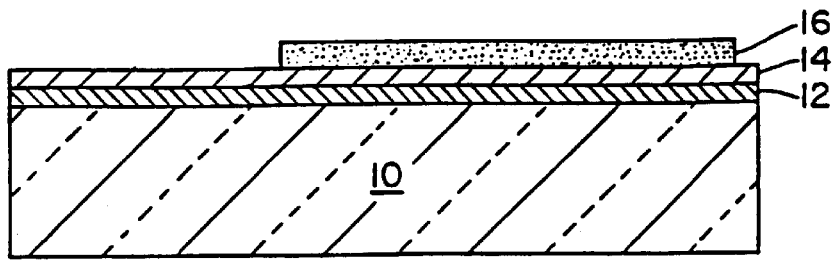
Figure 1C:
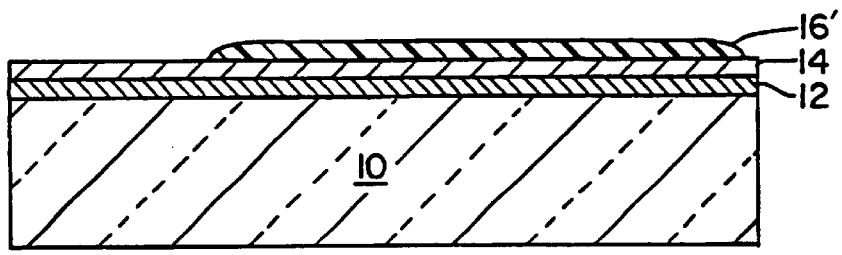
Figure 1D:
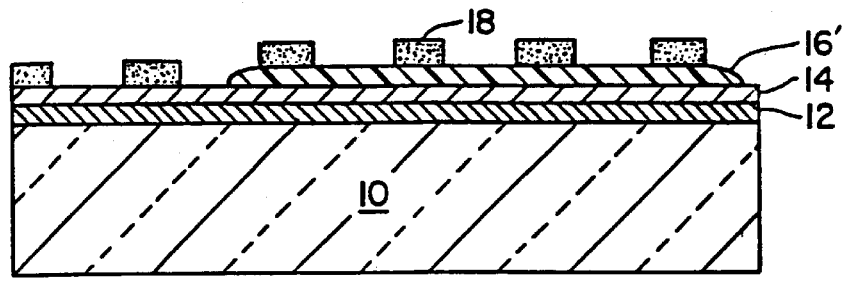
Figure 1E:
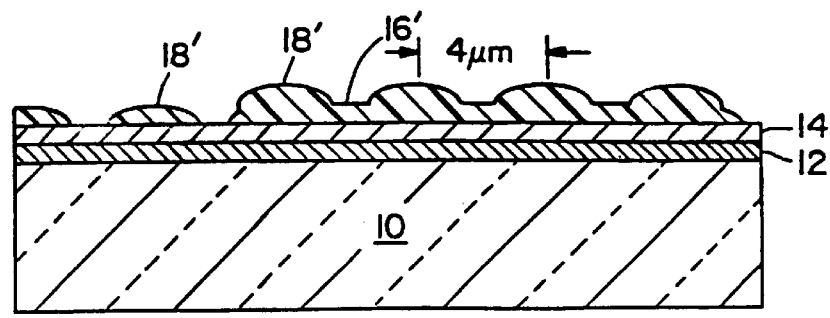
Figure 1F:
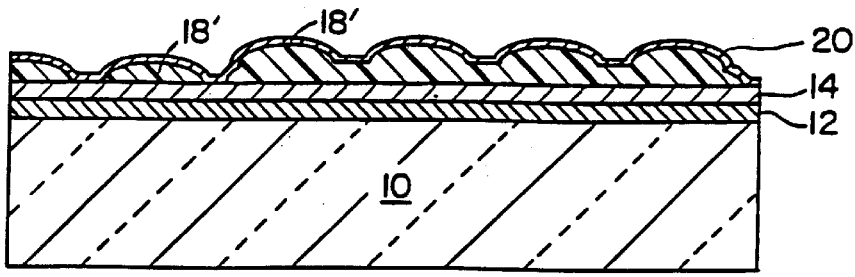
Figure 1G:
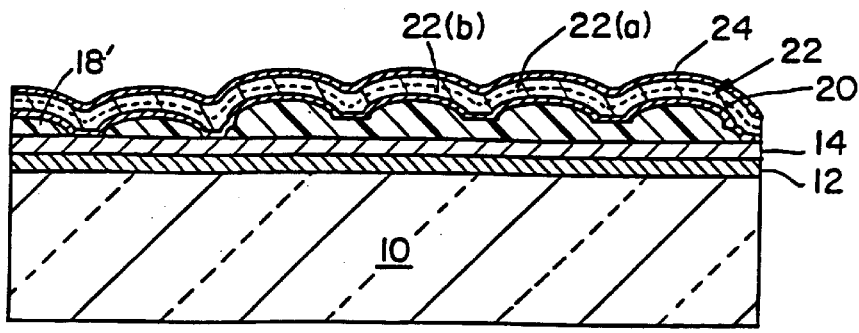
Figure 1H:
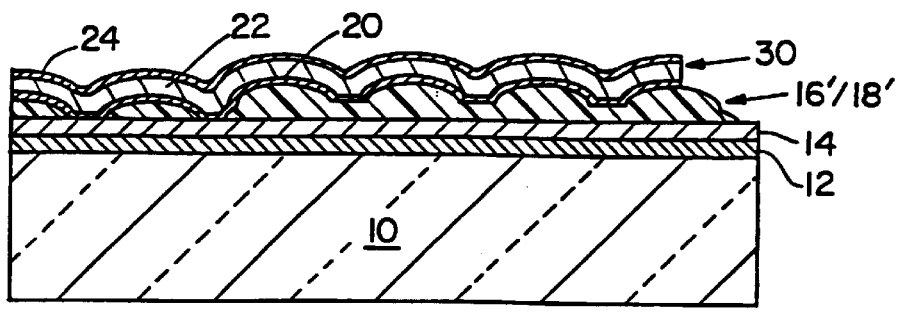
Figure 1I:
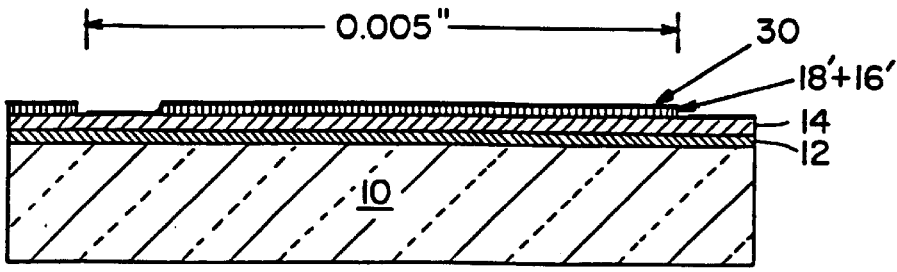
Figure 1J:
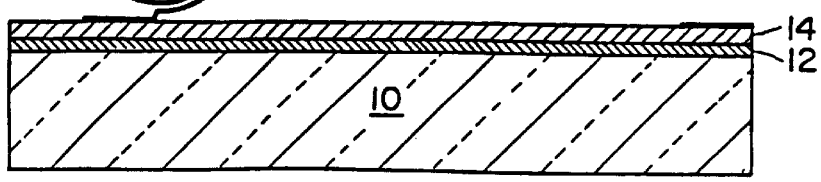

In step 3 [FIG. 29(c)], a photoresist pattern 18 of the type described in connection with FIG. 1(b) is formed over layer 16 using conventional methods. Pattern 18 is used as a mask to define the release areas. This resist pattern 18 is baked at about 170° C. Then a second layer 18' is patterned in the shape of a grating over the first resist area 18.

In step 5 [FIG. 29(e)], the sample is placed in a reactive ion etcher where conditions are established such that the photoresist regions 18/18' are etched at about the same rate or a little faster than the silicon layer 16. For example, using a $CF_4$ gas at 10 millitorr at an etching voltage of 500 volts, reproduces the photoresist profile in the remaining silicon layer 16' to form rounded corrugations 17. It is desirable to have the rounded shapes of the baked photoresist to minimize high stress lines in the resulting moveable electrode. A top view of the structure of FIG. 29(e) is shown in FIG. 29(y).

In step 6 [FIG. 29(f)], the wafer is coated with an optional layer 15' of PTFE, which for simplicity is shown only in FIG. 29(f). Once again, the purpose of the PTFE is to control adhesion forces to control the bistability as described earlier.

One could substitute other materials for PTFE to achieve the desired adhesion level. The wafer is then coated with aluminum oxide about 300 Å thick having compressive stress. A compressive stress aluminum oxide coating is achieved by sputtering using an aluminum oxide target. Compressive stress occurs under normal sputtering conditions when the material is sputtered using Argon as the sputtering gas at 10 Mtorr pressure, 100 watts power using a 5" target. This is followed, in step 7 [FIG. 29(g)], by a low-stress layer 22 of aluminum having stress much lower than the aluminum oxide. In step 8 [FIG. 29(h)], a second layer 24 of aluminum oxide is formed to about 300 Å having tensile stress. Tensile stress is achieved by adding a little oxygen under the same conditions. Test runs with evaluations of the stress can be used to establish the proper conditions for achieving the correct stress in the coating process using, for example, sputtering or evaporation. The stress measurement procedure is given in "The Measurement of Internal Stress in Electrodeposits", D. R. Cook and J. M. West, *Transactions of the Institute of Metal Finishing*, 1963, Vol. 40. One of the goals of establishing correct stress in the deposited layers is to provide a symmetrical structure, so that temperature changes will have minimal effect on the roll size. Since the aluminum expands at $20 \times 10^{-6}/°$ C. versus around $6 \times 10^{-6}/°$ C. for aluminum oxide, the internal stress of the moveable electrode will vary with temperature. However, since there are equal thicknesses of aluminum oxide on both sides of the aluminum layer, temperature changes will not cause the coiled electrode to roll out or up.

Preferably, the top surface should be opaque or black and the bottom surface reflective, therefore, an additional layer 26 is provided at this point [FIG. 29(i)] to produce a black surface. Layer 26 may be comprised of carbon black containing very fine particles, less than 1500 Å in diameter, which can be made into a dispersion in a solvent and resin. This can be used as a coating which is spun on like photoresist, or sprayed on. The material is very flexible having a low Young's modulus. Therefore, as long as it is not too thick, it will not have a significant effect on the mechanical properties of the moveable electrode.

At this point, the moveable electrode 30, formed of layers 20,22,24 and 26, may be patterned using photoresist as a mask and using a combination of reactive ion etching for the carbon black layer 26 and the aluminum oxide layers 20 and 24 by chemical etching the aluminum layer 22. The optional PTFE layer 15' may be removed by Reactive Ion Etching (RIE). The wafer is then placed in a plasma etching system in a fluorine or halide bearing gas. The halogen gas, without the plasma, can also be used to etch away the silicon, releasing the moveable electrode 30. The patterned FIG. 29(j) structure is shown in the top view of FIG. 29(z) before the electrode has coiled and after coiling in the top view FIGS. 29(z'). FIG. 29(j) is a section taken along lines 29"—29" of FIG. 29(z). FIGS. 29(k) and 29(l) are side-views as in FIG. 29(j) in an enlarged scale and schematic form showing the completed electrode structure before the silicon release layer 16' is removed (FIG. 29k) and after the silicon release layer 16' is removed (FIG. 29l).

LOW COST SHUTTER FABRICATION

Figure 30A:
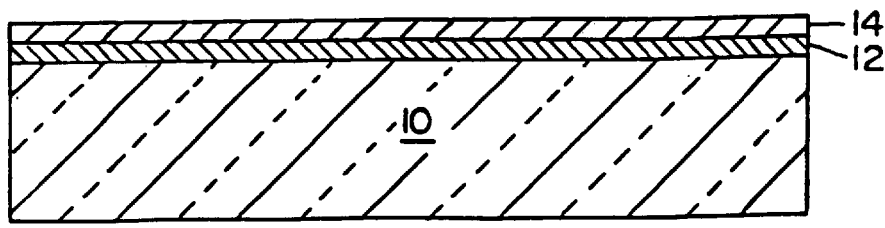
FIGS. 30(a)–30(j) and FIGS. 30(l)–30(o) are a series of cross-sectional views of the main steps in fabrication of a low cost embodiment of an ELVD of the invention.
Figure 30B:
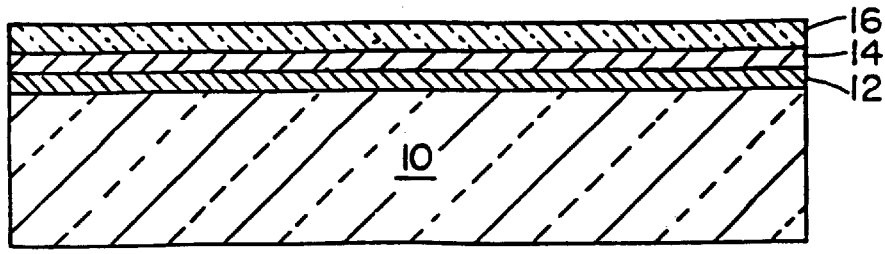
Figure 30C:
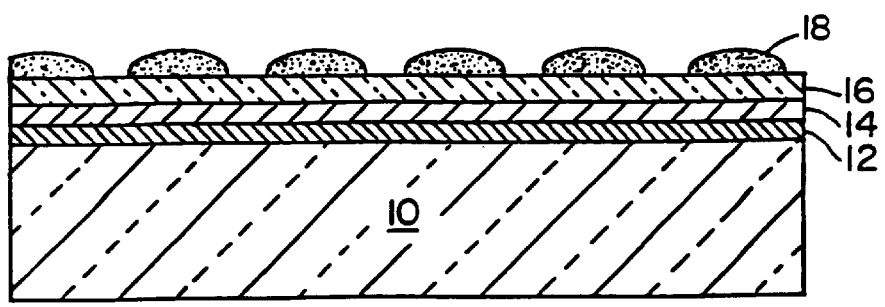

Next, a low cost method of shutter fabrication will be described with the aid of FIGS. 30(a)–30(p) and FIGS. 36(a) and 36(b). In this process, we begin with a transparent substrate 10, upon which is formed successively a conductive, transparent electrode film 12 (e.g., ITO), an insulator film 14 (e.g., aluminum oxide) [FIG. 30(z)]. A release layer 16 of silicon is formed on the insulator 14 FIG. 30(b). In FIG. 30(c) a resist layer is formed on the release layer 16 and patterned into a grating 18 which will be used to produce corrugations in the surface of the silicon layer 16.

Figure 30D:
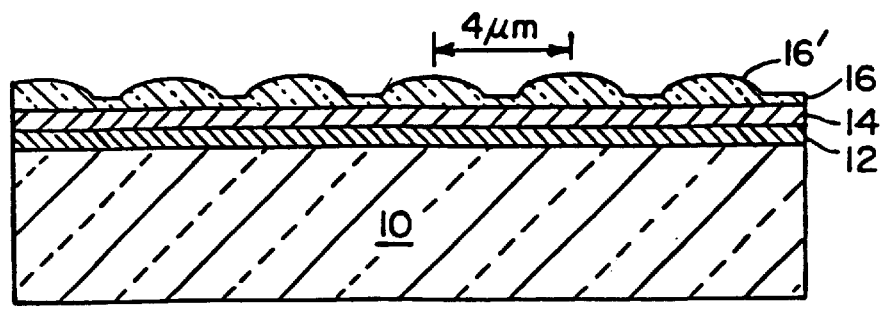
Figure 30E:
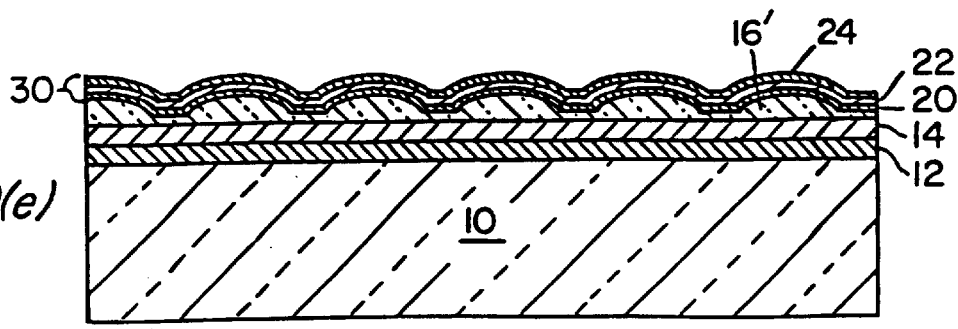

In FIG. 30(d) the sample is placed in a Reactive Ion Etch (RIE) chamber and etched in CF4 gas until the resist is barely etched away leaving silicon corrugations 16' formed in the silicon layer but without penetrating through the layer 16. In FIG. 30(e) the sample is coated with successive layers of aluminum oxide 20, aluminum 22 and aluminum oxide 24 as described in the previous embodiment. These three layers contain the necessary stress to form an electrostatically rotatable shutter 30 when released from the substrate.

Figure 30F:
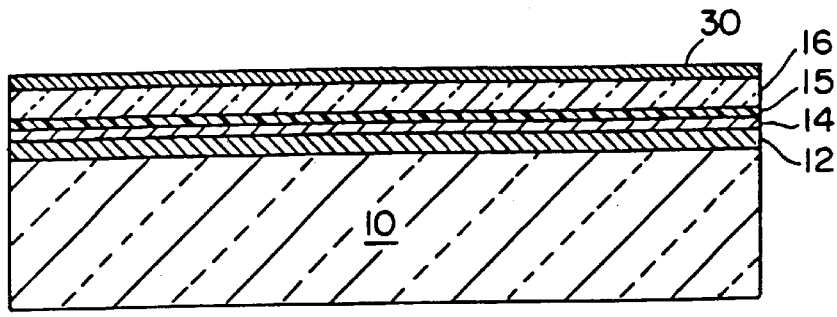

FIG. 30(f) is the same as FIG. 30(e) except that the shutter 30 has been shown in simplified form as an integral structure with the addition of optional layer 15 as described in the previous embodiment.

Next, the structure of FIG. 30(f) is patterned with photoresist 34 to form stripes only, for the column address lines. If only stripes are required to be patterned, a very low cost lithography tool can be used, such as a scanned laser, or laser holography method, instead of the more conventional and very expensive mask aligned or stepper method required for forming more complex patterns.

Figure 30G:
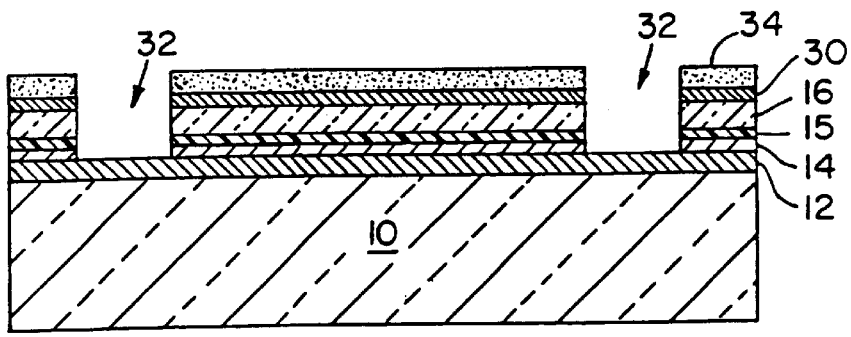

As shown in FIG. 30(g), stripes or grooves 32 for the column address lines are formed by etching through to the ITO layer 12 using a combination of RIE and chemical etch using photoresist 34 as the mask.

Figure 30H:
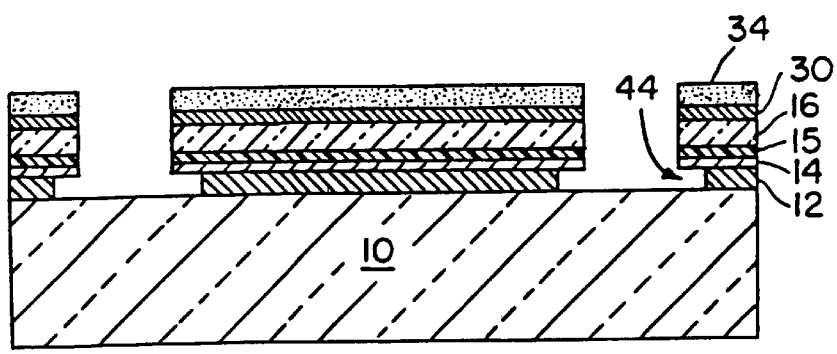

In the next step [FIG. 30(h)], the ITO is etched so that it undercuts at 44 the silicon dioxide. The reason for this is that in the next step ([FIG. 30(i)], a black or opaque layer 40 is formed in the opening where the ITO was removed and the black layer is almost always somewhat electrically conducting. By undercutting at 44 an insulating gap is provided to insulate between the column address lines and the black layer.

Figure 30I:
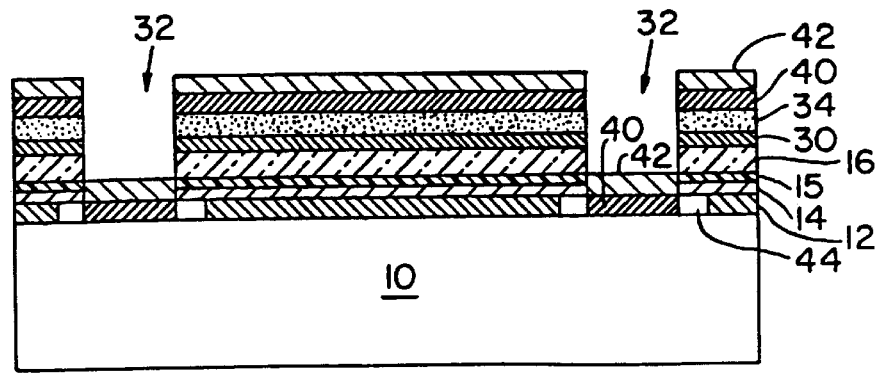

In the step shown in FIG. 30(i), the wafer is placed in a vacuum evaporator and chromium is evaporated in the presence of oxygen which yields a cermet layer 40 which is black or has a dark gray appearance. The chromium must be evaporated so that the evaporating beam is fairly well collimated perpendicular to the sample in the direction side-to-side relative to the sample shown in FIG. 30(k). This can be accomplished by keeping the sample perpendicular to the beam and evaporating through a slit parallel to the slots 32 etched in the sample. An aluminum oxide layer 42 is then evaporated in the same way. The object is to make the overall thickness of these two films 40/42 about the same as the overall thickness of the original underlying ITO and aluminum oxide films 12/14 plus optional layer 15. There will inevitably be a small amount of deposition on the side walls of the slots 32 which can be removed in a short wet chemical or gas cleanup etch.

Figure 30J:
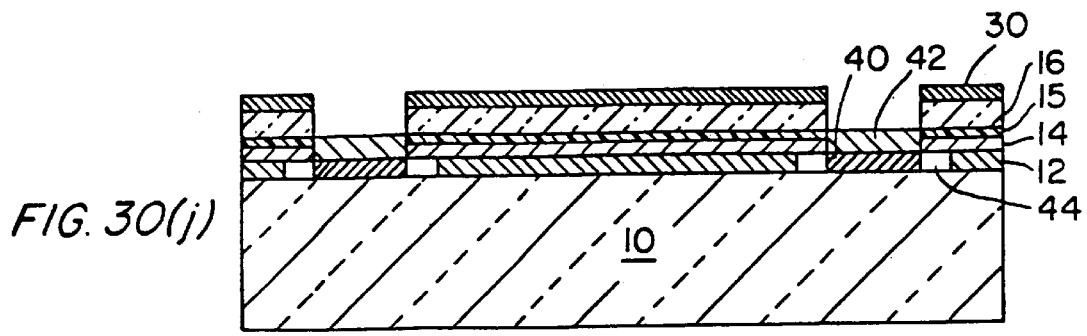

Next [FIG. 30(j)], the photoresist layer 34 is dissolved in a photoresist stripper. The photoresist 34 therefore forms a release layer for the metal on top of it which is not needed on the final product.

Figure 30K:
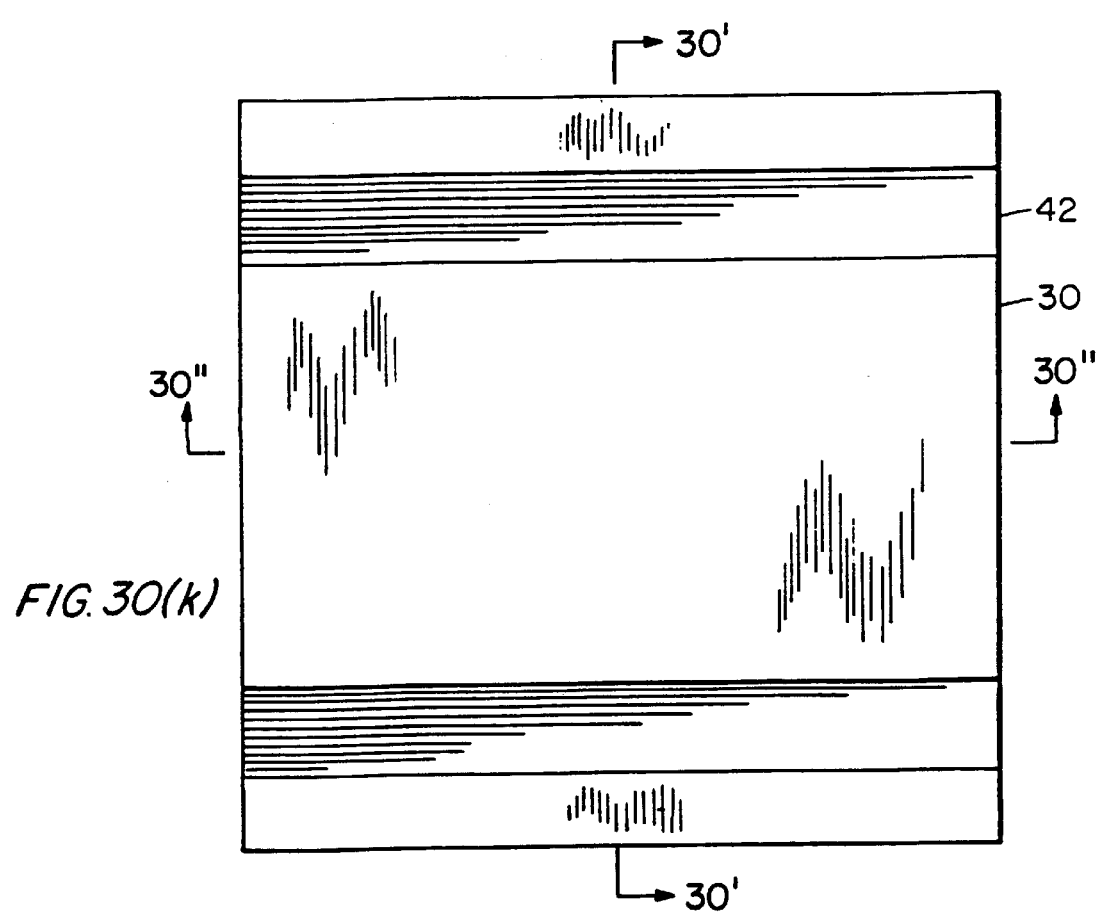
FIGS. 30(k) and 30(p) are plan views of the cross-sectional views of FIGS. 30(j) and 30(o), respectively.
Figure 30L:
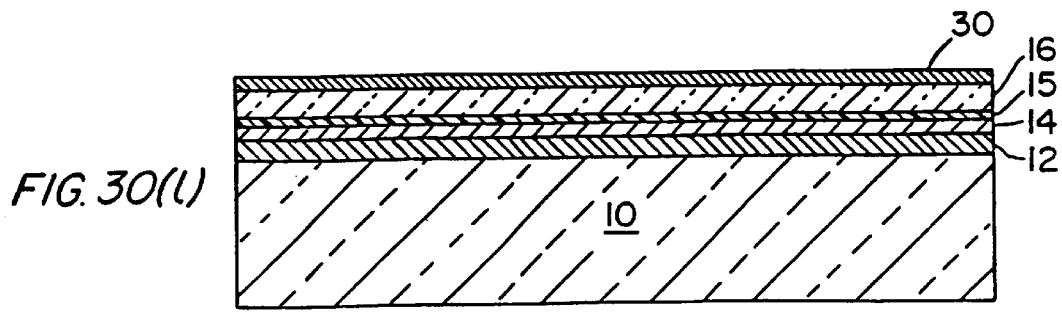
Figure 30M:
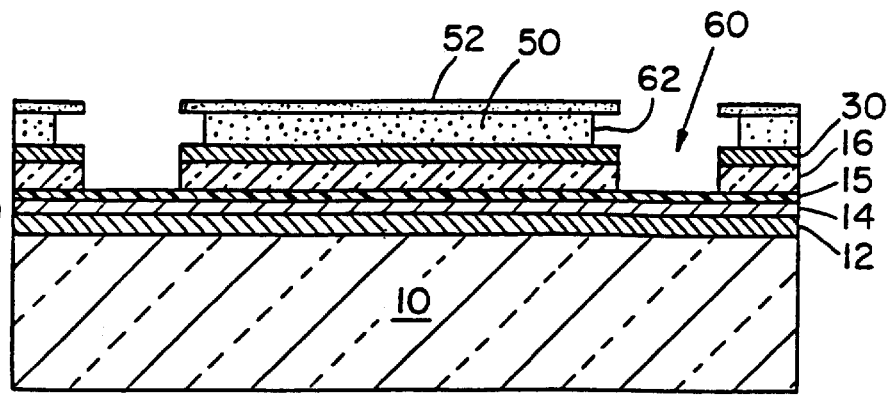

At this stage, the column patterning of the ITO layer 12 and the moveable electrode 30 is complete, as shown in the top view of FIG. 30(k) and the sectional views along line 30'—30' of FIGS. 30(d) and 30(j). The row address lines can now be formed as illustrated by the 30"—30" cross-section of FIG. 30(l) and 30(m). In the step of FIG. 30(m), two resist layers 50 and 52 are formed in such a way that the lower layer 50 is undercut 62 relative to the top layer. Such a double layer could be formed, for example, by an Az 1370 photoresist on top of PMMA. One could also use a patterned metal layer on top of a photoresist layer. The purpose of this double layer is to provide an undercut required for lift-off later, after shadow evaporation in the next step. This multiple resist layer 50/52 is then used as the etch mask to etch through the movable electrode layer layer 30 and the silicon layer 16, stopping at the PTFE 15 or aluminum oxide layer 14 to form row grooves 60.

Figure 30N:
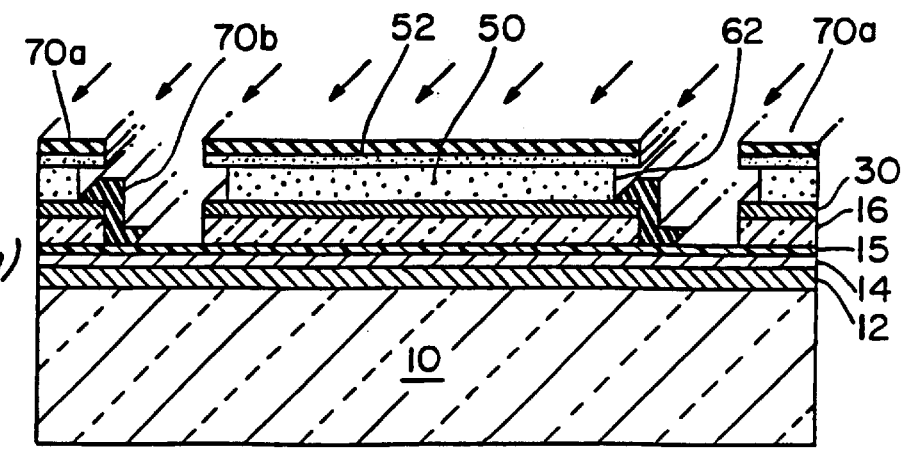

Next, as shown in FIG. 30(n), the wafer is again placed in a vacuum evaporator and aluminum is evaporated at an angle this time where the evaporant beam is collimated as before to form aluminum regions 70a and 70b. The thickness of the aluminum layer is preferably around 2000 Å. The angle evaporation of region 70b provides the electrical connection in the row grooves between shutters and the row lines 80 [FIG. 30(p)] extending to the edge of the sample. The aluminum is also the mechanical support for the coil after it has rolled up. This is significantly different from other embodiments where the shutter coil 30 was attached directly to the substrate insulator.

Figure 30O:
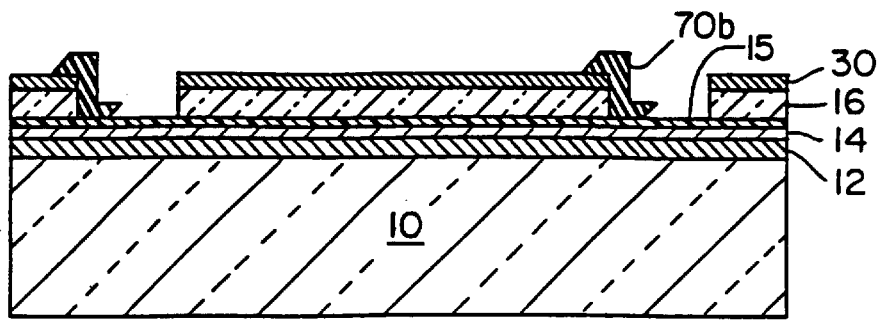
Figure 30P:
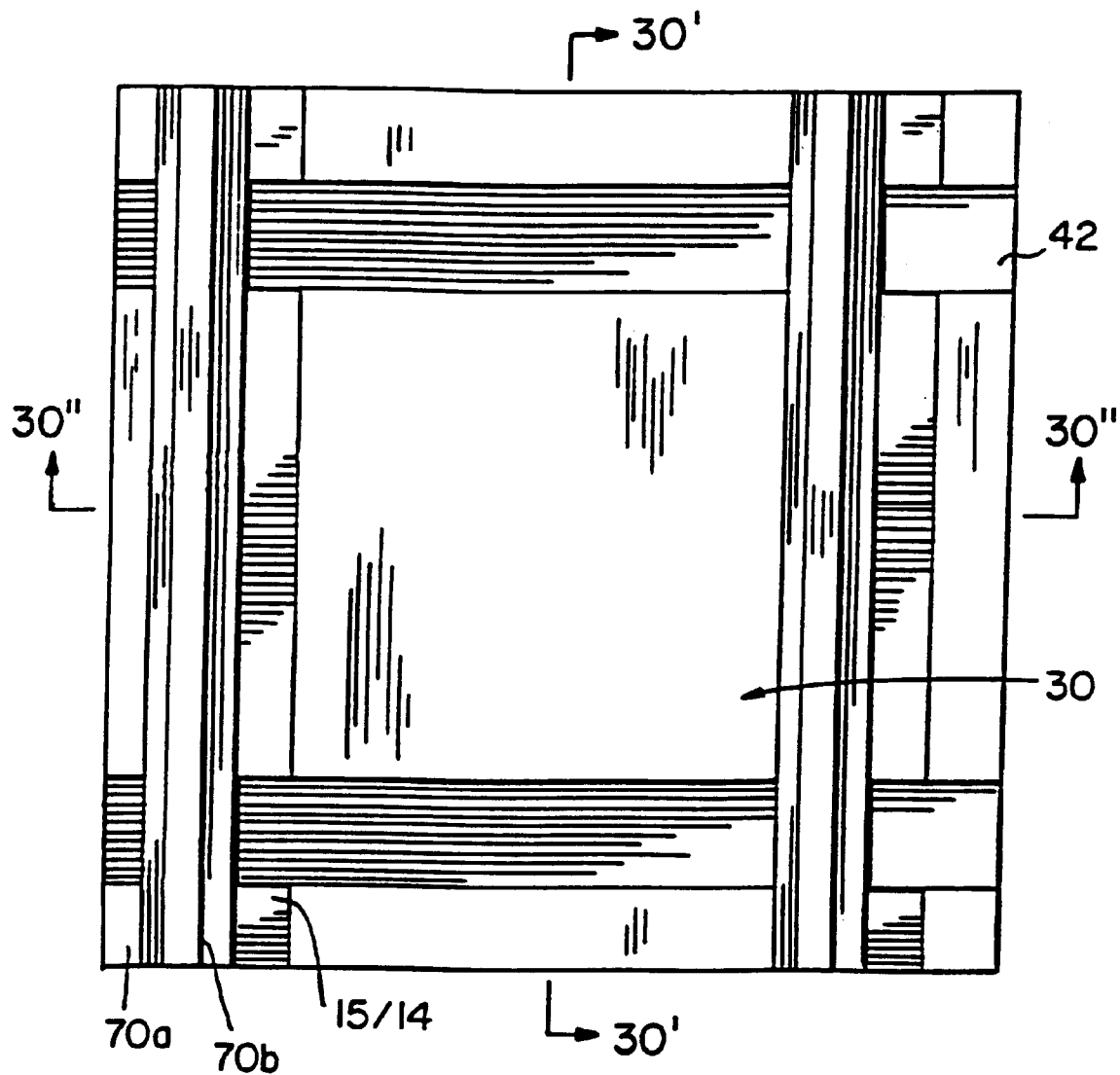

In the step shown in FIG. 30(o), the photoresist 50/52 is dissolved, and since the metal layer 70(a) is discontinuous, as provided by the undercut resist layer 50, the unwanted metal layer 70(a) will float away in the solvent. A top view of the structure to this point is shown in FIG. 30(p).

The wafer is now ready for a fluorine etch to remove the underlying silicon 16 [FIG. 30(o)] which will allow the moveable electrode 30 to roll up.

Figure 36A:
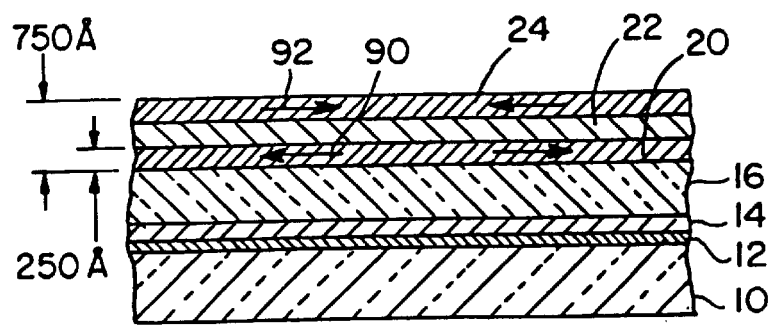
FIGS. 36(a) and 36(b) are enlarged partial sectional views of an ELVD taken after film deposit before release [FIG. 36(a)] and after release [FIG. 36(b)].
Figure 36B:
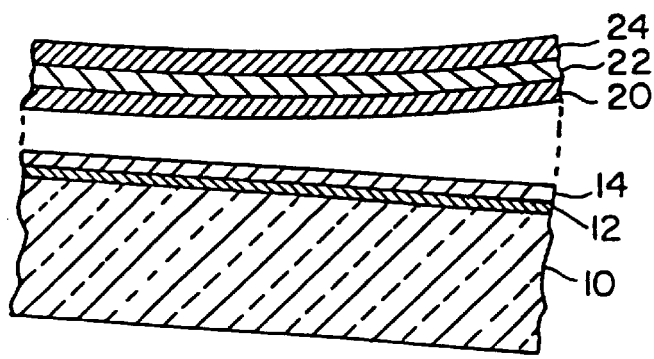

It should be noted that the shutter or moveable electrode 30 formed in FIGS. 29(a)–29(l) and 30(a)–30(f), differs from previous embodiments in that the electrode 30 is of three layer construction having alternating materials. As shown in FIG. 36(a) [before release] and 36(b) [after release], electrode 30 is formed of a first (lower) compressive insulative layer 20 (as indicated by arrows 90), a second intermediate metallic layer 22 having low or zero stress and a third (upper) insulative layer 24 formed with tensile stress (as indicated by the arrows 92). The structure of moveable electrode 30 has several advantages over previous embodiments. The net degree of stress in the composite/laminated structure 30 is easier to control, the tri-level electrode can be made more optically dense and more flexible. Also, as will be shown below, it can be fabricated by a low temperature process.

PROCESS FOR FABRICATION OF ELVD SHUTTERS USING FREEZE DRYING

In this section, an alternate low temperature method of shutter fabrication will be described with the aid of FIG. 31(a)–FIG. 31(i). In this process, we begin with a glass substrate, as was described above, having an ITO layer 12 forming a transparent fixed electrode. Stripes are etched as described in previous embodiments. An insulator layer 14 followed by an optional PTFE layer 15 (shown only in FIG. 31(a) for simplification). In this example, silicon dioxide is for the insulating layer 14. Polished ceramic could be used as the substrate 10 instead of glass.

Figure 31A:
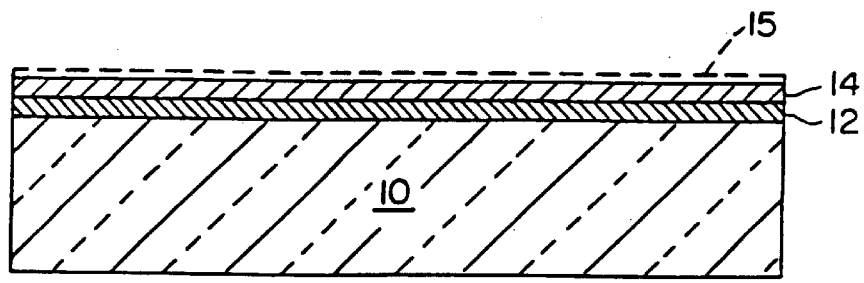
FIGS. 31(a)–31(i) are a series of schematic cross-sectional views showing key steps in the fabrication of shutters for ELVD's using a freeze drying process.
Figure 31B:
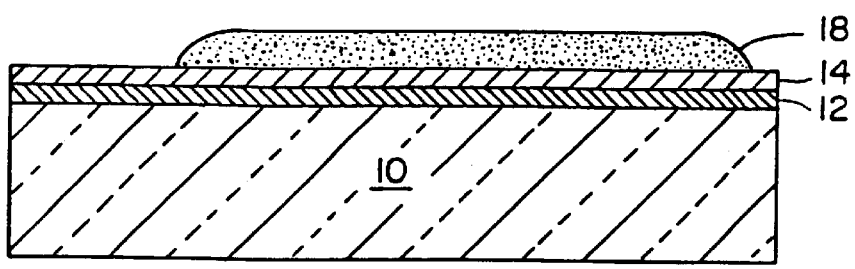
Figure 31C:
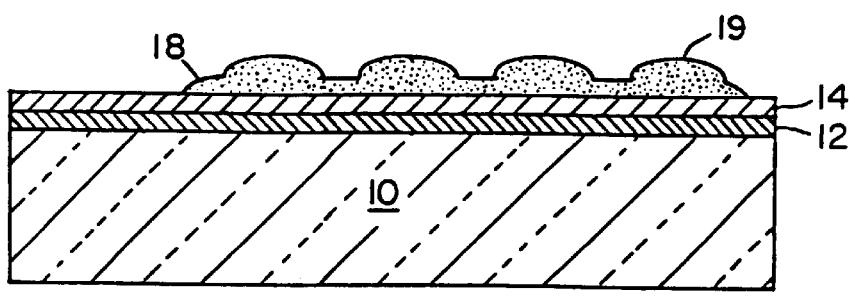

A pattern of photoresist is used to provide a release layer 18 ([FIG. 31(b)]. The resist is double-exposed, as shown in FIG. 31(c), to provide a corrugated electrode structure 19. The first exposure provides the release pattern and the second exposure, which is made through a 4 μm grating, is a much lighter exposure. When combined with a carefully controlled development, the photoresist can be removed in the areas exposed to light, but only half-way through the resist. This procedure results in the corrugations 19 shown in the resist layer 18. Also, the resist is baked at lower temperatures of about 120° C., so that it will still be soluble in a solvent, such as acetone.

Figure 31D:
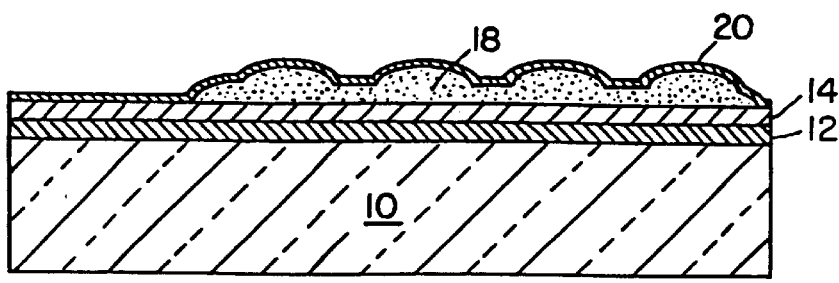

In FIG. 31(d), the wafer surface is coated with an optional layer of PTFE (not shown) which can be provided using sputtering. Then a first coating of silicon dioxide is formed to provide an insulative layer 20 having a thickness of around 300 Å and having a compressive stress. As before, test runs with evaluations of the stress can be used to establish the proper conditions for achieving the correct stress in the coating process using, for example, sputtering or evaporation.

Figure 31E:
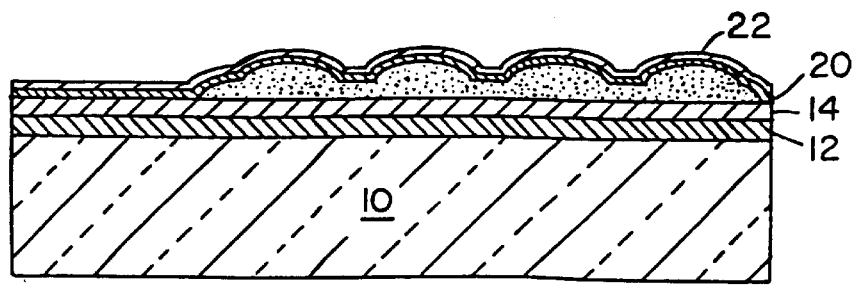

In FIG. 31(e), a coating 22 of aluminum having low stress is formed using an evaporation or sputtering process.

Figure 31F:
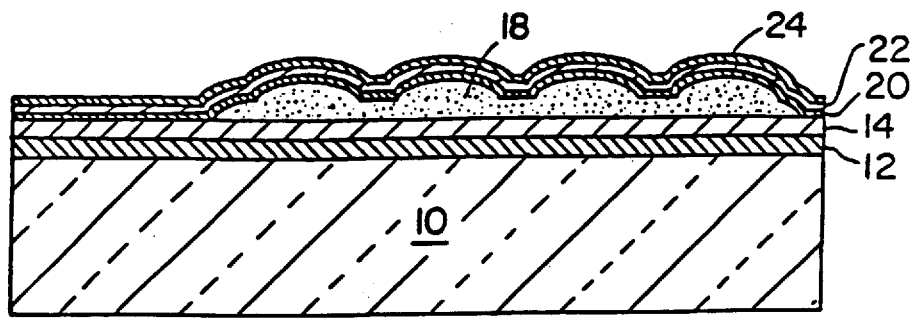

In FIG. 31(f), alternating layers consisting of silicon dioxide and chromium are deposited starting with the silicon dioxide to form a third coating 24. The silicon dioxide is around 100 Å thick, and the chromium is around 50 Å thick. The silicon dioxide in this series of coatings 24 is made to be low stress and the chromium is made to be tensile. The chromium layers are light absorbing and make the surface almost black as in chrome black. The more coatings the darker the color.

Figure 31G:
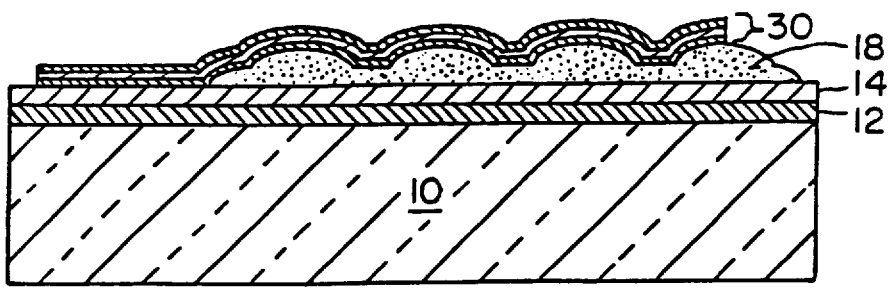

In the next step [FIG. 31(g)] photoresist (not shown), is applied and patterned in the conventional manner in order to provide a mask for etching the resist 18 underlying the shutters 30. The resist 18 can then be etched using a combination of RIE and a wet chemical aluminum etch.

Figure 31H:
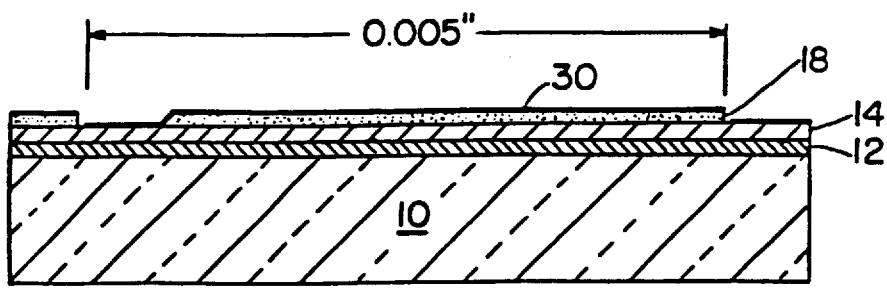
Figure 31I:
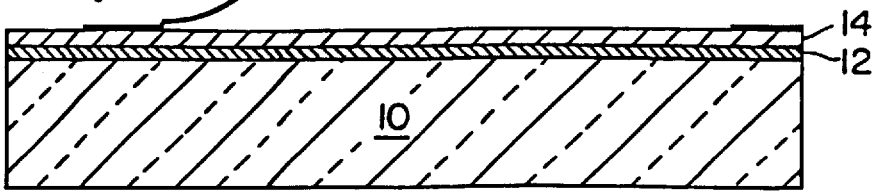

In FIGS. 31(h) and 31(i), the cross-sectional scale has been reduced for simplification. FIG. 31(h) shows the structure before release layer 18 has been removed. FIG. 31(i) shows the structure after the wafer has been placed in acetone to remove the resist whereupon the membranes 30 roll up. The sample is then gently rinsed in water and the sample and the water surrounding the sample is cooled until the water freezes. The wafer, which is now embedded in ice, is held at a temperature of around −10 C and is placed in a vacuum chamber at a pressure of a few Torr with an optional nitrogen flow. The ice evaporates after 15 or 20 minutes which completes the fabrication process. The freezing step is important since it enables the water to evaporate from the solid state so that the surface tension forces of the liquid does not destroy the shutter which otherwise would occur during drying from the liquid state.

HINGED SHUTTER FOR ELVD

Figure 32A:
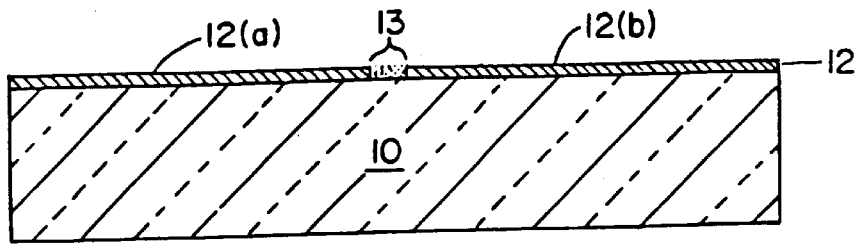
FIGS. 32(a)–32(i) are a series of schematic cross-sectional views showing key steps in the fabrication of a hinged shutter for an ELVD.
Figure 32B:
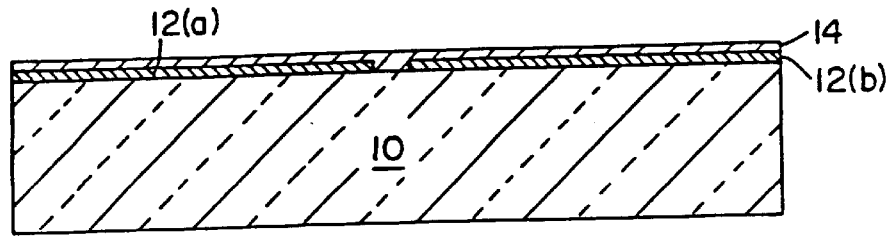
Figure 32C:
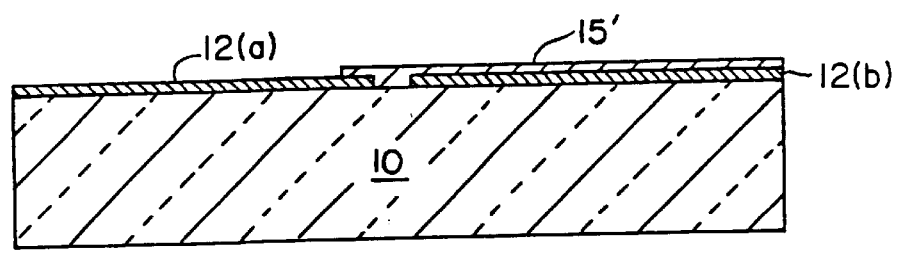
Figure 32D:
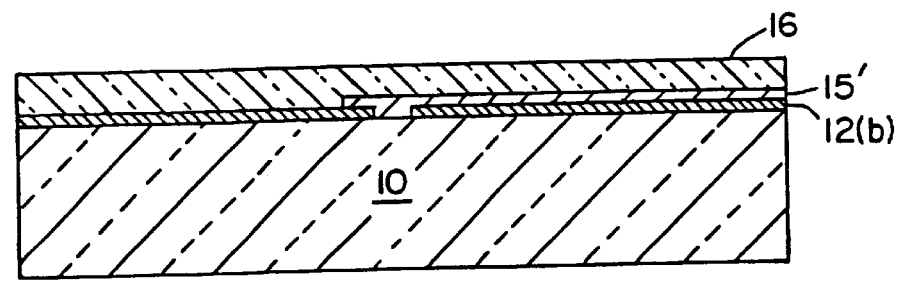
Figure 32E:
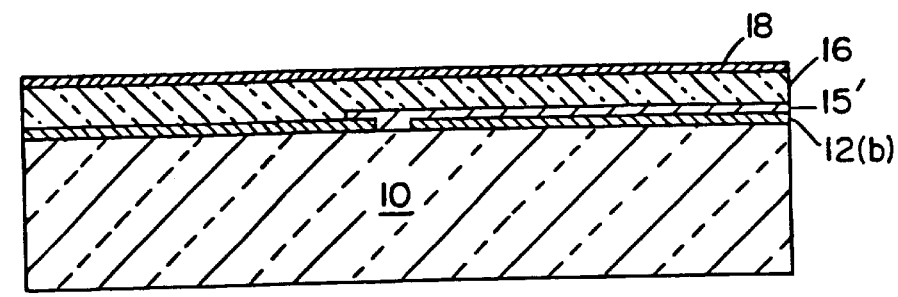
Figure 32F:
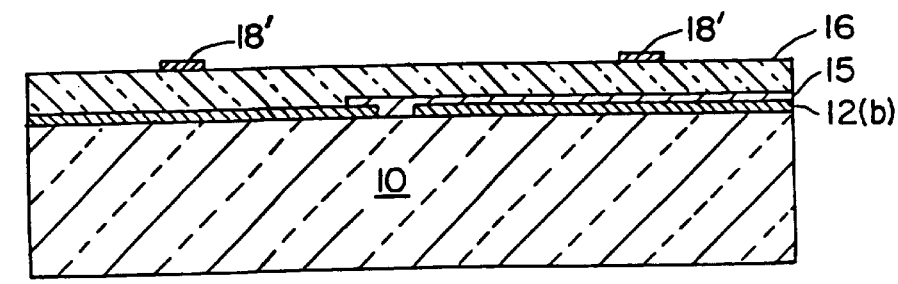
Figure 32G:
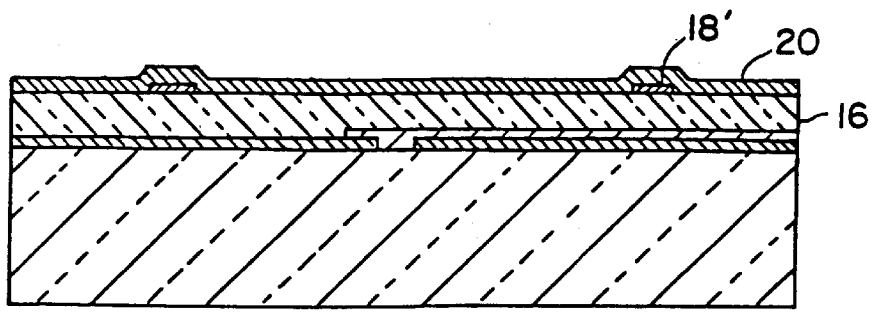
Figure 32H:
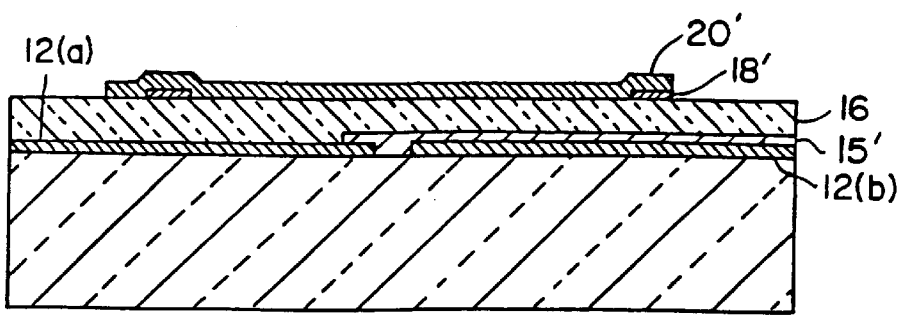
Figure 33:
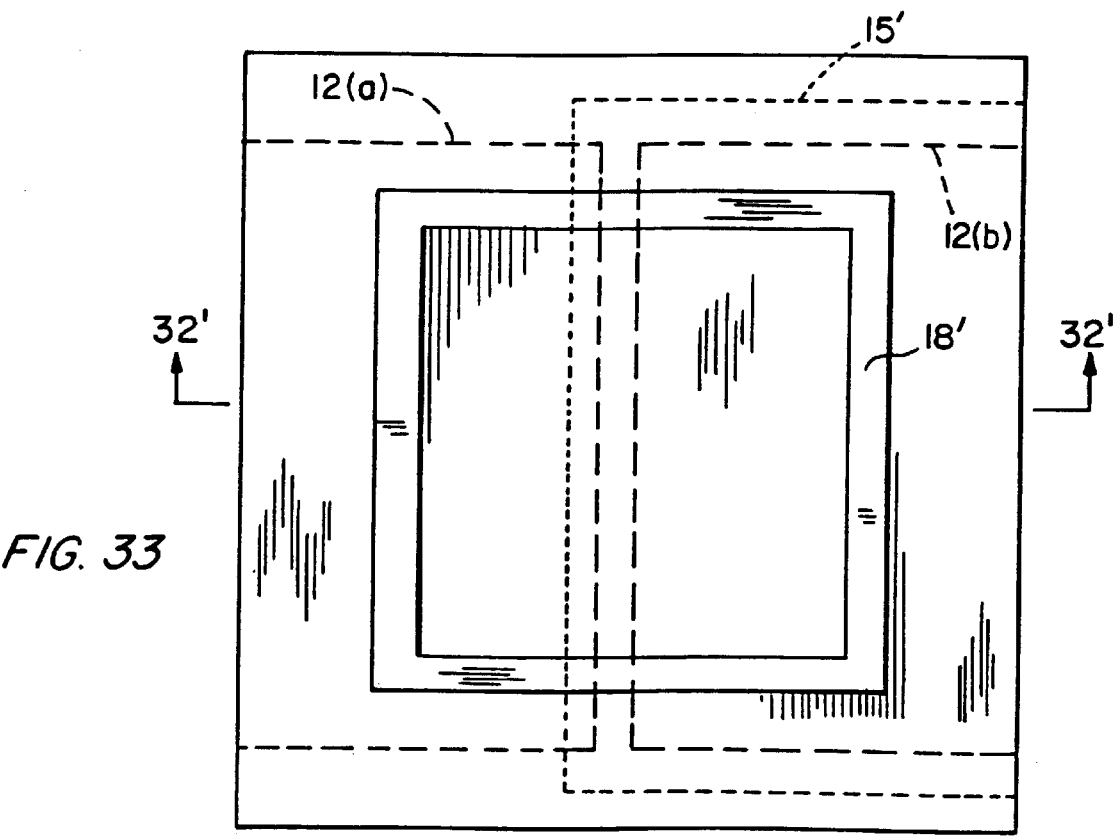
FIG. 33 is a top plan view of a hinged microshutter at one stage of processing.
Figure 34:
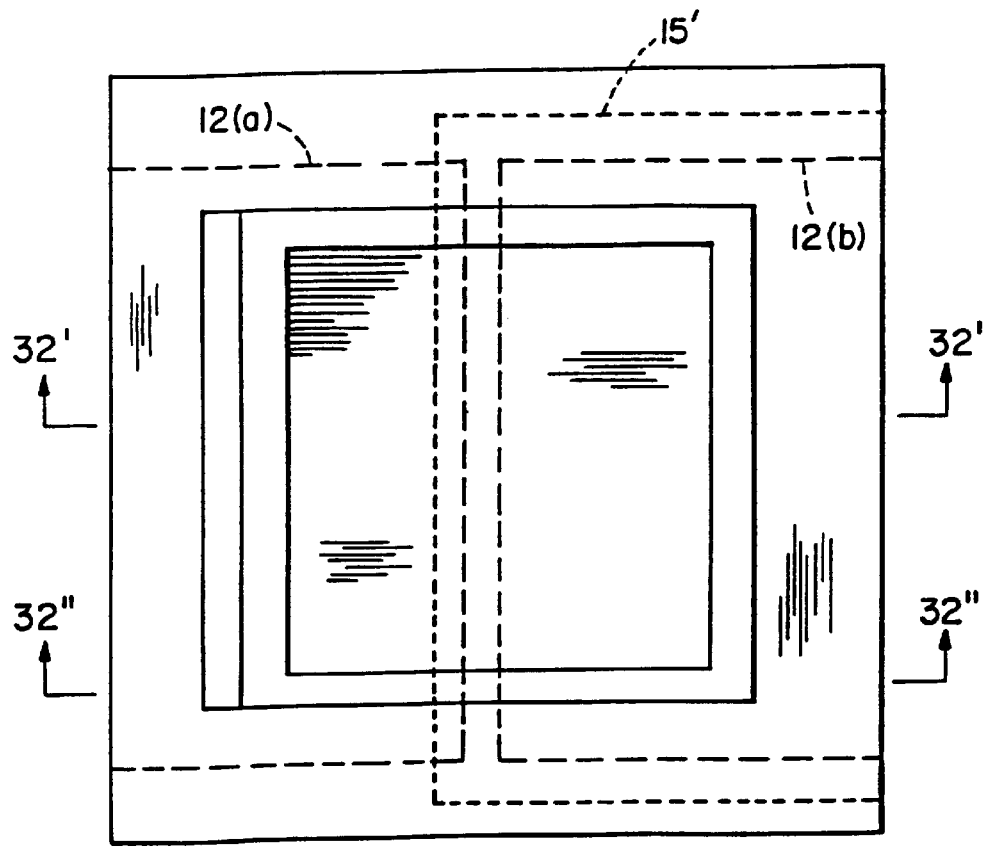
FIG. 34 is a top plan view of a hinged microshutter at a later stage of processing.
Figure 32I:
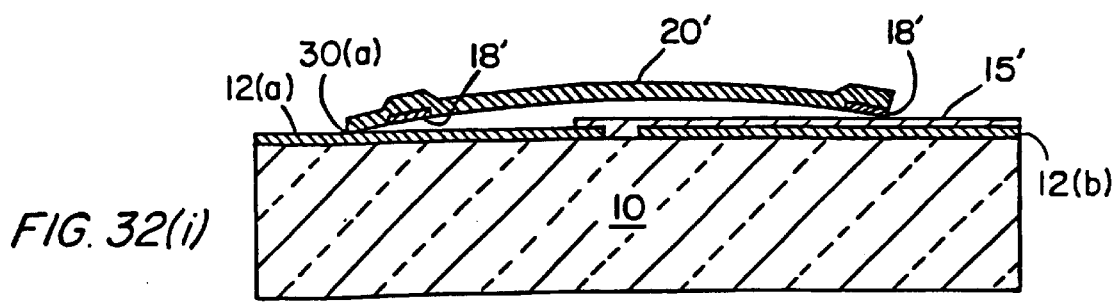
Figure 35:
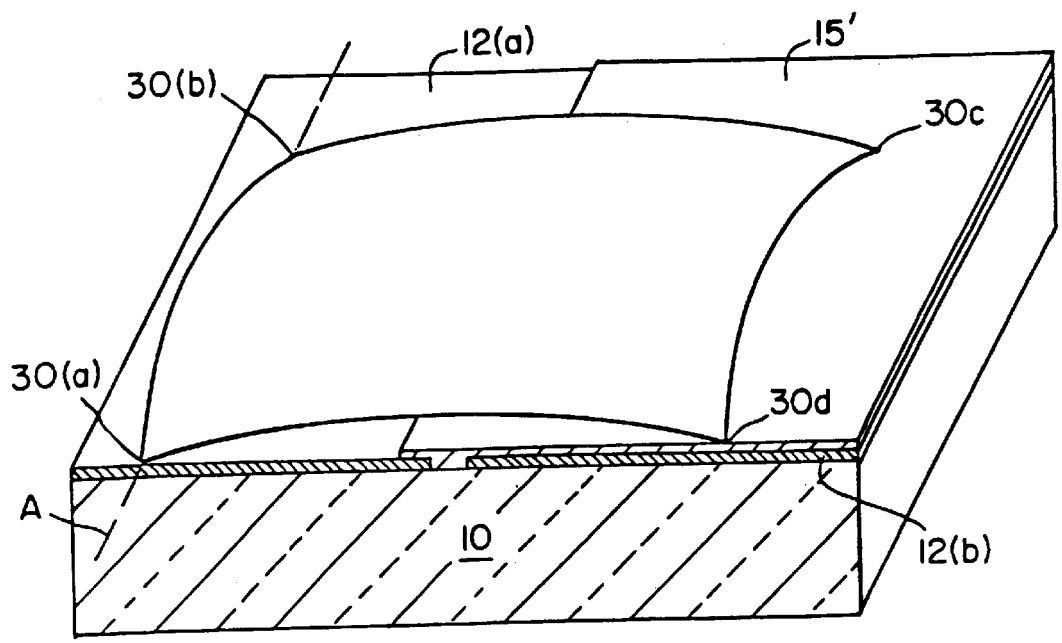
FIG. 35 is a top plan view of a hinged microshutter at a last stage of processing.

Referring now to FIGS. 32(a)–32(i) and FIGS. 33–35, a process for fabricating a hinged shutter for an ELVD will now be described in connection therewith. The process begins with a transparent substrate 10 (e.g., glass) having a transparent conductive coating 12 formed thereon (e.g., an ITO coating). The coating 12 is etched at dotted lines 13 [FIG. 32(a)] using standard lithography techniques to provide two substrate electrodes 12(a), 12(b) for operation of the shutter. In the next step [FIG. 32(b)], the wafer is coated with an insulative layer 14 (e.g., an aluminum oxide layer). In FIG. 32(c), the aluminum oxide layer 14 is patterned with standard lithography techniques to provide an insulating contact surface 15' on one of the electrodes 12(b). The wafer is then coated with a layer of material which may be preferentially dissolved (e.g., silicon) to form a release layer 16 [FIG. 32(d)]. In FIG. 32(e), the wafer is coated with a tensile stress layer 18 (e.g., of aluminum oxide). This layer 18 is etched into a rectangular annulus 18' in FIG. 32(f) (see top plan view FIG. 33) which because of its shape and stress will cause a slight bowing of the final hinged shutter so that it has a bowl-like shape. This same aluminum oxide layer will also be located at two of the contact points of the shutter. In FIG. 32(g), the wafer is coated with an aluminum layer 20 which is patterned [FIG. 32(h)] into the final shape of the hinged shutter 20' outline (FIG. 34). The release layer 16 of silicon is then etched away using fluorine gas [FIG. 32(i)] and the hinged shutter settles down to rest on the surface of the wafer and is held in place by Van der Wall's forces and makes contact on at least 3 corners. As shown in the plan view of FIG. 35, two of the contact corners 30(a), 30(b) are contacts between electrical conductors, and two of the contacts 30(c), 30(d) are between electrical insulators. The conductor contacts will be inherently more sticky than the insulator contacts and therefore when a proper force is applied to the shutter with an electric field, the insulator contacts will break free and the shutter will rotate about an axis A passing through the two conducting contacts.

ANISOTROPIC STRESS STRIPS

Figure 37:
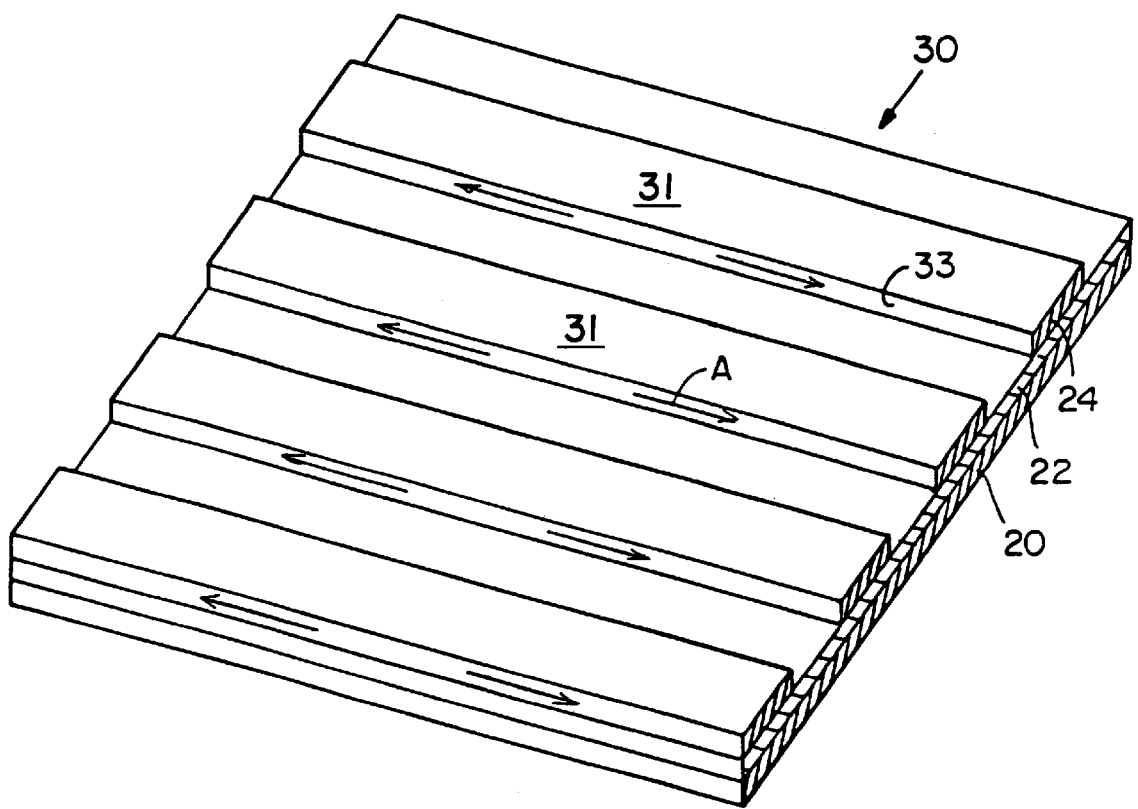
FIG. 37 is a perspective view of an ELVD embodiment with anisotropic stress induced by a series of stress strips.

In order for the shutter electrodes to roll only in one direction either anisotropic stiffness or anisotropic stress is needed. One approach to achieving anisotropic stress is to form stress strips, as shown in FIG. 37. In this embodiment, a trilevel electrode structure 30 is formed which consists of bottom layer 20 of low stress $Al_2O_3$, and intermediate layer 22 of low stress Al and a top layer 24 of high stress $Al_2O_3$ using a sputtering or evaporation process as previously described. Cut lines 33 are etched through the top film 24, so that the film is etched into a grating, or series of strips 31. The film 24 becomes very anisotropic, and the stress of the film becomes anisotropic. The film is still tensile in the direction of the arrows A, having a stress of the same order as the original film, however the stress perpendicular to the strips 31 is much lower. The stiffness will of course, also be anisotropic, and will be less stiff when rolled perpendicular to the roll direction. However, since the stress is more anisotropic than the stiffness, the stress will dominate the roll direction. The stress in the film 24 will be isotropic in the plane of the film. The need for the corrugations is eliminated, in this embodiment, since the main purpose for the corrugations is anisotropic stiffness to control the roll direction. Instead the stress strips 31, which lie in the roll direction, provide control of the roll direction.

GREY SCALE

For many applications, such as TV, it is important to be able to have not just an on off, black and white, light valve but a modulator which can vary the intensity to have at least 20 and preferably more shades of gray. Since the human eye is an averaging device which tends to average over space and time, there are a number of methods for providing gray scale which take advantage of this averaging quality. One approach for providing gray rather than white is to leave the shutter open only for half the time instead of all the time. If the shutter is turned on and off at least 30 to 60 times a seconds, the eye will average and light and see gray instead of white. The achievement of gray scale in this way, by using driving electronics, has been experimentally demonstrated using the shutters. This approach has certain disadvantages, one of which is that using this mode, the shutter speed required increases with the number of shades of grey.

A second approach is to open the shutter only half way instead of all the way. If the pixel is small enough the eye will spacially average and "see" gray rather than just a half open shutter. In a TV application, because there is an array of devices representing a large number of pixels, the array needs to be scanned a row at a time, and therefore each pixel can only be addressed for a small fraction of the total frame time. This means that the device used for each pixel must have a memory quality which allows it to retain its position while it is not being addressed.

Figure 38:
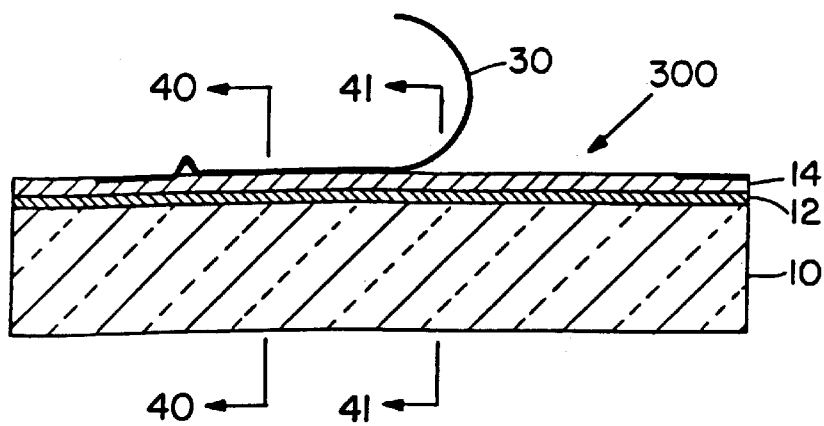
FIG. 38 is a schematic sectional view of a shutter in a partially rolled out state.
Figure 40:
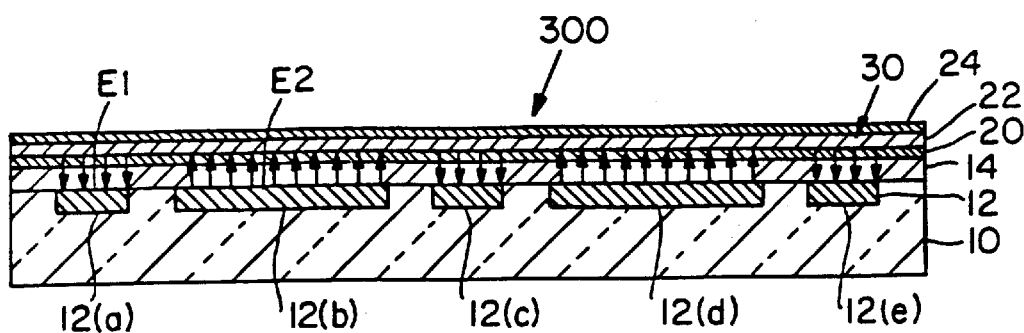
FIG. 40 is a section taken along lines A—A of FIG. 38.
Figure 41:
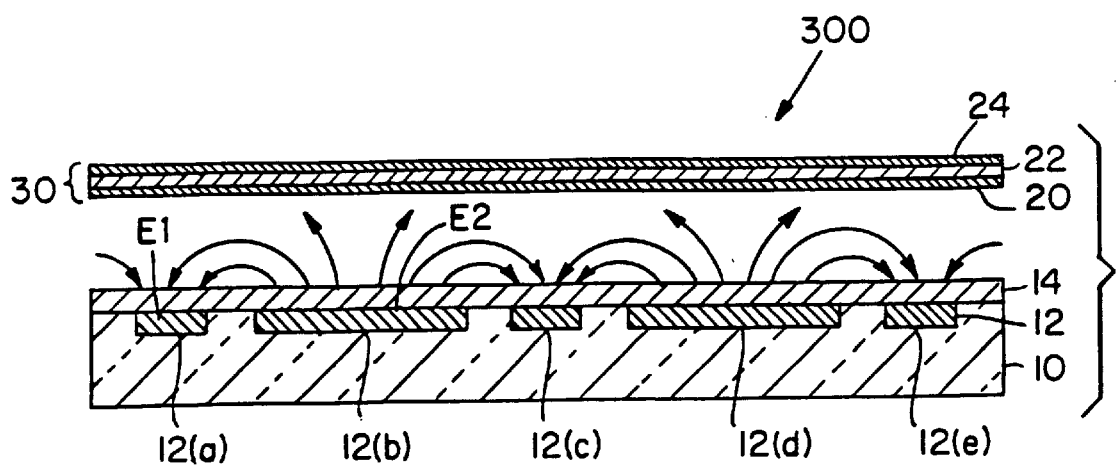
FIG. 41 is a section taken along lines B—B of FIG. 38 with the potentials on the electrodes in a hold mode.

A special electrode configuration which will allow the device to be locked in a partly rolled out position will now be described in detail in connection with FIGS. 38–42. FIG. 38 is a simplified side view of an individual shutter 300 comprising substrate 10, fixed electrode 12, insulator 14 and coil electrode 30. A first cross-section 40—40, where the coil electrode 30 is rolled out and in contact with the surface of insulator 14, is shown in FIG. 40. A second cross section 41—41, where the electrode 30 is not yet down on the surface, is shown in FIGS. 41 and 42 in different modes of electrode potential.

Figure 39:
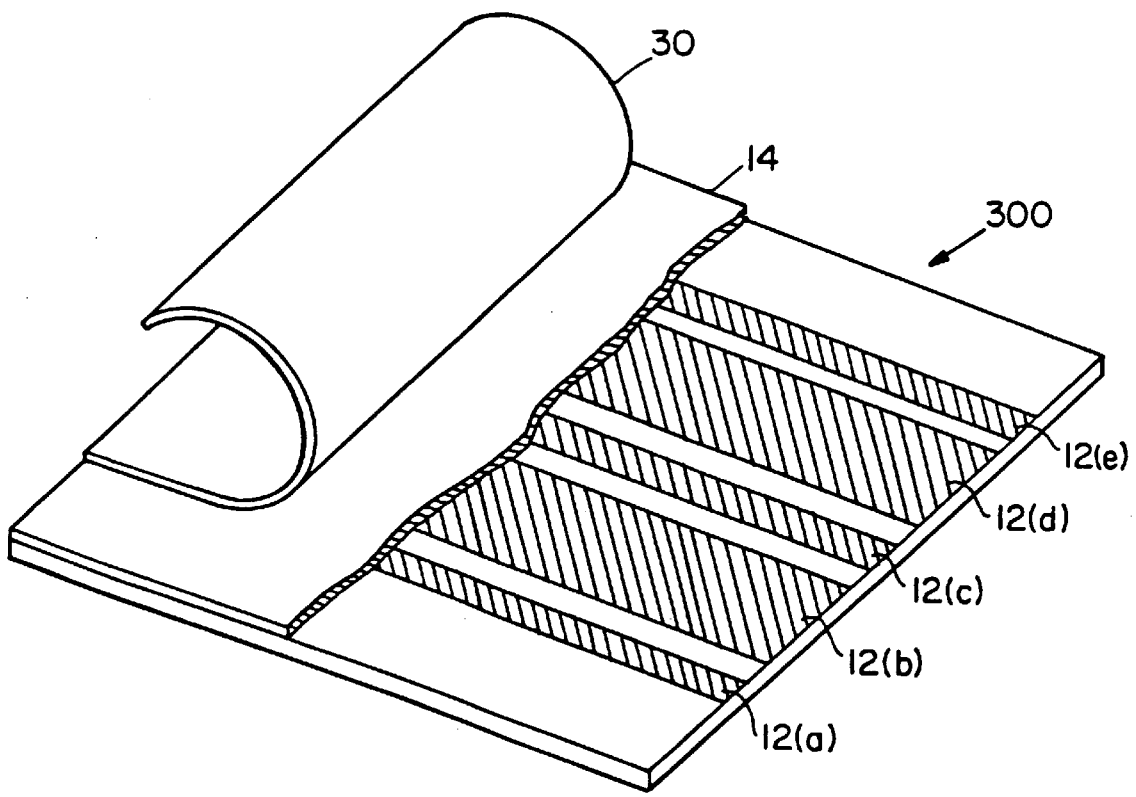
FIG. 39 is a partially exploded perspective view of a partially rolled out shutter.

The unique feature of this embodiment which allows it to have gray scale capability is the way the lower or fixed electrode 12 is segmented, as more clearly shown in the perspective of FIG. 39. Where previously there was just one fixed electrode for a single shutter 30, the fixed electrode has now been subdivided into five separately chargeable electrodes 12(a)–12(e), which run parallel to each other in the direction of the rolling motion of the shutter 30. When the five fixed electrodes are connected together electrically and are at the same potential, the device of FIG. 39 will operate very similar to the devices previously described. By properly manipulating the potential on some of the fixed electrodes while the shutter 30 is rolling out, it is possible to stop the motion of the electrode and hold it, or lock in that position. It is important to be able to hold the membrane in its locked position even through the potential on the electrode 30 is varied somewhat. This is because in an array, with the fixed electrodes as the rows, and the moveable electrode as the columns, with all the electrodes in any given row locked in position using fixed potentials on the row electrodes, there will be small variations in the potential between limits in the column of moveable electrodes as the other rows are being addressed.

Figure 42:
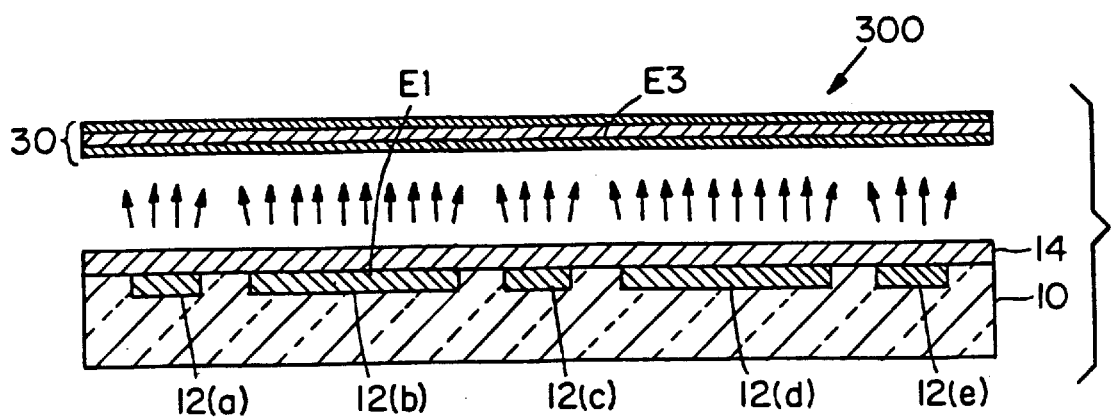
FIG. 42 is a section taken along line B—B of FIG. 38 with the potentials on the electrodes in a roll-out mode.

FIG. 42 is a cross-section of FIG. 38 taken at 41—41 showing the shutter 30 in the roll out mode wherein all the fixed segment electrodes 12(a)–12(e) are at the same potential E1 and the membrane electrode 30 is at a different potential E3 whereby the shutter 30 is caused to roll out onto the insulator 14 in a manner similar to the case for unsegmented fixed electrodes.

In order to lock the moveable electrode 30 in place, a high E field is required to be maintained between the moveable electrode 30 and the fixed electrode 14 wherever the moveable electrode is in contact with the fixed electrode, as in FIG. 40 in order to counteract the spring force which is trying to roll the membrane up. The size of the E field must be even larger than the roll out threshold field.

In FIG. 40, for example, to hold down (Hold Down Mode) a portion of electrode 30 as at 40—40 in FIG. 38, the three segment electrodes, i.e., Hold Electrodes 12(a), 12(c) and 12(e) are all at the same potential E1', which is the same, or greater, than the potential E1, while the remaining two segments 12(b) and 12(d) (Roll Out Electrodes) are at an opposite potential E2=−E1', which is the same or greater than the potential E1, and moveable electrode 30 is at zero or ground potential. The force in FIG. 40 is the same, or greater than the force required to roll out the electrode 30. This keeps the electrode 30 from rolling up. Because the potentials of neighboring electrodes are opposite; the fringing field effect will cause the electric field to be below the threshold field for rolling out wherever the membrane is not in contact with the fixed electrode, FIG. 41. Because of the fringing field effect, changing the potential to the opposite polarity on three of the fixed electrodes, i.e., the Hold electrodes, and leaving the other two at the same potential, the electric field between the Hold electrodes and the moveable electrode is reduced in section 41—41 and not reduced in section 40—40 compared with the case where all the potentials are the same. The roll out forces are therefore reduced. When the neighboring electrodes are of opposite potential, one can increase the voltage on all five fixed electrodes and the moveable electrode will not roll up, however one cannot increase the voltage too much, otherwise the field in section 41—41 will become too high and the membrane will roll out. There will be some optimum voltage on the five electrodes which will lock the electrode. The locking effect will tend to be stronger if there are more electrodes which are narrower and more closely spaced to enhance the fringing effect. For example, subdividing the fixed electrodes into seven electrodes with three hold electrodes and four roll out electrodes would probably give a strong hold effect.

Note that the preceding principles would apply equally to a structure in which the moveable electrode were segmented instead of the fixed electrode.

A second method for providing a shutter which will hold in a partially rolled out position is to arrange for the contacting surfaces of the moveable electrode and the fixed electrode (or the insulation on the fixed electrode) to have a specified level of adhesion. Any time two materials come into very close proximity, there are usually attractive forces (Van der Walls Forces).

The amount of force depends on the material, and surface structure. With proper selection of the contacting materials, the adhesion between the moveable and fixed electrodes can be controlled to be low enough to allow the electrode to roll up, but high enough to significantly lower the roll up threshold voltage $V_{RUT}$.

For a microshutter built in this way, it is possible to raise the voltage applied to the roll out threshold $V_{ROT}$, for a short period to roll the shutter part way out, and then drop the voltage to a lower level (but not to zero) where the adhesion forces are holding the shutter partially rolled out. With the roll in this position, it is possible to vary the voltage between the moveable and fixed electrode, between $V_{RUT}$ and $V_{ROT}$, without significant movement of the shutter.

With careful design and control of adhesion, this mode of operation will provide grey scale in an X–Y scanned array for TV applications.

The optional PTFE, or some other material mentioned in the preceding embodiments, can serve as the adhesion control layer.

FLOATING ELECTRODE DEVICE

Figure 43:
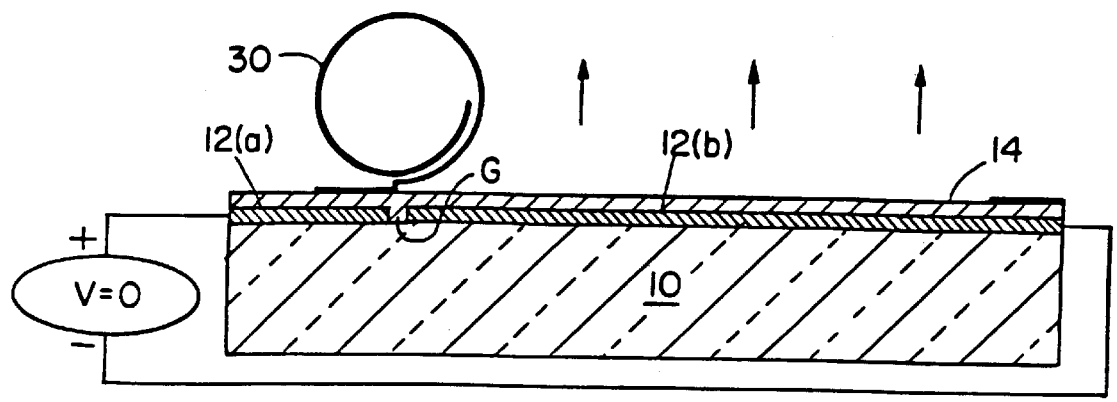
FIG. 43 is a sectional view of an ELV with an electrically floating shutter, shown in the open position.
Figure 44:
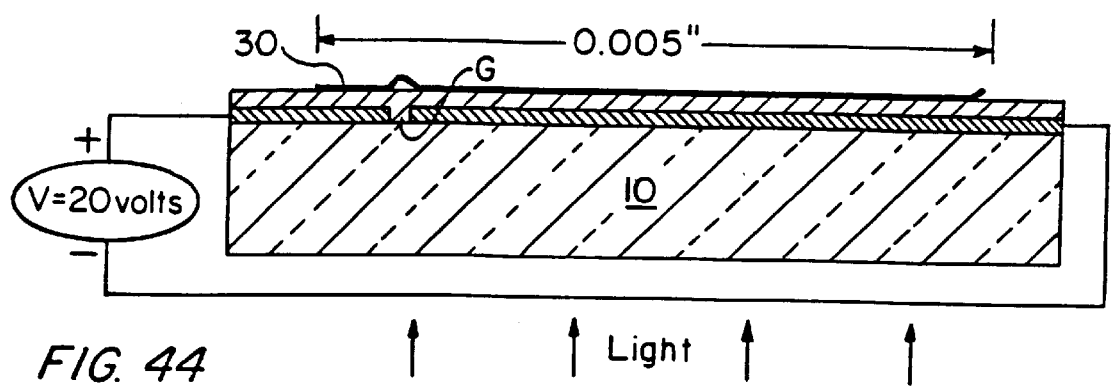
FIG. 44 is a sectional view, as in FIG. 43, showing the switch in the closed position.

There is another version of the shutter light valve where the moveable electrode 30 does not require an electrical contact. The moveable electrode is electrically isolated, or floating, and the charge required in order to achieve the force to roll it out is produced by inducing the charge with two or more fixed electrodes. One such electrode arrangement is shown in FIG. 43 (in the open position) and FIG. 44 (in the closed position), where no electrical contact is made to the moveable electrode 30, but there is a first fixed electrode 12(a) under the fixed part of the moveable electrode 30 and a second fixed electrode 12(b) right next to the first electrode with a small gap G between. A voltage between the two fixed electrodes will roll out the electrode 30. In order to minimize the voltage required to roll out the electrode the capacitance between the first electrode and the membrane should be maximized by making the overlap area of the two electrodes large.

Figure 45:
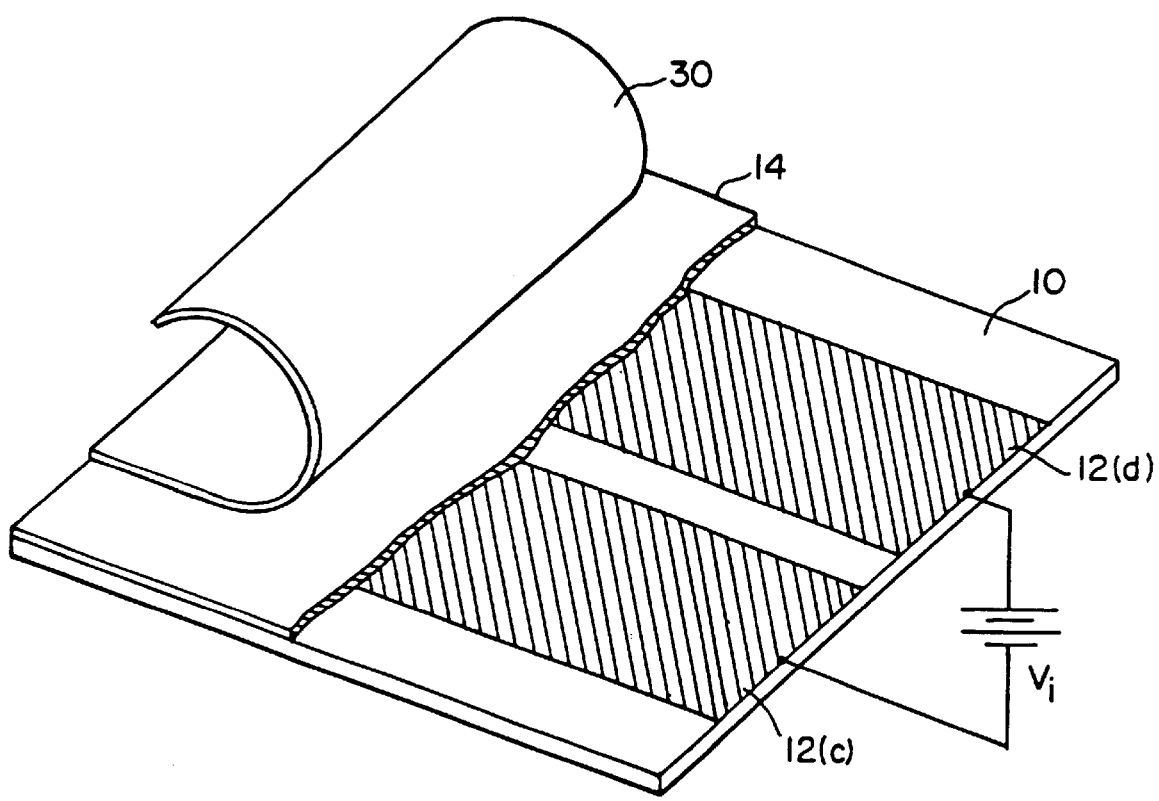
FIG. 45 is a perspective view of an alternate embodiment of an electrically floating ELV shutter.

A second way of forming a floating electrode device is to split the fixed electrode in half forming two adjacent electrodes 12(c) and 12(d) beneath an insulator 14 (shown in partial section), as shown in FIG. 45. Applying a proper voltage V1 between these two electrodes 12(c) and 12(d) will roll out the electrode 30.

PRINTER

Figure 46:
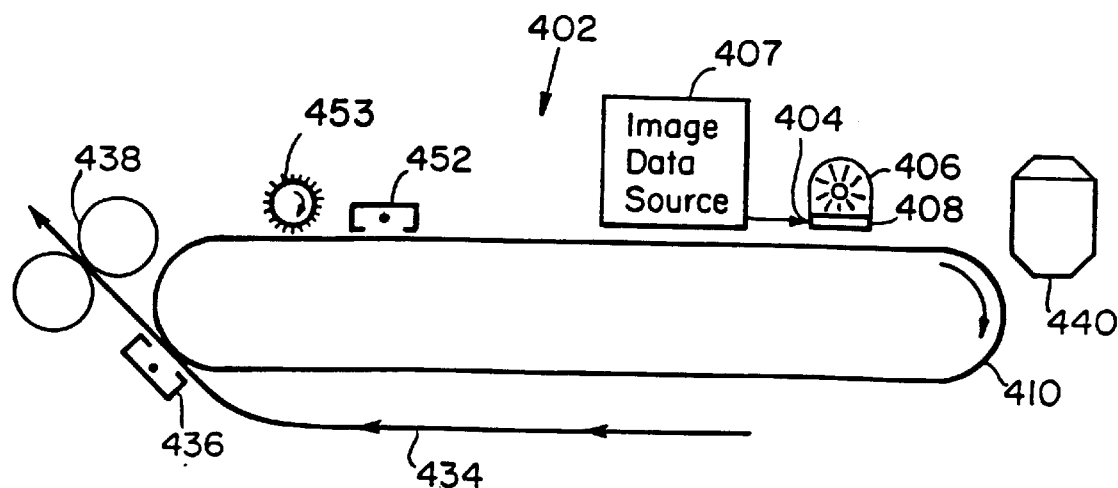
FIG. 46 is a schematic drawing of a printer system using a shutter array of the invention as a print head.
Figure 48:
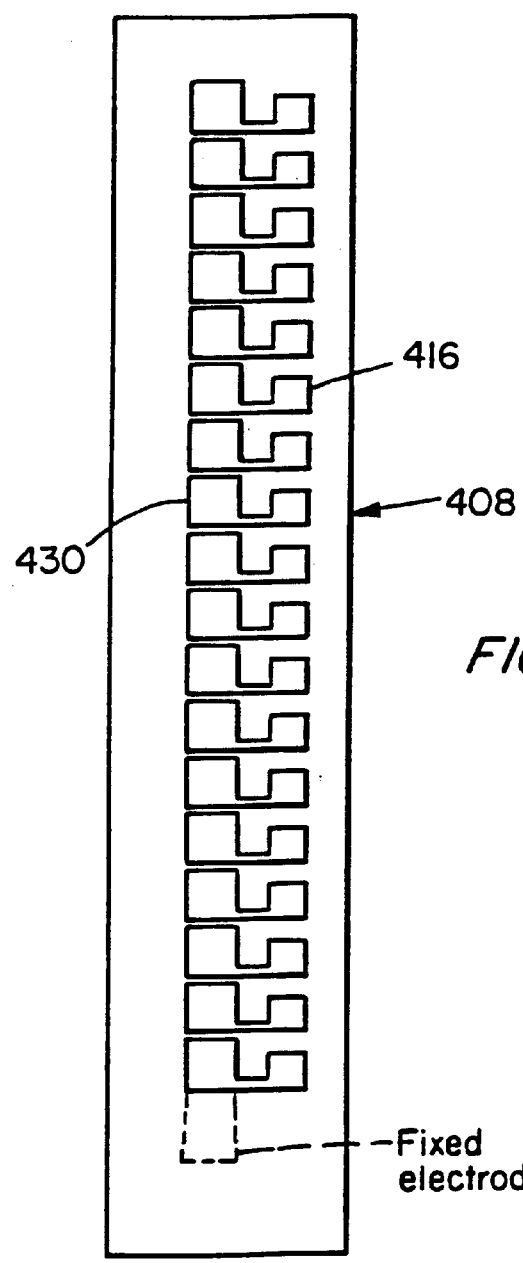
FIG. 48 is a plan view of the linear microshutter taken in the direction A—A of FIG. 47.
Figure 47:
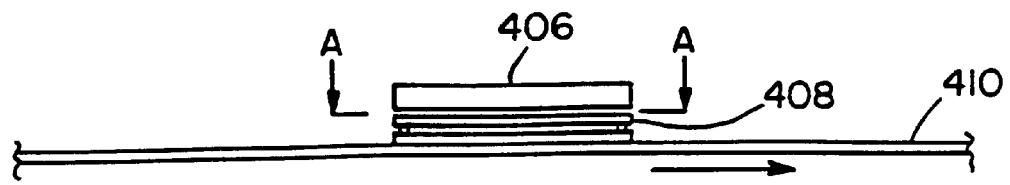
FIG. 47 is a side view of the print head of FIG. 45.
Figure 49:
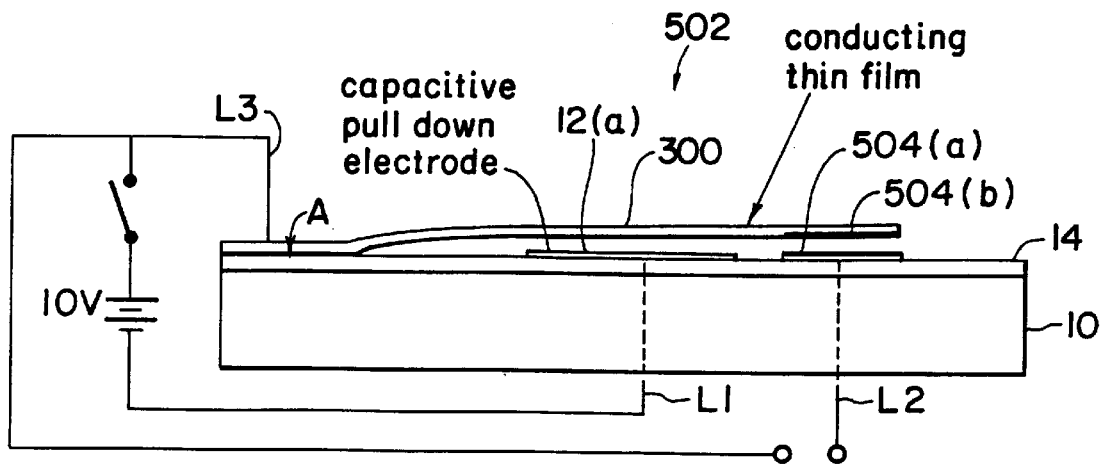
FIG. 49 (a) is a side view of a DC switch of the invention shown in the open position.
Figure 49:
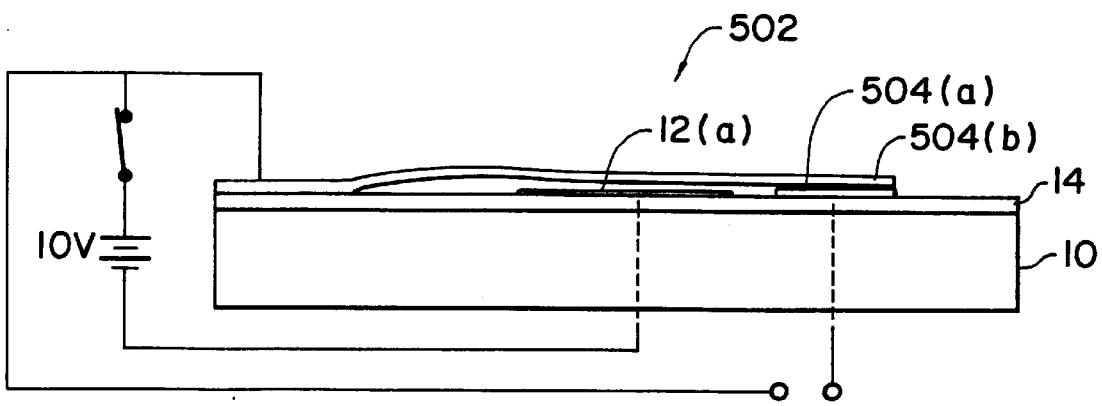

Linear or two dimensional shutter arrays can be used for a class of applications which are generally referred to as spacial light modulators. Such applications include optical correlation, spectrum analysis, crossbar switching, projection displays, printing, and neural networks. One such example is the electrophotographic printer, which will now be described in detail in connection with FIGS. 46–48. This printer 402 uses the same basic technology as a laser printer, except that in this cases the print head 404 is formed of a light source 406 and a linear microshutter array 408, in place of the scanned laser. The printer 402 is simpler and cheaper to build due to the elimination of the laser, and scanning lenses. The microshutter print head 404 consists of a linear array 408 of shutters 430, each shutter 430 having a size of around 80 μm square. This small size provides for a resolution of 300 dots per inch, which is excellent for printing text and sufficient for printing photographs. The switching frequency of the microshutter 430 can be well above 10,000 Hz, therefore, the printing speed will reach above 30 inches per second at the 300 dots per inch resolution. The higher resolution required to achieve good photographic quality will be possible using smaller shutters, and the print speed will remain about the same because the smaller shutters will have a higher ultimate frequency capability. Preferably, the light source 406 may be a vacuum fluorescent device directly above and in close proximity to the microshutters 430. The microshutter array 408 is formed on a glass substrate which is thin, 0.003" or less, to allow the array to be placed very close to a photoreceptor belt 410 and minimize the need to have collimated light. Wire bond pads 416 are provided to address or make electrical connection to each pixel on shutter 430 with the digital data to be imaged from source 407. This data is input from source 407, one line at a time.

The linear array 408 is used to print a pixel image line by line onto light sensitive photoreceptive belt 410 as it is rotated by the print head 404. The photoreceptor belt 410 is charged by corona from corona unit 452. A pixel from one of the shutters 30 selectively discharges the corona at a spot opposite the shutter. The resulting charge image is developed with toner, from developer 440, that clings to charged spots. The toner image is transferred from the belt 410 to the paper 434 at the transfer corona station 436 and fused to the paper at the fuser rollers 438 to form a printed image. The image is removed from the belt 410 by cleaner 453.

DC SWITCH

The principles of the present invention can be used to form switches of various kinds. One such switch is a D.C. switch 502 as shown in FIGS. 49–53. This switch has special electrodes 504(a) and (b) i.e. current carrying electrodes which allow for metal to metal, or conductor to conductor contact. The conductor to conductor contact provides for a large impedance change from an open to closed position compared with a capacitive type of switch (see microwave switch, to be described in next section), and in fact, the impedance change can be considerably larger than a transistor. Because of this performance advantage and because these switches are at least as easy to fabricate as a transistor, they have the potential to replace the transistor for many applications.

A first embodiment of a DC switch 502 is shown in FIG. 49(a) in the open position and FIG. 49(b) in the closed position. The switch is formed on a substrate 10 such as ceramic or glass or may be formed of a conductor with an insulating layer 14 deposited thereon. A metal film such as aluminum is then coated on the insulator and patterned to form pull down electrode 12(a) and a contact metallization area (not shown) where a special lower contact 504(a) of iridium or the like will be formed. A release layer is then formed such as by evaporation onto the structure and patterned to provide attachment areas A where the moveable electrode 300 is to be formed. An upper contact 504(b) is formed on the release layer opposite the lower contact 504(a). Next, the moveable electrode is formed as previously described on the release layer and the release layer dissolved or dry etched away.

Electrical leads L1, L2 and L3 are attached to the pull down electrode 16(a), lower contact 504(b) and moving member 300 respectively. Application of a DC voltage (e.g. 10 Volts as shown) across L1 and L3 will cause moveable electrode to close as in FIG. 49(b) to connect line L2 and L3 through contacts 504(a) and 504(b).

The concern with this type of switch, which is the same as for any mechanical relay, is the electrical arcing which can change or damage the contacts, or even cause them to weld together. To avoid arcing one could limit the application of this device to special applications where the switch is closed or opened only when there is no voltage across the contacts. Once closed, current could pass without damaging the contacts. Alternatively one could use mercury wetting which is a common design for controlling the arc damage on contacts.

Another approach to solving the contact breakdown problem will be described. But first, it is necessary to describe in some detail the electrical breakdown effects when two contacts are either open or closed. Consider the case of two contacts having a voltage applied to them, as they begin to move toward each other. If the voltage is 100 volts or less, a significant current can begin to flow whenever the minimum spacing between the two contacts is less than about 1 micrometer. At this spacing the electric field has reached levels greater than one million volts per centimeter. Whether or not a current flows depends greatly on the condition of the contacts. Because the contacts are generally not perfectly smooth, the electric field can reach much higher levels at small protrusions. The high electric field causes field emission of electrons from the electrically negative contact, which then are accelerated and reach an energy of 100 electron volts when they collide with the positive electrical contact. The electron flow will increase rapidly as the contacts move closer due to the stored energy in the neighborhood of contacts, and the current density can reach levels which are high enough to rapidly heat and melt the contact metal. The damage is caused by electrons being accelerated across the very narrow gap.

In the second case where damage can occur, the contacts start out in contact with a current flowing between them, and the voltage between the contacts is very low as they begin to separate. When the contact separation reaches 10 or 20 Å the resistance begins to reach high levels, and because of the natural inductance which occurs in any circuit, the voltage across the contacts will rise rapidly. Depending on the circuit the voltage can reach levels above the supply level. As with the first case when the voltage gets high enough field emission will occur, and melting of the positive electrode will also happen if the field between the contacts gets high enough long enough.

To avoid this problem, the present switch 502 as shown in FIGS. 50(o), 51, 52 and 53 is made to be very fast so the amount of time the contacts spend between contact and 1 micrometer apart, is very short. If that time is short enough there is no longer time for enough electrons to be emitted and accelerated to melt the positive contact. Because these switches can be made very small and from very light materials, they are very fast. The resonant frequencies of some of the smallest switch structures reaches ten megahertz, which means that switch times of 100 nanoseconds or less are possible.

Figure 54:
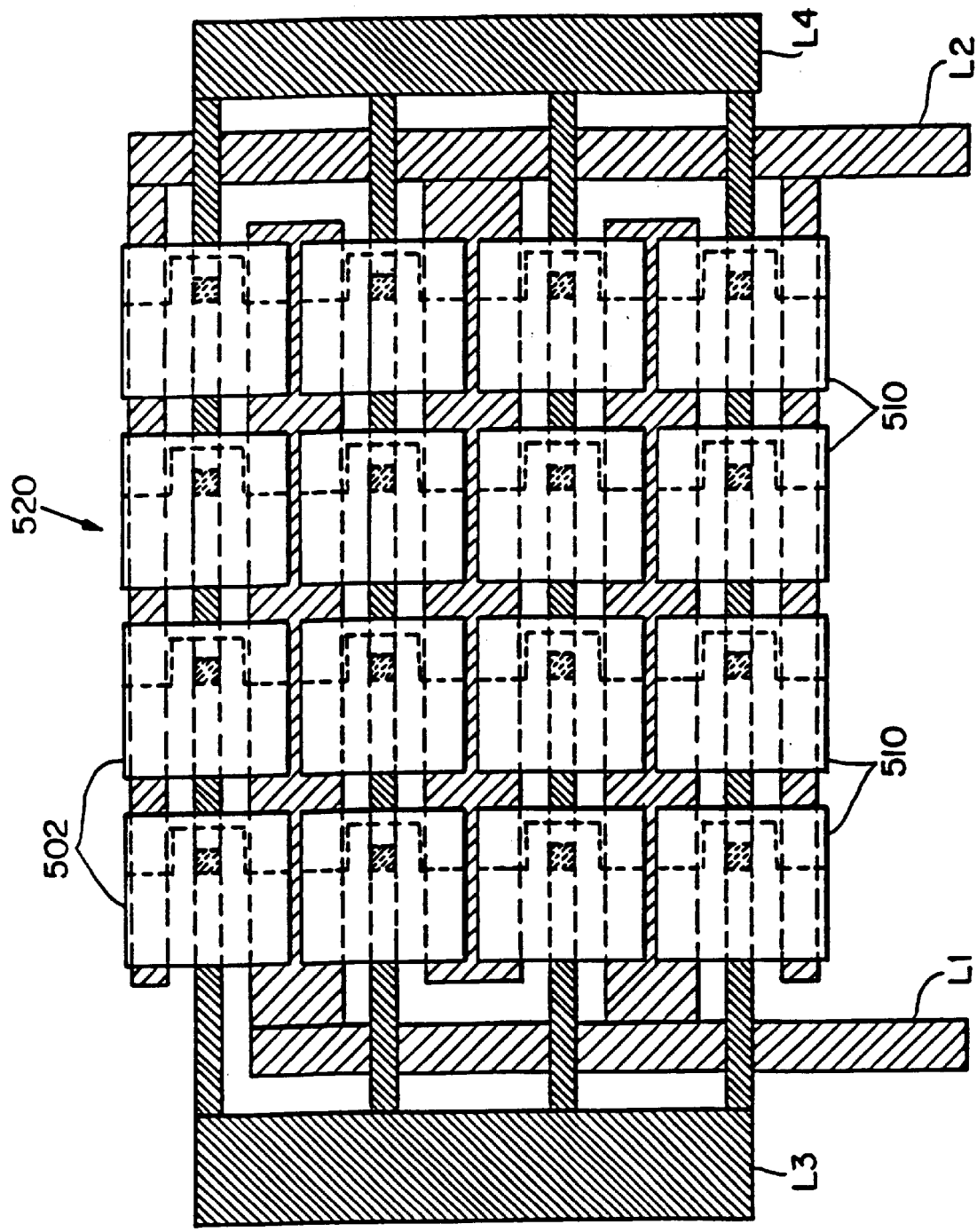
FIG. 54 is a plan view of a 4 by 4 array of DC switches.

Also to minimize contact damage the switch should move from a one micrometer gap to a zero gap and back as quickly as possible. If one were to place two switches in series and actuate them simultaneously, the total gap would change from two micrometers to zero and back in the same time that one switch moved one micrometer. For the two switches in series the gap changes about twice as fast. In a multi cell device where many switches are in series, the contact opening rate increases as the numbers of switches. A highly reliable switch could have 100 switch contacts, or elements, in series, each one have an opening rate of 1 micrometer in 0.1 micro second. The total opening rate would be 1 micrometer in 1 nanosecond which would reduce the energy dissipated to a low enough level to eliminate damage. The switching elements of the present invention are very small, and therefore many can be made on a wafer. Also many of these 100 element series groups can be coupled in parallel to increase current capacity. If the one element consumes are area of 5×5 micrometer, then a 10,000 element device can be placed on a 1 millimeter square chip. Such a chip, depending on the design and the number of parallel and series combinations, would have the capacity to switch 10 mA at 100 volts or 100 mA at 10 volts. A 4×4 array 520 connected so that four parallel strings 410 of each switch element 502 is shown in FIG. 54.

Figure 50A:
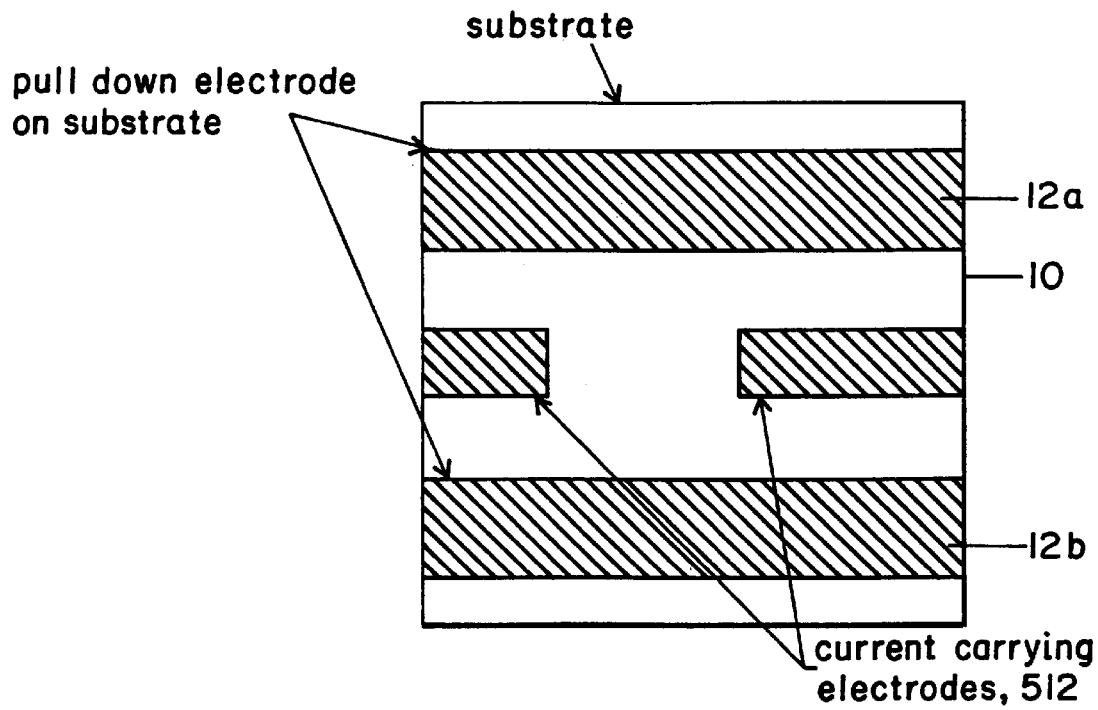
FIGS. 50(a)–50(o) are sectional and plan views of an alternate DC switch embodiment illustrating the construction thereof.
Figure 50B:
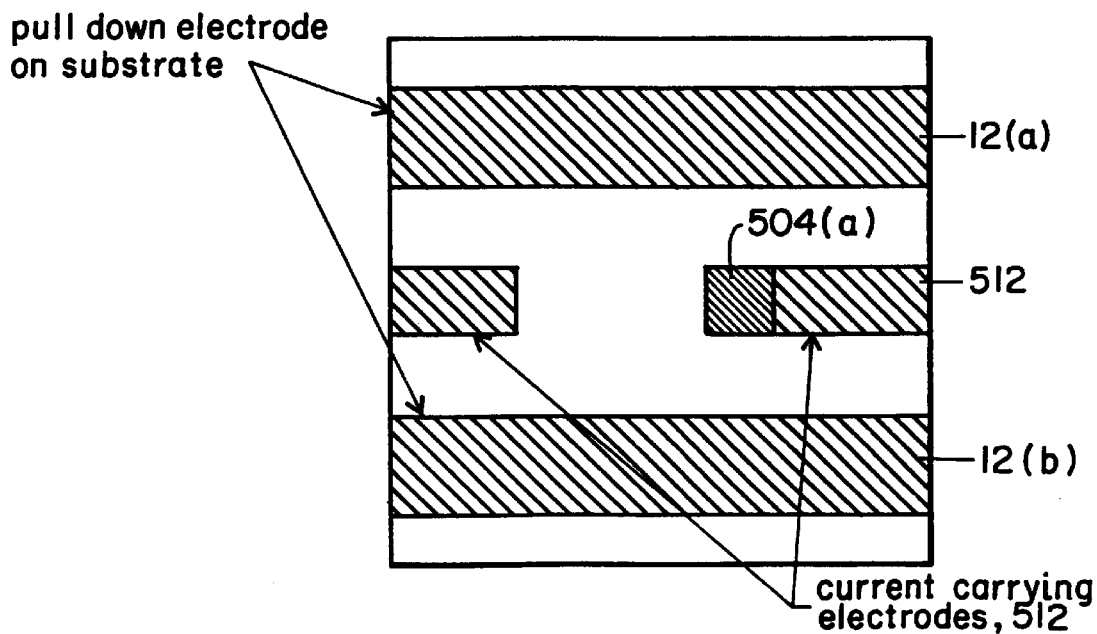
Figure 50C:
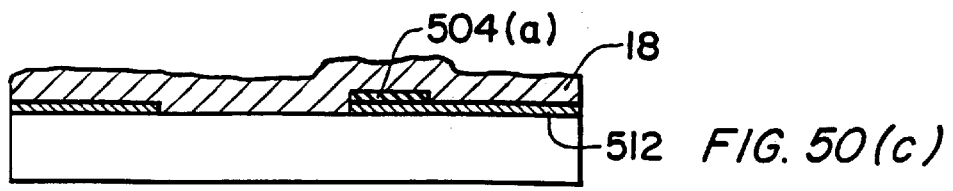
Figure 50D:
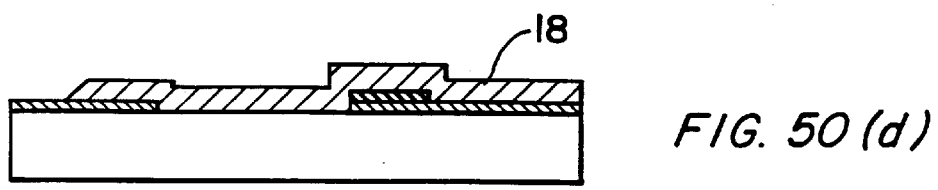
Figure 50E:
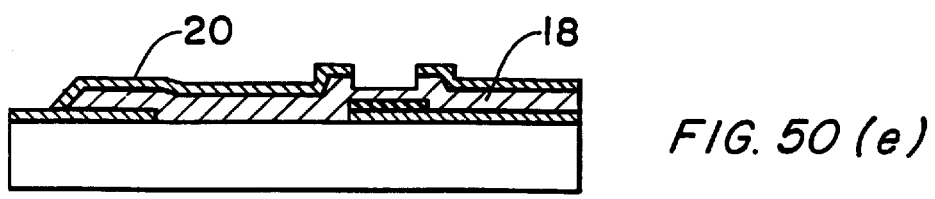
Figure 50F:
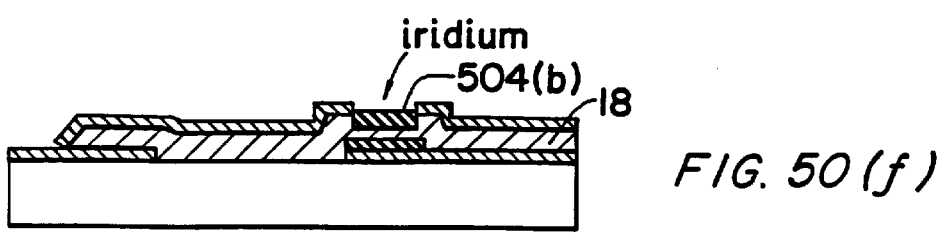
Figure 50G:
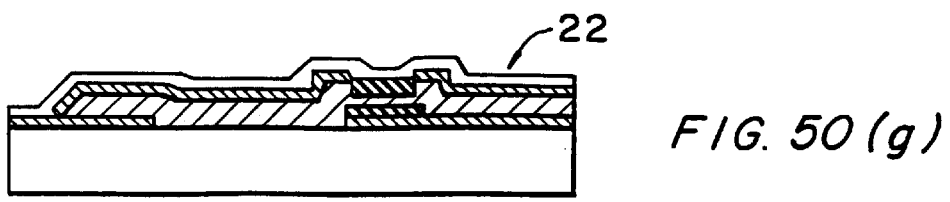
Figure 50H:
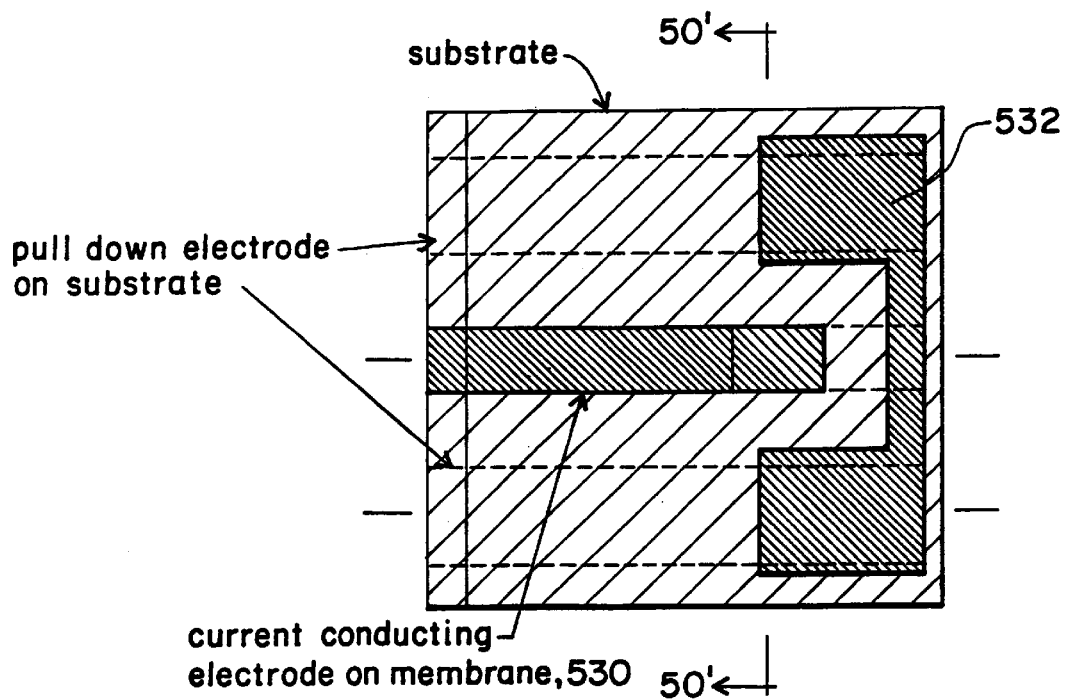
Figure 50I:
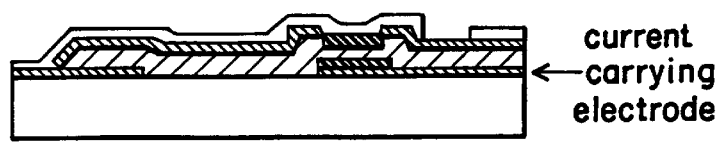
Figure 50J:
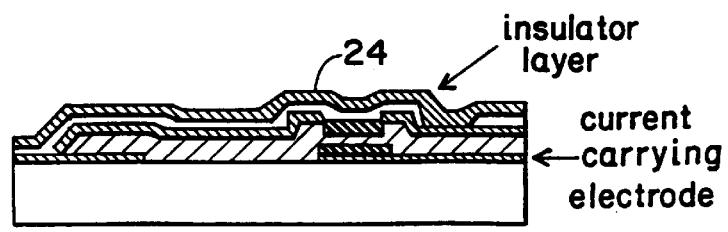
Figure 50K:
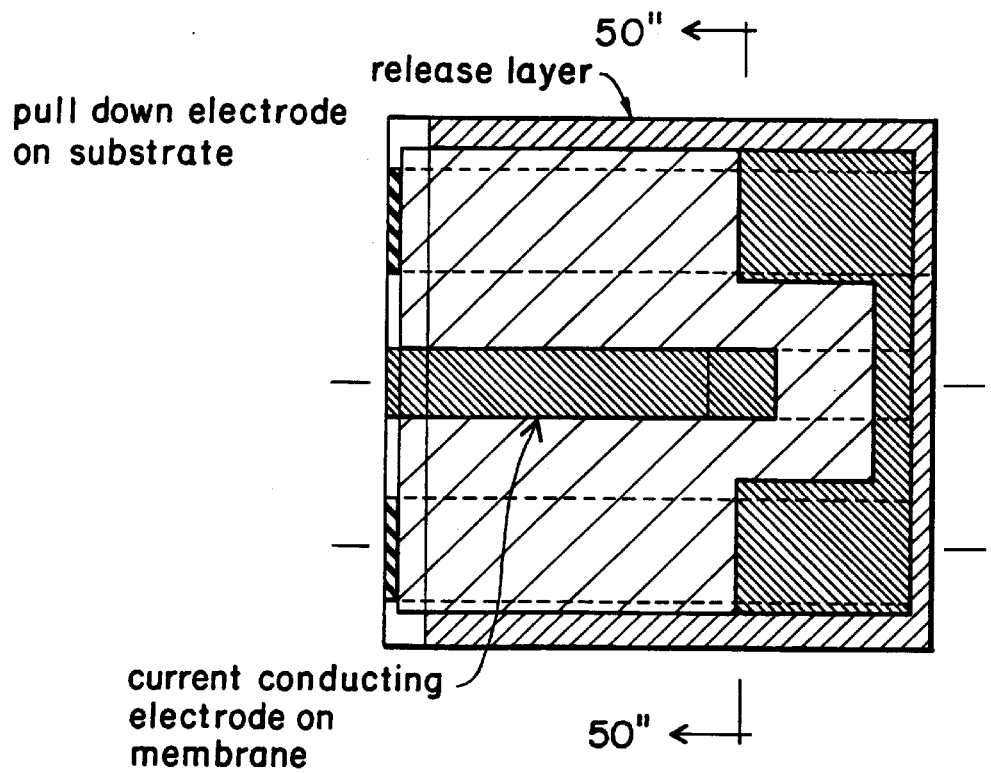
Figure 50L:
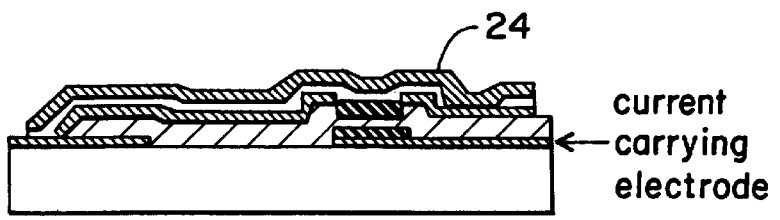
Figure 50:
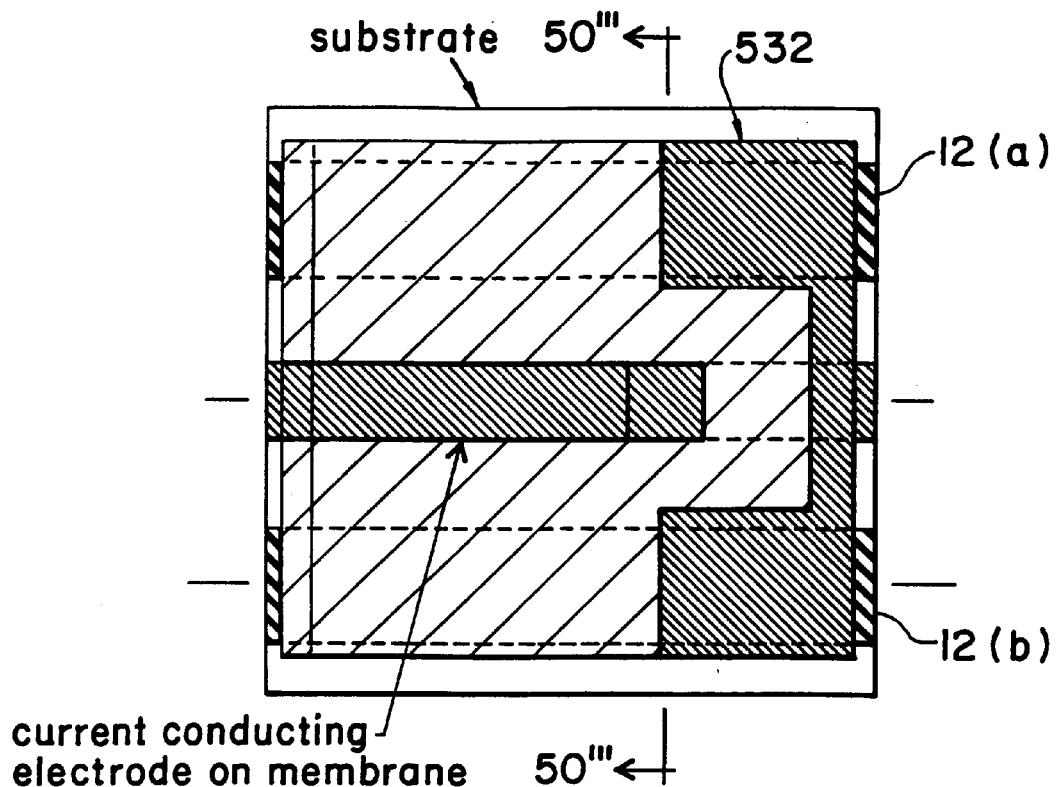
Figure 50:
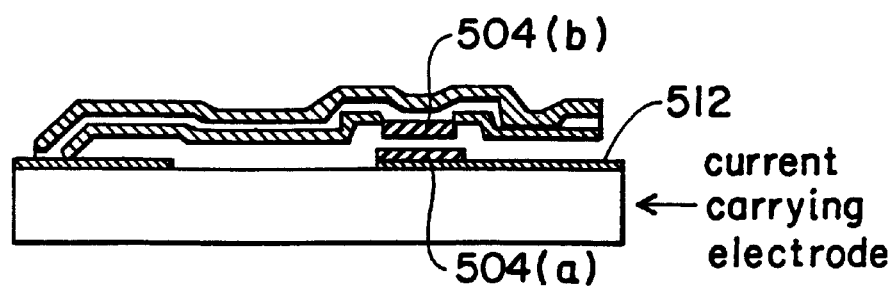
Figure 50A:
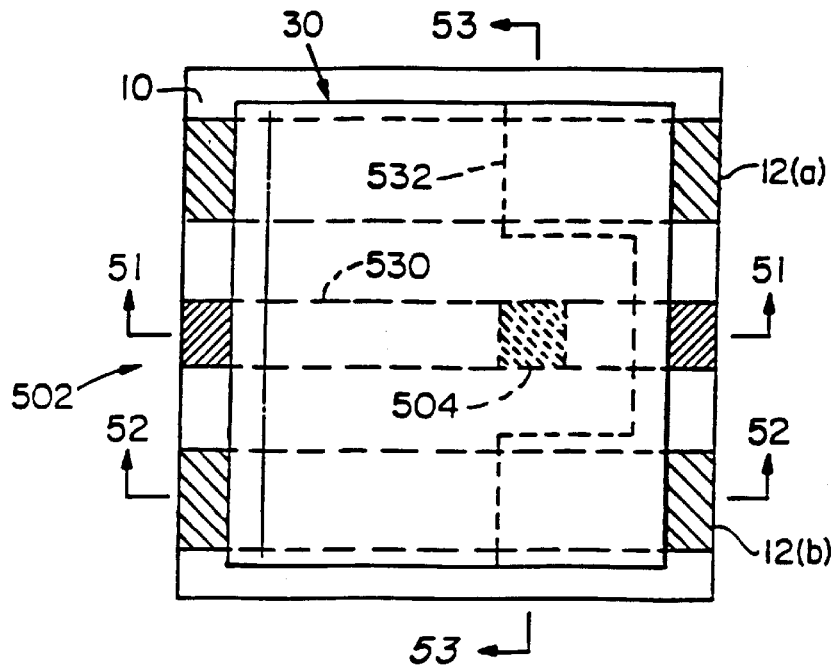
Figure 51:
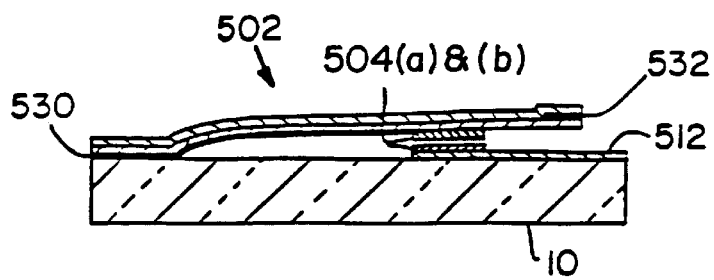
FIG. 51 is a sectional view taken along lines A—A of FIG. 50(o).
Figure 52:
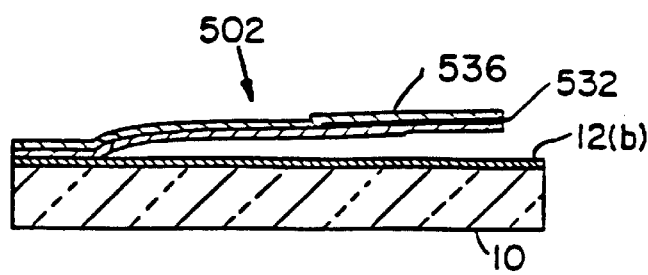
FIG. 52 is a sectional view taken along lines B—B of FIG. 50(o).
Figure 53:
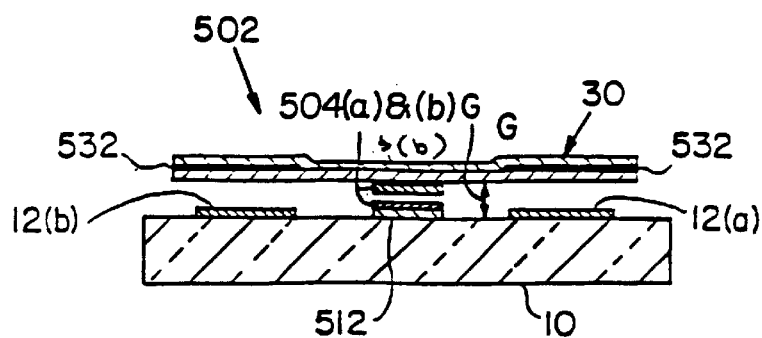
FIG. 53 is a sectional view taken along lines C—C of FIG. 50(o).

The fabrication details of an alternate single switch embodiment 502 of the array 520 are shown in FIGS. 50–53. Beginning with an insulating substrate 10 or with a conducting substrate covered with an insulating layer, a metal film, such as aluminum, is formed and patterned using thin film deposition and photolithography as described before to form both the pull down electrodes 12(a) and 12(b) and the current carrying electrodes 512 [FIG. 50(a) and FIG. 50(b)]. Contact metal 504, such as iridium, is applied to a contact area using thin film deposition and photolithography as described before. The sample is covered with a release layer 18, such as silicon, using evaporation as described earlier, as shown in FIG. 50(c). The release layer is patterned to provide attachment areas for the movable member 300 of the switch 502, as shown in FIG. 50(d). Coat and pattern an insulator layer 20 such as aluminum oxide which will be the bottom insulator layer of the moving member, FIG. 50(e). Also coat and pattern with indium to provide an upper contact [FIG. 50(f)]. Coat and pattern an aluminum layer 22, or some other metal to provide the current conducting electrodes 530 and the pull down electrodes 532 on the moving member FIGS. 50(g), (h) and (i). Coat with final insulator layer 24 shown in FIG. 50(l). Pattern the moving member as shown in FIG. 50(m), to define the moving member outline. Place the sample in fluorine gas to remove the silicon to release the moving member, FIG. 50(n). As shown in the embodiment of FIGS. 50(o) and 51–53, the two pull down electrodes 12(a), 12(b), on the substrate 10 straddle the two current carrying electrodes 530 and 512. The pull down electrode 532, bridges over the current carrying electrode 530, and is formed over the pull down electrodes 12(a), 12(b). The insulated layer 536 on electrode 532 is made from aluminum oxide. The current carrying electrodes are made from aluminum and the contacts themselves are made from iridium. This type of design minimizes the capacitance between the current carrying electrodes and the pull down electrodes, and also minimizes the capacitance between the current contacts themselves when the are open. This switch device therefore has good isolation between the pull down circuit addressed by lines L1–L2 and the current carrying circuit lines L3–L5, which is necessary for using them in series.

MICROWAVE SWITCH

With some small modifications the microshutter electrodes previously described can be used to make a microwave or high frequency switch. This switch would form a variable capacitor in which the capacitance varies about three orders of magnitude from open to closed. A low capacitance results in a high electrical switch impedance, and large capacitance results in a low impedance. The magnitude of the capacitances depends on how many of the small rolling shutters are connected together in parallel. In order to operate as a switch at 10 Ghz, a capacitance range from 0.02 to 20 pf from roll up to roll out would be a nominal design value. Lower or higher frequencies would require proportionally higher or lower capacitances to form effective switches.

Figure 55:
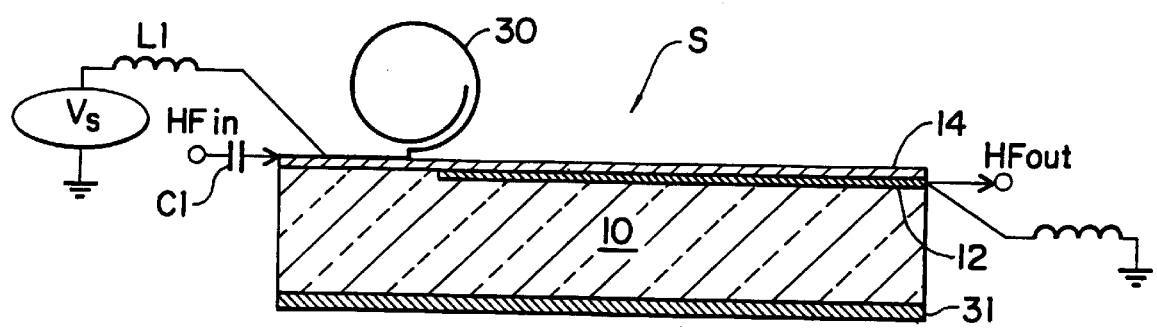
FIG. 55(a) is a schematicized cross-sectional view of a microwave switch of the invention in the open position.
FIG. 55(b) is a view as in FIG. 55(a) showing the switch in the closed position.
Figure 55:
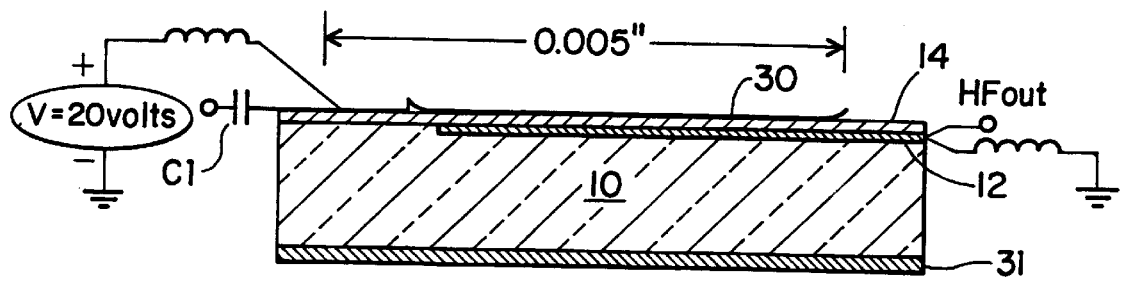
Figure 56:
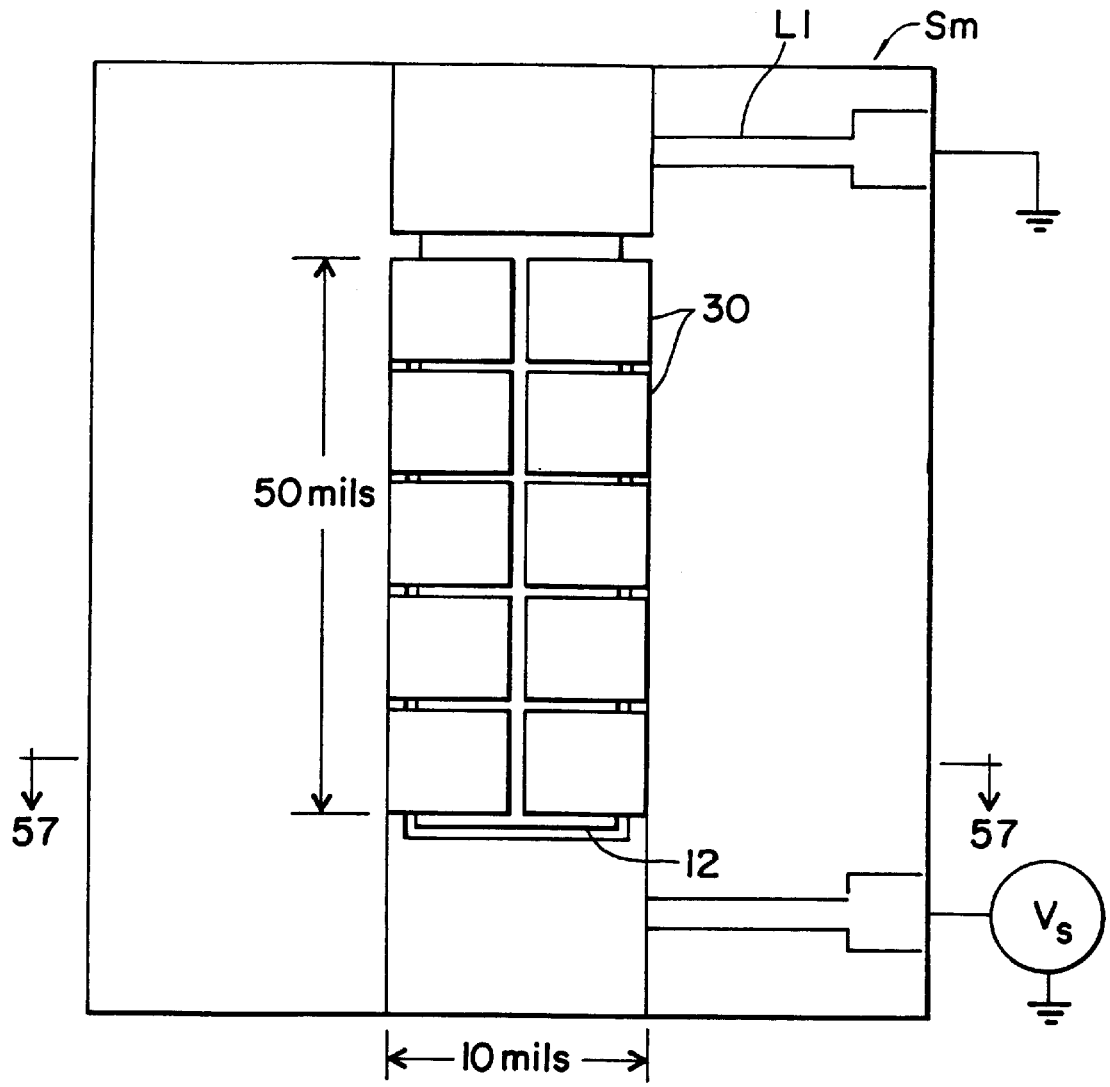
FIG. 56 is a plan view of an array of microwave switches shown in the closed position.
Figure 57:
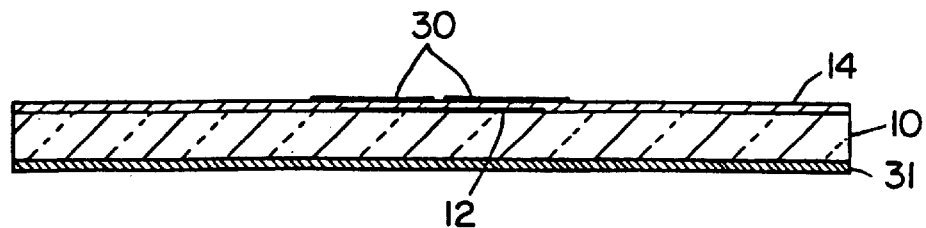
FIG. 57 is a sectional view along lines A—A of FIG. 56.
Figure 58:
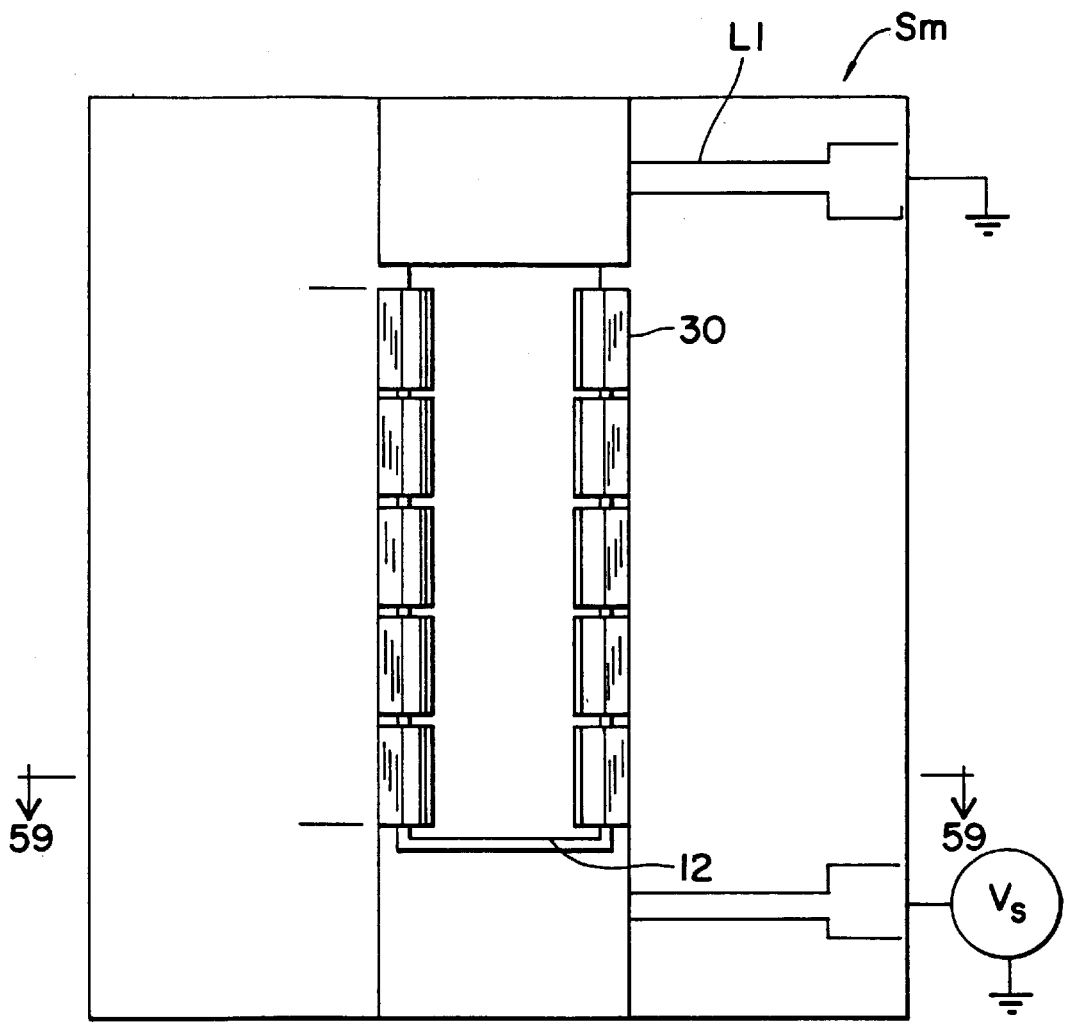
FIG. 58 is a plan view of an array of microwave switches shown in the open position.
Figure 59:
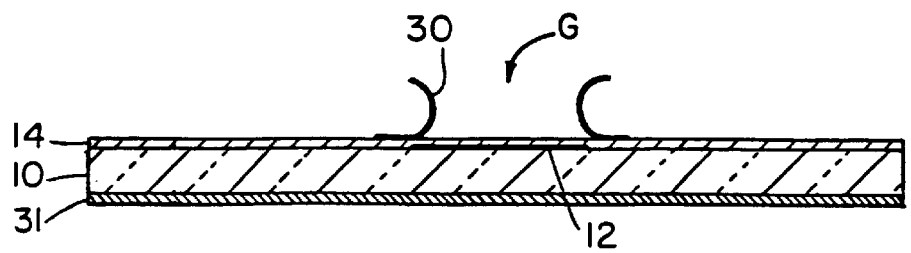
FIG. 59 is a sectional view along lines A—A of FIG. 59.

A schematic drawing of a single element switch is given in FIGS. 54 and 55, showing a fixed electrode 12 on substrate 10 and a moveable electrode 30 on the insulating substrate in both the open and closed positions. For convenience at high frequencies the backside of the substrate is also a conductor or electrode 31, which is grounded, so that the first two electrodes 30 and 12 can serve as microstrip transmission line. The signal Vs used to operate the switches is a much lower frequency, i.e., DC voltage, than the switched signal HF so that the operate signal Vs can be introduced directly across the coil electrode 30 and fixed electrode 12 through a high frequency blocking filter (inductor L1). A DC low frequency blocking filter capacitor C1 is also provided in the high frequency (microstrip) line to block the low frequency switch signal Vs from traveling down the microstrip transmission line when the electrode is uncoiled when Vs goes from 0 volts to +20 volts as shown in FIG. 55. The signal Vs used to operate the switch is therefore very similar to the signal used to operate the microshutter in previous embodiments.

FIGS. 56–59 show a multi element switch Sm designed to operate at 1.0 Ghz. The capacitance change is from 0.03 to 300 pf and changes the impedance from 0.5 to 500 ohms. The switching signal is fed in on the small lines L1 coming from the sides. The small lines L1 from the blocking inductors and the capacitors are outside the drawing and are not shown. The moveable electrodes 30 are specially laid out to cause a minimum amount of change to the microstrip shape when the switch is closed FIGS. 56, 57, which will minimize any reflections. When the switch is open FIGS. 58, 59, the gap G will present a large impedance to the signal traveling down the line, and will therefore reflect the signal.

EQUIVALENTS

Those skilled in the art will recognize, or be able to ascertain using no more than routine experimentation, many equivalents to the specific embodiments of the invention described herein. Such equivalents are intended to be encompassed by the following claims.

Note that aluminum has been indicated as a preferred material for use as the moveable electrode because it has a low stress property. Many other materials can be substituted therefore if formed with sufficiently low stress. The main priority is to form the moveable electrode with the stress built in as formed. The stress biases the electrodes to rotate in the proper direction. The corrugations provide stiffness in a given direction to prevent the moveable electrode from curling or twisting as it coils. An alternative to the corrugations is to provide anisotropic stress in the electrode films or to use stress strips as in FIGS. 20–23 or FIG. 37.

In the preferred embodiment, the moveable electrode is formed of three layers with the stress changing across the electrode from tensile in the top aluminum oxide layer to about zero stress in the middle aluminum layer and compressive in the lower aluminum oxide layer. All of this is accomplished as the layers are deposited. The average stress is fairly low.

What is claimed is:

1. A method of forming one or more light modulators comprising the steps of:

a) forming a fixed electrode on a substrate;

b) forming an insulator layer over the fixed electrode;

c) forming a removable layer over a portion of the insulator layer;

d) forming a moveable electrode over the removable layer and exposed insulator region by forming a film with a stress, as formed, which varies across the thickness thereof from compressive at a side next to the removable layer to tensile; and e) removing the removable layer to leave the moveable electrode affixed at one end and enabling the moveable electrode to coil in a direction away from the fixed electrode as a result of the stress formed in the film.

2. The method of claim 1 wherein the moveable electrode is formed of stressed insulator films above and below a conductive film.

3. The method of claim 2 wherein stiffening members are formed in the moveable electrode, as formed.

4. The method of claim 2 wherein the substrate is formed of transparent material, the removable layer is formed of photoresist, the insulator films are formed of aluminum oxide, and the conductive film of aluminum.

5. The method of claim 4 wherein a light absorbing film is formed over the moveable electrode.

6. The method of claim 1 wherein the removable layer is removed by a halogen bearing gas or plasma.

7. The method of claim 1 including the step of enclosing the modulators in a moisture barrier package with a gas inside.

8. The method of claim 7 wherein the gas is taken from the group comprising helium, argon, xenon, or nitrogen.

9. The method of claim 1 including the step of enclosing the modulators in an hermetically sealed evacuated package.

10. The method of claim 1 wherein the moveable electrode is formed of a conductive layer between a second insulator layer and a third insulator layer and the removable layer is formed of a material from the group comprising photoresist, silicon or geranium.

11. The method of claim 10 wherein the fixed electrode is formed of indium-tin-oxide, the first, second and third insulator layers of aluminum oxide and the conductive layer of aluminum.

12. The method of claim 10 wherein the second insulator is formed with compressive stress and the third insulator layer with tensile stress and the conductive layer with zero stress.

13. A method of forming one or more light modulators comprising the steps of:

a) forming a fixed electrode on a substrate;

b) forming an insulator layer over the fixed electrode;

c) forming a first removable layer over a portion of the insulator layer;

d) forming a second removable layer over said first removable layer which is patterned with corrugations and leaving a portion of the first insulator layer exposed at one end thereof;

e) removing the patterned second removable layer and portions of the first removable layer while transferring the corrugations into said first removable layer and having an exposed region of the insulator layer at one end thereof;

f) forming a corrugated electrode over the corrugated first removable layer and exposed insulator region; and g) removing the remaining first removable layer to leave the corrugated electrode affixed at one end to the insulator portion and enabling the corrugated electrode to coil in a direction away from the fixed electrode.

14. A method of forming one or more light modulators comprising the steps of:

a) forming a fixed electrode on a substrate;

b) forming a first insulator layer over the fixed electrode;

c) forming a release layer over the insulator;

d) forming a moveable electrode over the release layer which moveable electrode is stressed, as formed, to have a stress which varies from compressive to tensile; and e) releasing the release layer to cause said electrode to coil away from the fixed electrode as a result of said stress.

15. The method of claim 14 wherein the release layer is formed of photoresist.

16. The method of claim 15 wherein the moveable electrode is formed with corrugations and the photoresist layer is formed in a double exposure process in which a first thickness of the photoresist layer is exposed to a first light only where the light modulator is defined and a second thickness over the first thickness which is exposed to a second light, of lesser intensity than the first light, through a grating which defines gaps between the corrugations such that the photoresist can be removed in areas exposed to the light but only to the level of the first thickness in the areas exposed to the second light.

17. The method of claim 14 wherein the release layer is released by dissolving the layer in a solvent and then rinsing the structure with water to remove the solvent, freezing the water and evaporating the frozen water in a vacuum chamber to dry the structure in a non-liquid state.

18. The method of claim 14 wherein the substrate and fixed electrode is substantially transparent to light of a predetermined wavelength and the moveable electrode is non-transparent thereto.

19. The method of claim 14 wherein the fixed electrode is reflective to light of a predetermined wavelength and the moveable electrode is transparent to such light.

20. The method of claim 14 including forming light emitters of different colors on different ones of said modulators.

21. A method of forming one or more light modulators comprising the steps of:

a) forming a fixed electrode on a substrate;

b) forming a first insulator layer over the fixed electrode;

c) forming a corrugated release layer over the insulator;

d) forming a corrugated prestressed electrode over the release layer which is stiffened by the corrugations; and e) releasing the release layer to allow the corrugated electrode to coil away from the fixed electrode due to the prestress.

* * * * *